US008085795B2

(12) United States Patent
Yamane

(10) Patent No.: US 8,085,795 B2
(45) Date of Patent: Dec. 27, 2011

(54) PACKET RELAY APPARATUS

(75) Inventor: Shinji Yamane, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 594 days.

(21) Appl. No.: 11/675,353

(22) Filed: Feb. 15, 2007

(65) Prior Publication Data
US 2008/0080533 A1    Apr. 3, 2008

(30) Foreign Application Priority Data
Sep. 29, 2006  (JP) .................. 2006-269360

(51) Int. Cl.
*H04L 12/56*     (2006.01)

(52) U.S. Cl. ........................................ 370/401
(58) Field of Classification Search ........ None
See application file for complete search history.

(56) References Cited

U.S. PATENT DOCUMENTS
6,208,649 B1    3/2001   Kloth
2003/0051195 A1  3/2003   Bosa et al.

FOREIGN PATENT DOCUMENTS
WO       99/00949       1/1999

OTHER PUBLICATIONS
Extended European Search Report issued in corresponding European Patent Application No. 07101851.9, on Jun. 15, 2007.

*Primary Examiner* — Yong Zhou
(74) *Attorney, Agent, or Firm* — Staas & Halsey LLP

(57) ABSTRACT

A unicast-use tunnel is added between the Note-C and GW-B (i.e., a unicast optimization). Then, the Note-C transmits, to a GW-C, a second IP packet encapsulating a first IP packet, to which an inter-GW header is added, by an IP header to which a multicast address is set. The multicast-use second IP packet is transferred to a CE by way of a tunnel. The CE copies the received second IP packet and transfers it to a GW-A and the GW-B by way of the tunnel (i.e., a multicast optimization).

28 Claims, 51 Drawing Sheets

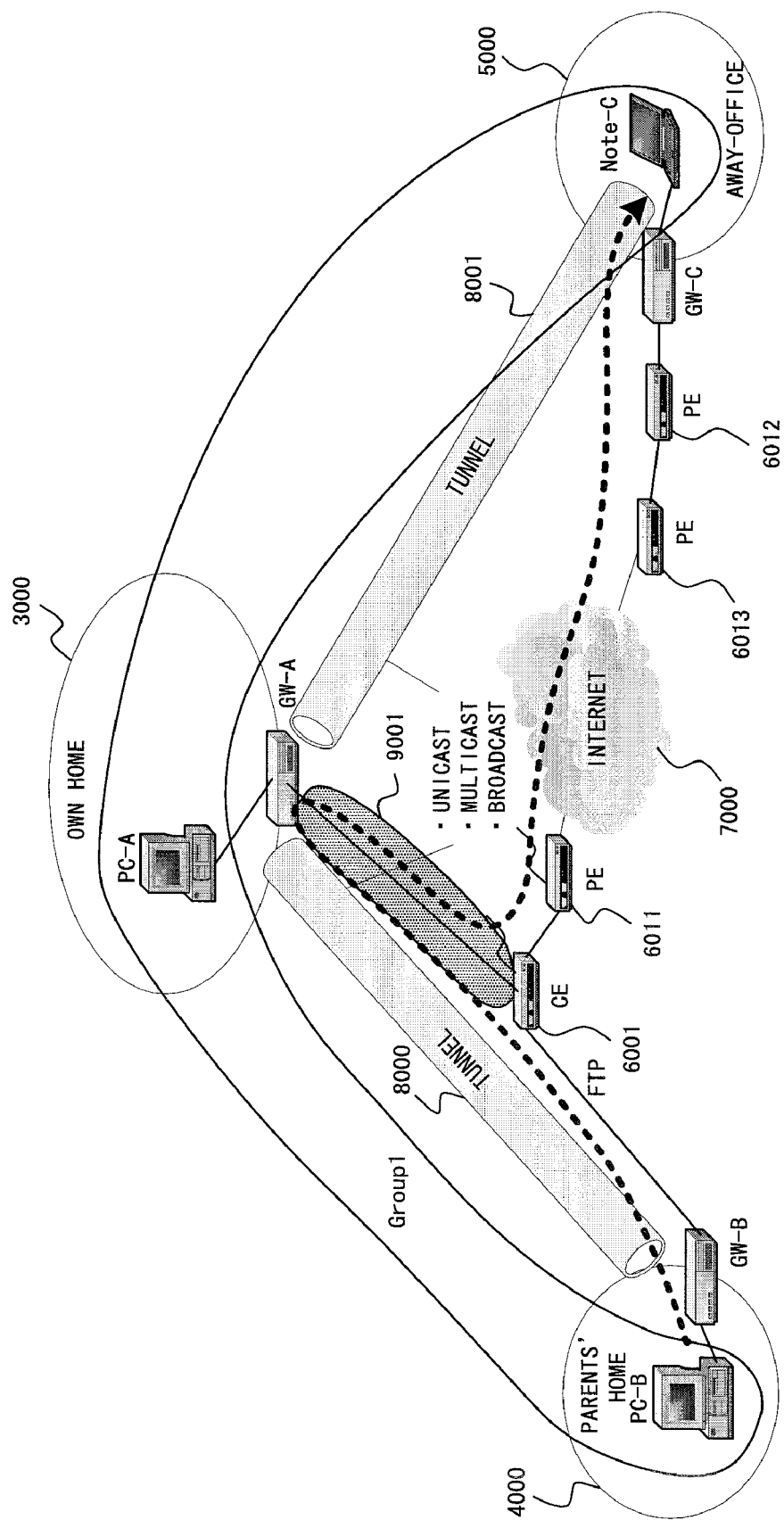

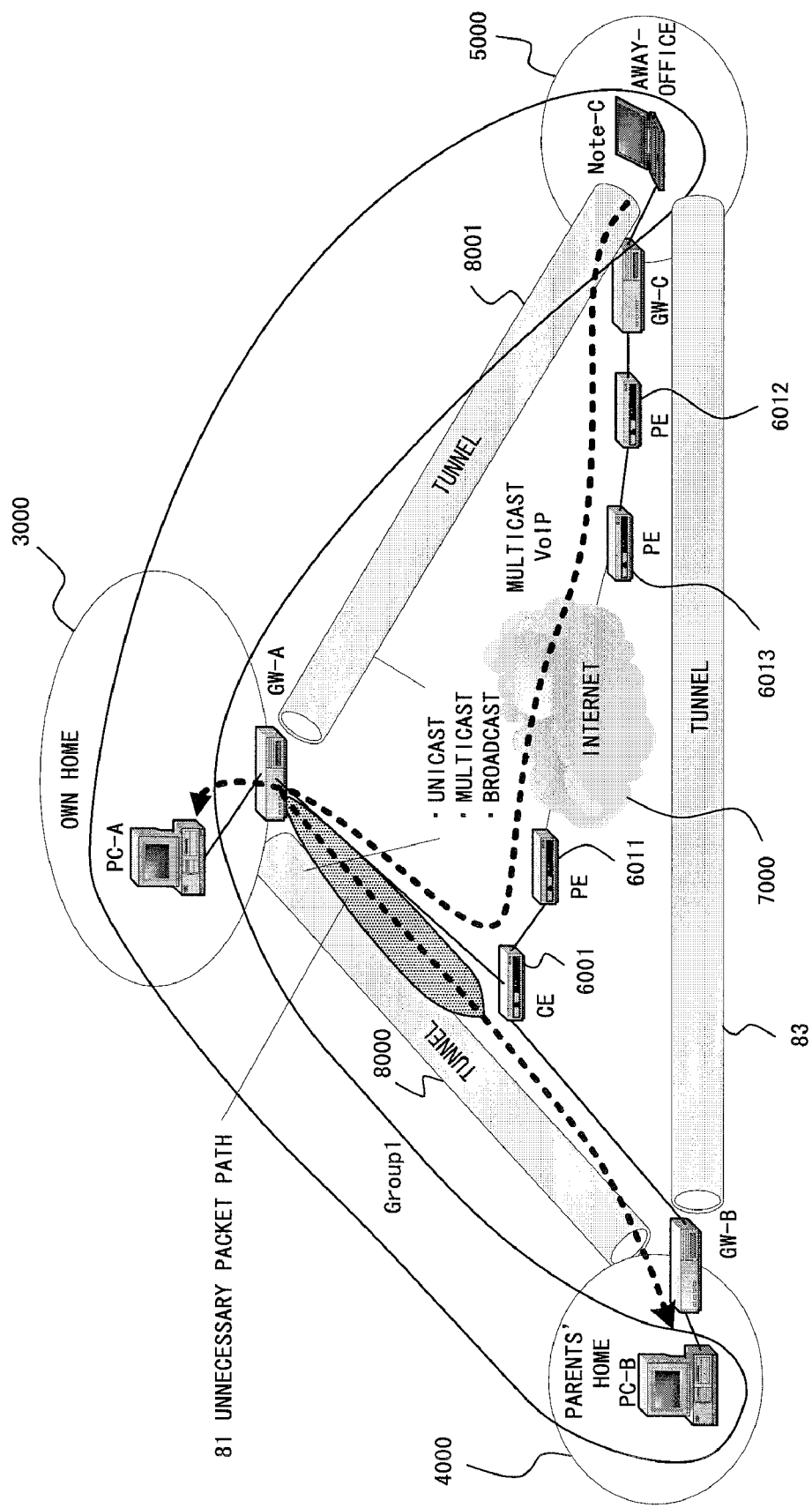
F I G. 4

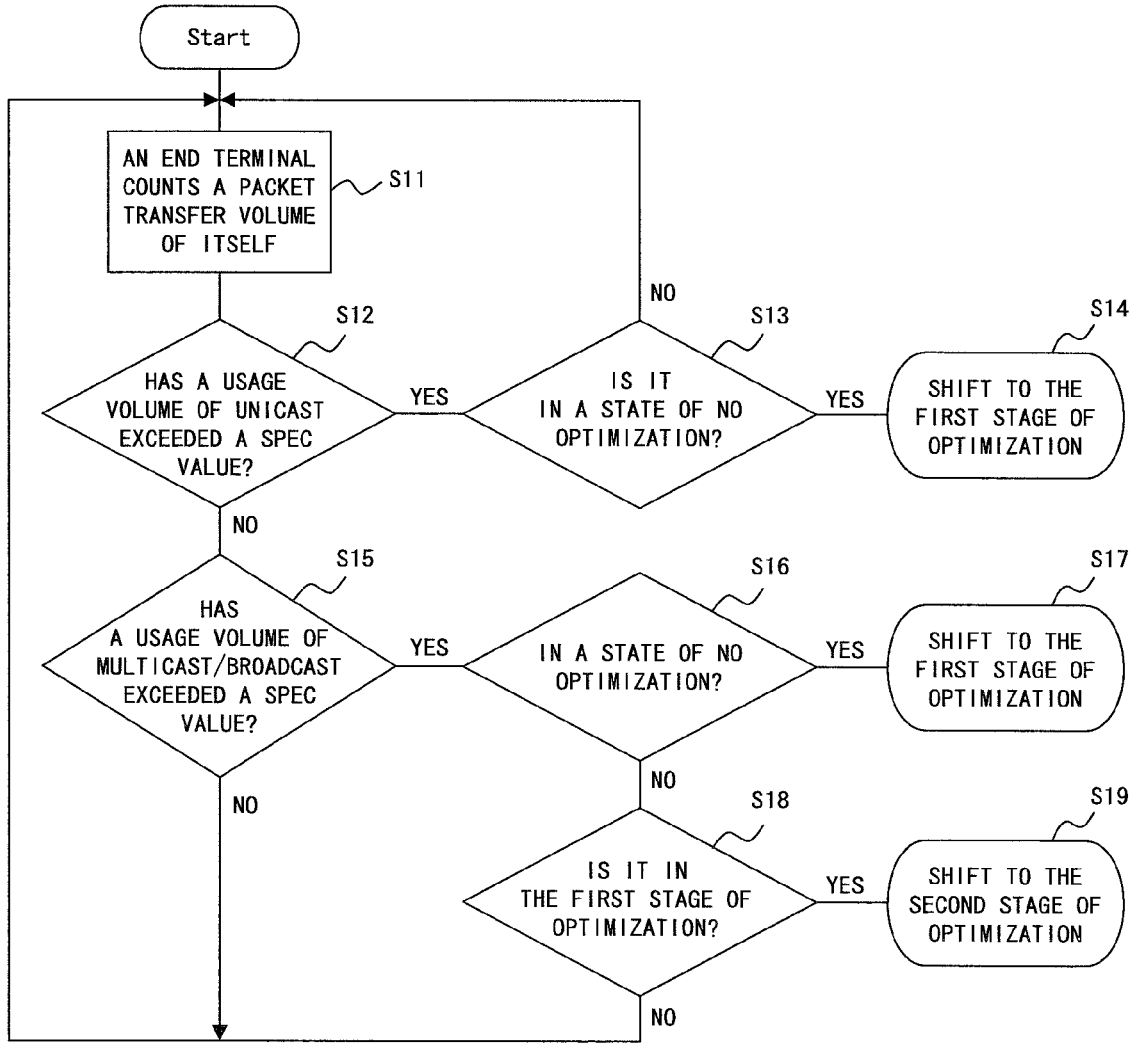
F I G. 7

200A Local TABLE

| R-IP | SN | GN |
|---|---|---|
| a | 101 | 1 |
| Broad | 255 | 1 |
| Multi1 | 900 | 1 |

FIG. 11A

210A RouteCode TABLE

| RouteCode |
|---|
| AC |
|  |

FIG. 11B

220A Global TABLE

| V-IP | DN | GN | LTN | SubLTN |
|---|---|---|---|---|
| bD | 102 | 1 | 1 | — |
| cD | 103 | 1 | 2 | 5 |
| Broad | 255 | 1 | 3 | — |
| Multi1 | 900 | 1 | 4 | — |

FIG. 11C

230A RECEPTION TRANSFER TABLE

| TN | LTN | SubLTN |
|---|---|---|
| 1 | Local | — |

FIG. 11D

240A TRANSMISSION TRANSFER TABLE

| LTN | TN | GN | OutPort |
|---|---|---|---|
| 1 | 1 | 10 | AB |
| 2 | 2 | 10 | AB |
| 3 | 3 | 10 | AB |
| 4 | 4 | 10 | AB |
| 5 | 1 | 20 | AC |

| R-IP | SN | GN |
|---|---|---|
| c | 103 | 20 |
| Broad | 255 | 20 |
| Multi1 | 900 | 20 |

F I G. 1 3 A

210C

| RouteCode |
|---|
| AC |
|  |

F I G. 1 3 B

220C

| V-IP | DN | GN | LTN | SubLTN |
|---|---|---|---|---|
| aD | 101 | 20 | 1 | 5 |
| bD | 102 | 20 | 2 | — |
| Broad | 255 | 20 | 3 | — |
| Multi1 | 900 | 20 | 4 | — |

F I G. 1 3 C

230C

| TN | LTN | SubLTN |
|---|---|---|
| 1 | Local | — |

F I G. 1 3 D

240C

| LTN | TN | GN | OutPort |
|---|---|---|---|
| 1 | 5 | 10 | CB |
| 2 | 1 | 10 | CB |
| 3 | 6 | 10 | CB |
| 4 | 7 | 10 | CB |
| 5 | 1 | 1 | CA |

F I G. 1 3 E

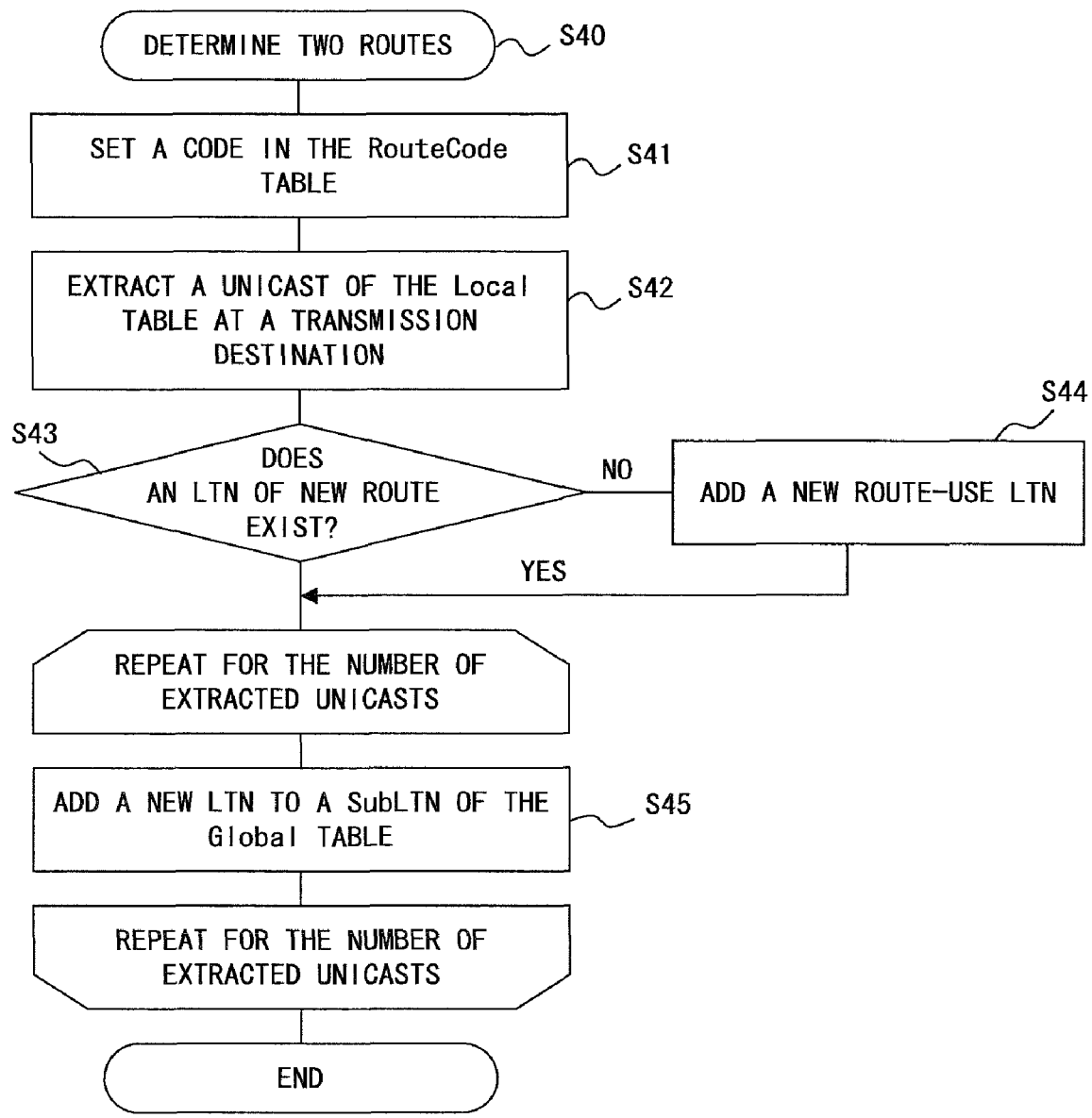
F I G. 1 4

200A Local TABLE

| R-IP | SN | GN |
|---|---|---|
| a | 101 | 1 |
| Broad | 255 | 1 |
| Multi1 | 900 | 1 |

F I G. 1 8 A

210A RouteCode TABLE

| RouteCode |
|---|
|  |
|  |

F I G. 1 8 B

220A Global TABLE

| V-IP | DN | GN | LTN | SubLTN |
|---|---|---|---|---|
| bD | 102 | 1 | 1 | — |
| cD | 103 | 1 | 5 | — |
| Broad | 255 | 1 | 3 | — |
| Multi1 | 900 | 1 | 4 | — |

F I G. 1 8 C

230A RECEPTION TRANSFER TABLE

| TN | LTN | SubLTN |
|---|---|---|
| 1 | Local | — |

F I G. 1 8 D

240A TRANSMISSION TRANSFER TABLE

| LTN | TN | GN | OutPort |
|---|---|---|---|
| 1 | 1 | 10 | AB |
| — | — | — | — |
| 3 | 3 | 10 | AB |
| 4 | 4 | 10 | AB |
| 5 | 1 | 20 | AC |

F I G. 1 8 E

200B

| R-IP | SN | GN |
|---|---|---|
| b | 102 | 10 |
| Broad | 255 | 10 |
| Multi1 | 900 | 10 |

F I G. 1 9 A

210B

| RouteCode |
|---|
|  |

F I G. 1 9 B

220B

| V-IP | DN | GN | LTN | SubLTN |
|---|---|---|---|---|
| aD | 101 | 10 | 1 | — |
| cD | 103 | 10 | 2 | — |
| Broad | 255 | 10 | 3 | — |
| Broad | 255 | 10 | 4 | — |

F I G. 1 9 C

230B

| TN | LTN | SubLTN |
|---|---|---|
| 1 | Local | — |
| — | — | — |
| 3 | Local, 2 | — |
| 4 | 5 | — |
| — | — | — |
| 6 | Local, 1 | — |
| 7 | 6 | — |

F I G. 1 9 D

240B

| LTN | TN | GN | OutPort |
|---|---|---|---|
| 1 | 1 | 1 | BA |
| 2 | 1 | 20 | BC |
| 3 | 1 | 1 | BA |
| 4 | 1 | 20 | BC |
| 5 | 1 | 20 | BC |
| 6 | 1 | 1 | BA |

| R-IP | SN | GN |
|---|---|---|
| c | 103 | 20 |
| Broad | 255 | 20 |
| Multi1 | 900 | 20 |

| RouteCode |
|---|
| AC |
|  |

| V-IP | DN | GN | LTN | SubLTN |
|---|---|---|---|---|
| aD | 101 | 20 | 5 | — |
| bD | 102 | 20 | 2 | — |
| Broad | 255 | 20 | 3 | — |
| Multi1 | 900 | 20 | 4 | — |

| TN | LTN | SubLTN |
|---|---|---|
| 1 | Local | — |

| LTN | TN | GN | OutPort |
|---|---|---|---|
| — | — | — | — |
| 2 | 1 | 10 | CB |
| 3 | 6 | 10 | CB |
| 4 | 7 | 10 | CB |
| 5 | 1 | 1 | CA |

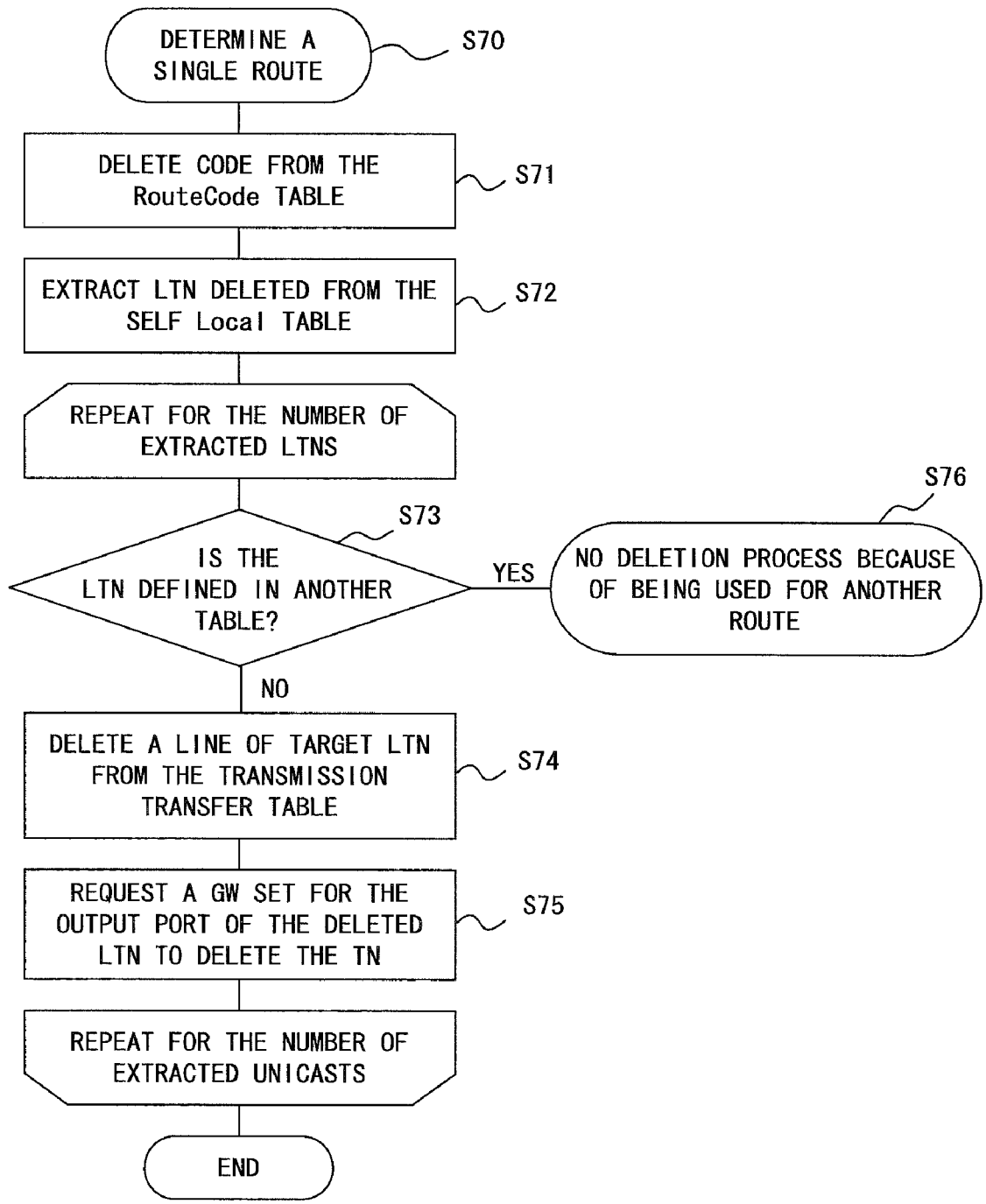
F I G. 2 1

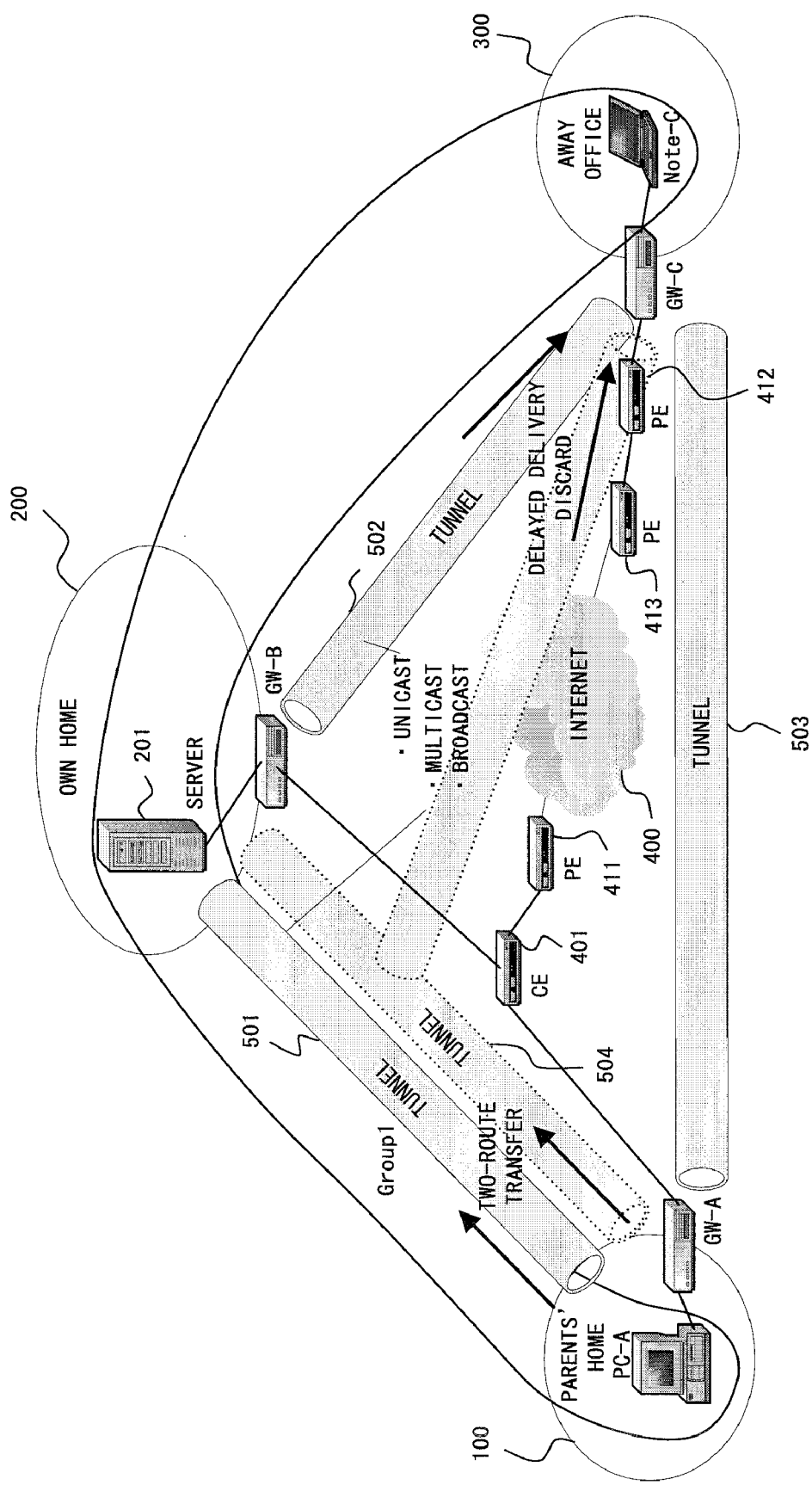
F I G. 2 8

200A Local TABLE

| R-IP | SN | GN |
|---|---|---|
| a | 101 | 1 |
| Broad | 255 | 1 |
| Multi1 | 900 | 1 |

F I G. 3 0 A

240A RouteCode TABLE

| RouteCode |
|---|
| ABC |
|  |

F I G. 3 0 B

220A Global TABLE

| V-IP | DN | GN | LTN | SubLTN |
|---|---|---|---|---|
| bD | 102 | 1 | 1 | — |
| cD | 103 | 1 | 5 | — |
| Broad | 255 | 1 | 3 | 2 |
| Multi1 | 900 | 1 | 4 | 2 |

F I G. 3 0 C

230A RECEPTION TRANSFER TABLE

| TN | LTN | GN | SubLTN |
|---|---|---|---|
| 1 | Local | — | — |
| 2 | Local | 1 | — |

F I G. 3 0 D

240A TRANSMISSION TRANSFER TABLE

| LTN | TN | GN | OutPort |
|---|---|---|---|
| 1 | 1 | 10 | AB |
| 2 | 2 | — | ABC |
| 3 | 3 | 10 | AB |
| 4 | 4 | 10 | AB |
| 5 | 1 | 20 | AC |

F I G. 3 0 E

200B

| R-IP | SN | GN |
|---|---|---|
| b | 102 | 10 |
| Broad | 255 | 10 |
| Multi1 | 900 | 10 |

F I G. 3 1 A

210B

| RouteCode |
|---|
| ABC |

F I G. 3 1 B

220B

| V-IP | DN | GN | LTN | SubLTN |
|---|---|---|---|---|
| aD | 101 | 10 | 1 | — |
| cD | 103 | 10 | 2 | — |
| Broad | 255 | 10 | 3 | 7 |
| Broad | 255 | 10 | 4 | — |

F I G. 3 1 C

230B

| TN | LTN | GN | SubLTN |
|---|---|---|---|
| 1 | Local | — | — |
| 2 | Local | 10 | — |
| 3 | Local, 2 | — | — |
| 4 | 5 | — | — |
| — | — | — | — |
| 6 | Local, 1 | — | — |
| 7 | 6 | — | — |

F I G. 3 1 D

240B

| LTN | TN | GN | OutPort |
|---|---|---|---|
| 1 | 1 | 1 | BA |
| 2 | 1 | 20 | BC |
| 3 | 1 | 1 | BA |
| 4 | 1 | 20 | BC |
| 5 | 1 | 20 | BC |
| 6 | 1 | 1 | BA |
| 7 | 2 | — | ABC |

F I G. 3 1 E

200C

| R-IP | SN | GN |
|---|---|---|
| c | 103 | 20 |
| Broad | 255 | 20 |
| Multi1 | 900 | 20 |

F I G. 3 2 A

210C

| RouteCode |
|---|
| ABC |
|  |

F I G. 3 2 B

220C

| V-IP | DN | GN | LTN | SubLTN |
|---|---|---|---|---|
| aD | 101 | 20 | 5 | — |
| bD | 102 | 20 | 2 | — |
| Broad | 255 | 20 | 3 | 1 |
| Multi1 | 900 | 20 | 4 | 1 |

F I G. 3 2 C

230C

| TN | LTN | GN | SubLTN |
|---|---|---|---|
| 1 | Local | — | — |
| 2 | Local | 20 | — |

F I G. 3 2 D

240C

| LTN | TN | GN | OutPort |
|---|---|---|---|
| 1 | 2 | — | ABC |
| 2 | 1 | 10 | CB |
| 3 | 6 | 10 | CB |
| 4 | 7 | 10 | CB |
| 5 | 1 | 1 | CA |

F I G. 3 2 E

200A Local TABLE

| R-IP | SN | GN |
|---|---|---|
| a | 101 | 1 |
| Broad | 255 | 1 |
| Multi1 | 900 | 1 |

F I G. 3 5 A

240A RouteCode TABLE

| RouteCode |
|---|
|  |
|  |

F I G. 3 5 B

220A Global TABLE

| V-IP | DN | GN | LTN | SubLTN |
|---|---|---|---|---|
| bD | 102 | 1 | 1 | — |
| cD | 103 | 1 | 5 | — |
| Broad | 255 | 1 | 2 | — |
| Multi1 | 900 | 1 | 2 | — |

F I G. 3 5 C

230A RECEPTION TRANSFER TABLE

| TN | LTN | GN | SubLTN |
|---|---|---|---|
| 1 | Local | — | — |
| 2 | Local | 1 | — |

F I G. 3 5 D

240A TRANSMISSION TRANSFER TABLE

| LTN | TN | GN | OutPort |
|---|---|---|---|
| 1 | 1 | 10 | AB |
| 2 | 2 | — | ABC |
| — | — | — | — |
| — | — | — | — |
| 5 | 1 | 20 | AC |

F I G. 3 5 E

200B

| R-IP | SN | GN |
|---|---|---|
| b | 102 | 10 |
| Broad | 255 | 10 |
| Multi1 | 900 | 10 |

F I G. 3 6 A

210B

| RouteCode |
|---|
|  |

F I G. 3 6 B

220B

| V-IP | DN | GN | LTN | SubLTN |
|---|---|---|---|---|
| aD | 101 | 10 | 1 | — |
| cD | 103 | 10 | 2 | — |
| Broad | 255 | 10 | 3 | — |
| — | — | — | — | — |

F I G. 3 6 C

230B

| TN | LTN | GN | SubLTN |
|---|---|---|---|
| 1 | Local | — | — |
| 2 | Local | 10 | — |
| — | — | — | — |
| — | — | — | — |
| — | — | — | — |
| — | — | — | — |
| — | — | — | — |
| — | — | — | — |

F I G. 3 6 D

240B

| LTN | TN | GN | OutPort |
|---|---|---|---|
| 1 | 1 | 1 | BA |
| 2 | 1 | 20 | BC |
| — | — | — | — |
| — | — | — | — |
| — | — | — | — |
| — | — | — | — |
| 7 | 2 | — | ABC |

F I G. 3 6 E

200C

| R-IP | SN | GN |
|---|---|---|
| c | 103 | 20 |
| Broad | 255 | 20 |
| Multi1 | 900 | 20 |

F I G. 3 7 A

210C

| RouteCode |
|---|
|  |

F I G. 3 7 B

220C

| V-IP | DN | GN | LTN | SubLTN |
|---|---|---|---|---|
| aD | 101 | 20 | 5 | — |
| bD | 102 | 20 | 2 | — |
| Broad | 255 | 20 | 1 | — |
| Multi1 | 900 | 20 | 1 | — |

F I G. 3 7 C

230C

| TN | LTN | GN | SubLTN |
|---|---|---|---|
| 1 | Local | — | — |
| 2 | Local | 20 | — |

F I G. 3 7 D

240C

| LTN | TN | GN | OutPort |
|---|---|---|---|
| 1 | 2 | — | ABC |
| 2 | 1 | 10 | CB |
| — | — | — | — |
| — | — | — | — |
| 5 | 1 | 1 | CA |

F I G. 3 7 E

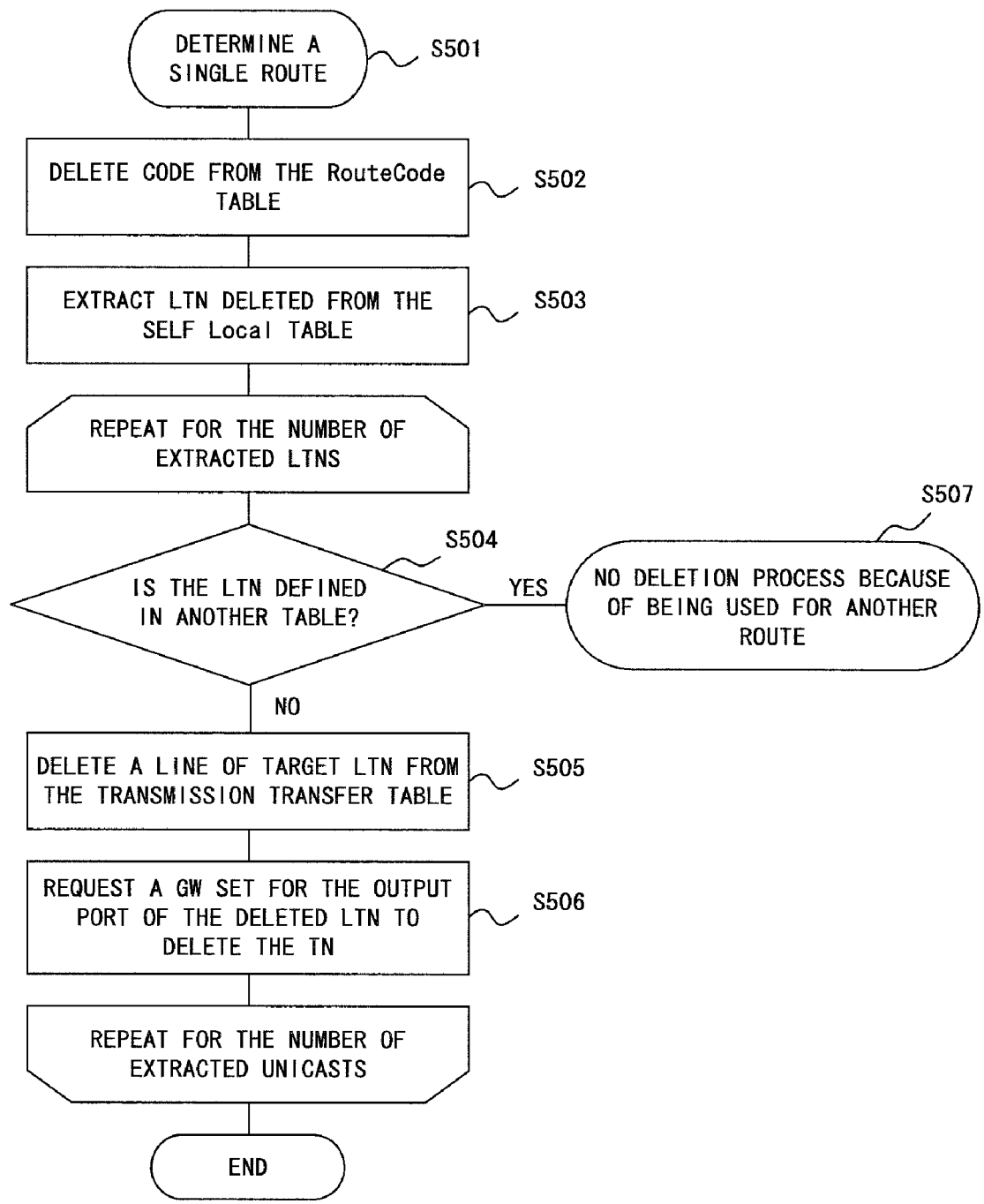
F I G. 38

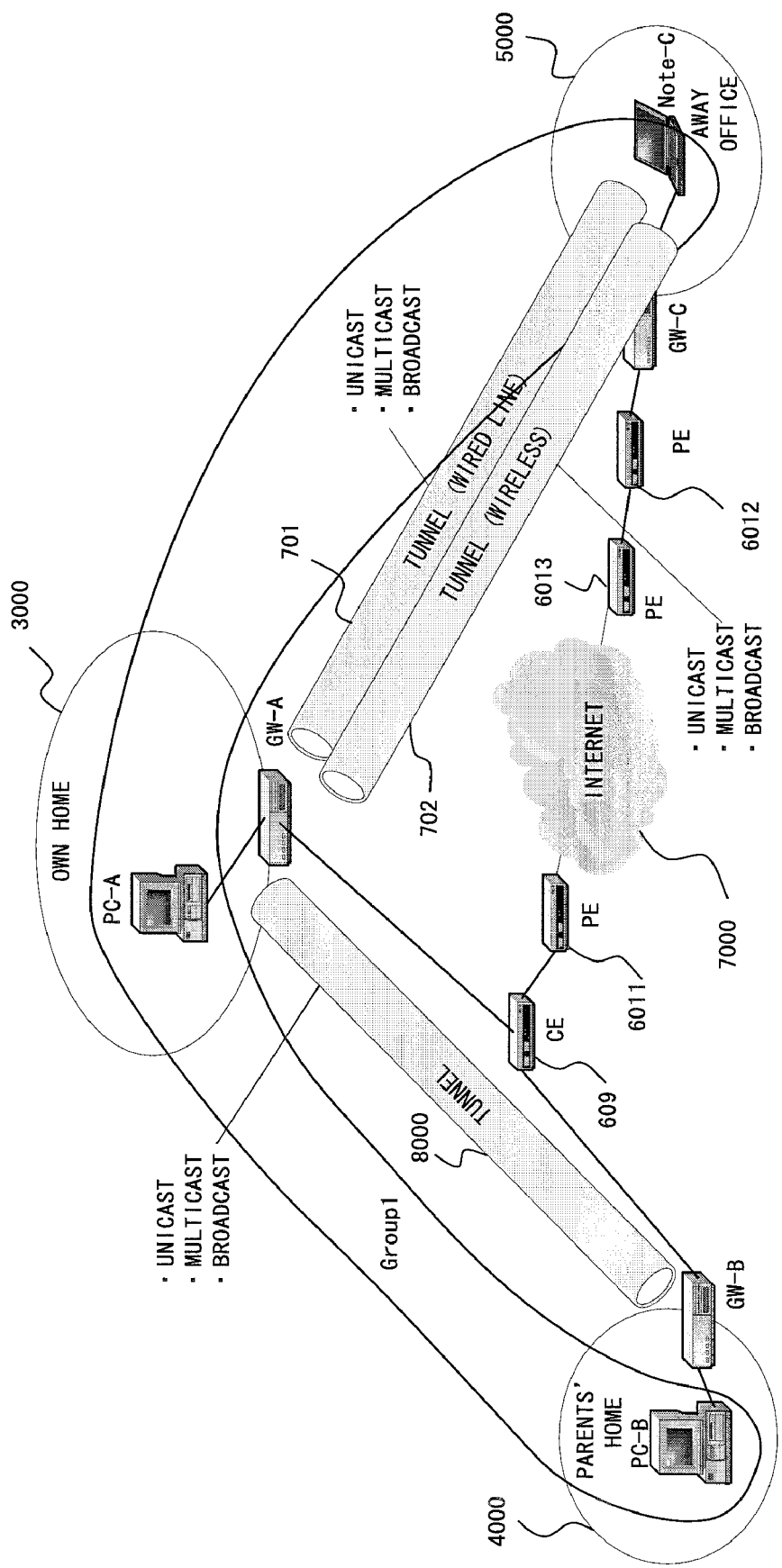
F I G. 44

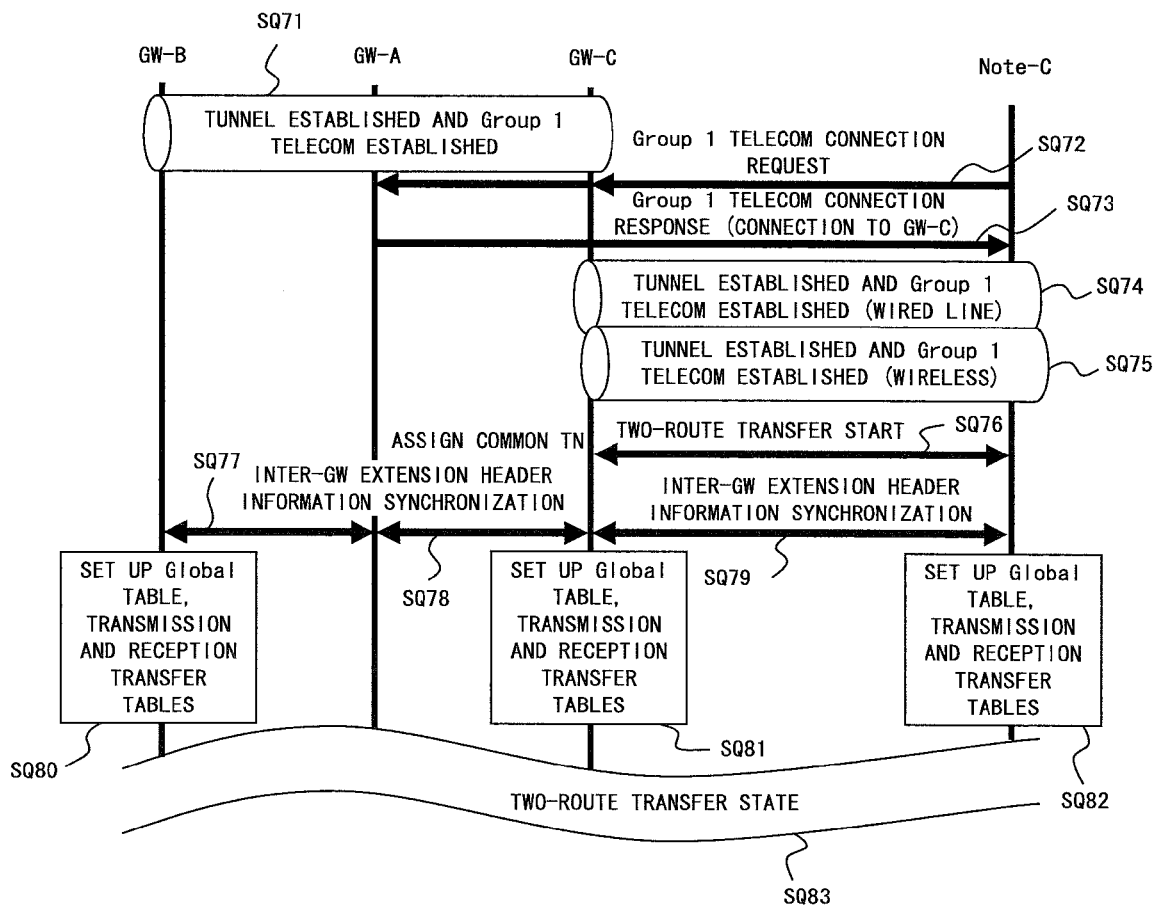
F I G. 47

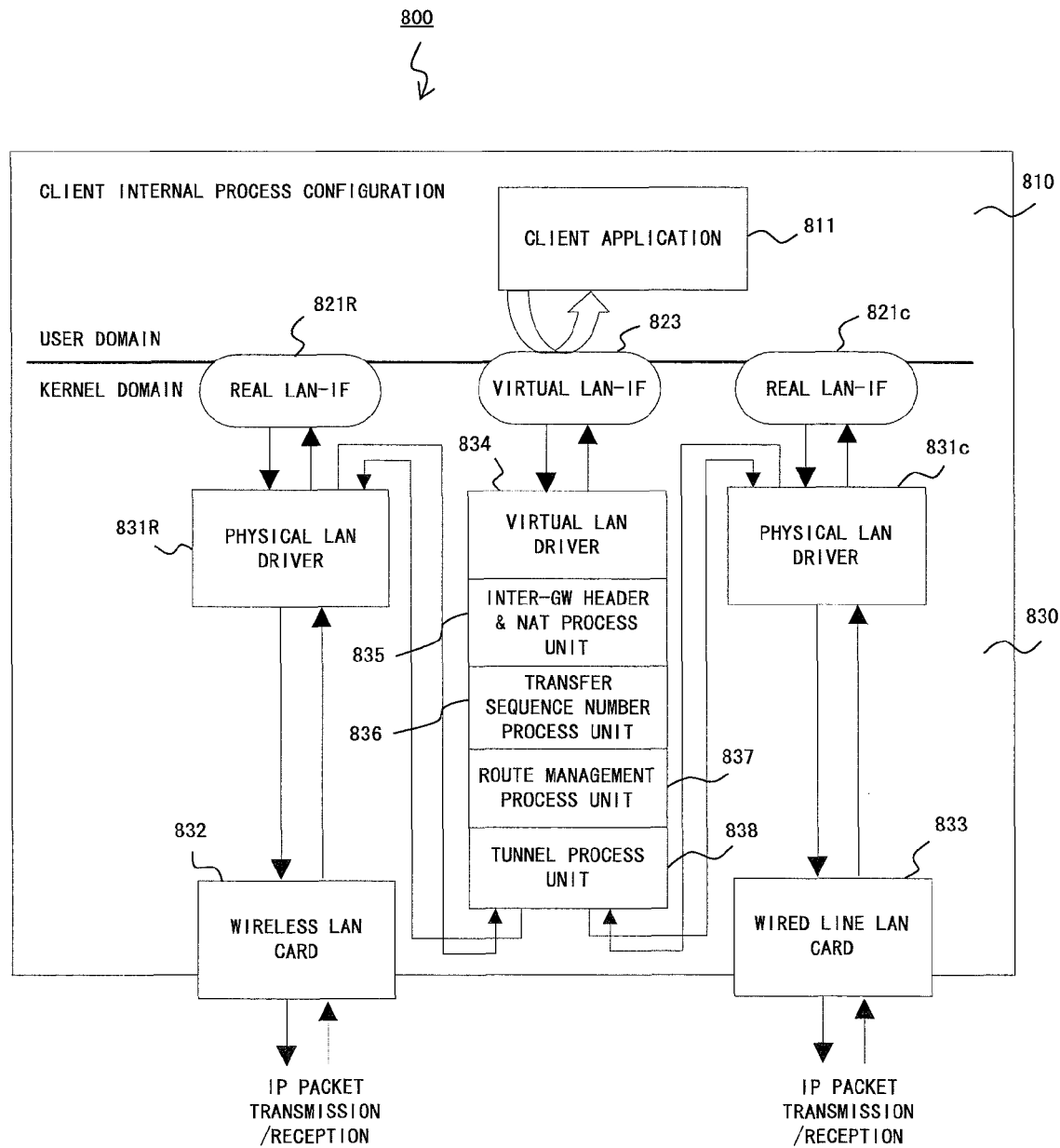
F I G. 4 8

PACKET RELAY APPARATUS

BACKGROUND OF THE INVENTION

1. Field of the Invention

The present invention relates to a technique virtually grouping an arbitrary host connected by a communication network and providing a private network.

2. Description of the Related Art

Recent years have been witnessing transitions of networks to Internet Protocol (IP) networks. Recent IP networks also enable a connection of a host in addition to a personal computer (abbreviated as "PC" hereinafter). Here, a host other than a PC generally means equipment such as home electric appliances enabled for an IP communication.

A host connected to an IP network has predominantly been a highly-functional PC in the past; home electric appliances compatible with the IP (noted as "IP compatible home electric appliance" hereinafter) are now beginning to be connected. Therefore, the usage aspects of the IP network extend now to a control of an IP compatible home electric appliance and an exchange of contents between the IP compatible home electric appliances. This in turn increases the number and kind of equipment (noted as "host" hereinafter) capable of performing an IP communication. A low-functional host, which has not conventionally been connected, is also beginning to be connected now.

As the number of hosts connected to the IP network thusly increases, arisen is a necessity of an easy host management by grouping the hosts. Increase of low-functional hosts, which are connected IP network, brings about a necessity of accomplishing an inter-group communication by a simple method with a less load on the hosts.

This makes one consider a method for building up a grouping by means of a virtual private network (VPN) to accomplish a communication between the hosts. What is set up in this case is a tunnel connection or such which considers a security between networks setting up a VPN. Here, the tunnel connection means, supposing there is a connection structure of a PC1 to a GW1 to a GW2 to a PC2, a tunnel connection between the GW1 and GW2 in the case of structuring a VPN between the PC1 and PC2. Note that the PC1 and PC2 are personal computers, and the GW1 and GW2 are gateways. In the thusly tunnel-connected network, a temporary IP address is assigned to each host. And communication between the hosts is accomplished by an IP routing processing using the temporary IP address.

The present applicant of the present invention has filed, through a PCT application, an invention (i.e., a first conventional invention) related to an intra-group communication (i.e., an inter-group member communication) in which hosts (i.e., group members) belonging to the same group carry out a closed IP packet communication within a group (refer to a patent document 1). Also filed with the Japan Patent Office is an invention (i.e., a second conventional invention) related to a packet relay apparatus capable of transferring a function, which a GW building up a virtual closed network transfers a broadcast/multicast-use packet within the virtual closed network, by a virtual multicast address/virtual broadcast address which is closed between the GWs, as an invention further progressed from the above described invention (refer to a patent document 2). Also filed with the Japan Patent Office is an invention (i.e., a third conventional invention) related to a method for improving packet transfer efficiency between GWs by adding a unique header to an IP packet in a communication between the GWs which are tunnel-connected, and for a client side to add a unique header to the IP packet by extending the tunnel connection to a section between the GW and client (refer to a patent document 3). A method according to the third conventional invention is configured to carry out a communication between the GWs through a tunnel connection, thereby enabling a direct communication between the GWs. Because of this, it is configured to transfer by applying the process for converting an address part of an IP header into a serial number, group number (i.e., an inter-GW header) or such, or for adding the serial number, group number or such to the IP header, so as to enable an efficient packet transfer between the GWs without using an IP address. Furthermore, a client is enabled to process the inter-GW header so that the client can establish a tunnel connection to the GW.

Patent document 1: WO 2005/027438 A1
Patent document 2: PCT/JP 2005/003788
Patent document 3: PCT/JP 2006/305840
Non-patent document 1: RFC 1631
Non-patent document 2: RFC 23911

However, the already-filed conventional inventions described above are faced with the problems as shown in the following paragraphs 1) and 2).

1) In a communication between clients (i.e., terminals) and between GWs which are close to each other, respectively, in terms of network, an extraneous packet transfer occurs depending on a path of a tunnel connection; and 2) Recently, a single client (i.e., a terminal) comprises various communication means such as a wired line/wireless for an IP communication with a capability of selecting communication means to be used from among the plurality thereof when the client carrying out an IP communication. However, the client is not seamlessly enabled the plurality of communication means to switch over in the midst of an IP communication.

Referring to the accompanying drawing explains the specific of the problem of the above paragraph 1).

FIG. 1 shows an example of a system that has grouped hosts in an IP network (i.e., a network system).

The IP network shown in FIG. 1 comprises a home network 3000, a parents' home network 4000 and a network at a business trip destination (which is named as "away-office network" hereinafter) 5000, as local networks. The home network 3000 is constituted by a gateway GW-A (abbreviated as GW-A hereinafter), a PC-A (which is a desktop PC) and a Note-C (which is a laptop PC) that are connected to the GW-A.

The parents' home network 4000 is constituted by a gateway GW-B (abbreviated as GW-B hereinafter) and a PC-B (which is a desktop PC) connected to the GW-B. The away-office network 5000 comprises a gateway GW-C (abbreviated as GW-C hereinafter).

Here, each of the GW-A and GW-B is a packet relay apparatus capable of processing an IP packet attached with an inter-GW header disclosed in the patent document 3. Meanwhile, the GW-C is a packet relay apparatus capable of processing only a common IP packet not attached with the inter-GW header. The Note-C is a client (i.e., a terminal) capable of processing an IP packet attached by an inter-GW header disclosed as the fifth embodiment of the patent document 3.

The GW-A and GW-B are mutually connected with a communication line by way of a CE 6001. And the GW-C is connected to the CE 6001 by way of the Internet 7000. The CE 6001 is connected to the Internet 7000 by way of a PE 6011. The GW-C is connected to the Internet 7000 by way of the PE 6012 and PE 6013. The GW-A and GW-B are tunnel-connected together by the IP packet attached with the inter-GW header, and a tunnel 8000 is set between the two.

In the IP network configured as described above, the PC-A and Note-C under the control of the GW-A within the network 3000, and the PC-B under the control of the GW-B with the network 4000 are managed so as to belong to a group 1 (Group1) by the GW-A and GW-B. A packet communication is enabled for the section between the GW-A and GW-B in a unicast, multicast and broadcast by utilizing the tunnel 8000.

Here, the CE 6001 is for example a Customer Edge (CE) device which is a piece of equipment to be terminated and which is an exit for connecting to a Multiprotocol Label Switching (MPLS) backbone of an Internet Service Provider (ISP)/carrier from an end user network in an MPLS-VPN (Virtual Private Network) and such. Also, the PE 6011, PE 6012 and PE 6013 are provider edge (PE) devices that are pieces of equipment placed at the endmost part connecting to the end user network in an MPLS network within an ISP/carrier.

FIG. 2 is a diagram showing the state of the Note-C having moved from the own home network system 3000 to the away-office network 5000 in an IP network. In the case of the Note-C thusly moving to another network within the IP network, the Note-C establishes a tunnel 8001 with the GW-A as an initial connection by utilizing the GW-C (and the tunnel 8001 is set up between the GW-A and Note-C in this event). In the case of the Note-C transferring a packet to the GW-B, the GW-A establishes a packet transfer process for the period between the Note-C and GW-B by utilizing the tunnels 8000 and 8001. In this event, when the PC-B within the network 4000 transfers a file to the Note-C within the network 5000 by File Transfer Protocol (FTP), the packet is transmitted from the PC-B to the Note-C by way of the GW-B, CE 6001, GW-A, CE 6001, PE 6011, PE 6013, PE 6012 and GW-C as indicated by the dotted line in FIG. 2.

In this case, an extraneous packet transfer occurs (i.e., an unnecessary packet path 9001 is formed) between the GW-A and CE 6001, because the packet goes back and forth between the GW-A and CE 6001. A load is levied also on the GW-B for a packet transfer process.

As described above, the packet relay apparatus (i.e., a GW) and terminal apparatus (i.e., a client) according to the invention disclosed by the patent document 3 have been faced with the problem of an extraneous packet transfer occurring by a connection path of a tunnel in a communication between a pair of clients or GWs which are close to each other in terms of a network.

Also, the GW and client according to the invention disclosed by the patent document 3 are not capable of managing a main route and sub-route, and therefore unable to switch over between the main route and sub-route, thus incapable of optimizing a tunnel connection path between the GWs or between the client and GW.

SUMMARY OF THE INVENTION

A purpose of the present invention is to provide a capability of changing a tunnel connection path between GWs or between the GW and client (i.e., terminal) seamlessly to a most optimum path. Another purpose of the present invention is to furnish a client (i.e., a terminal) comprising a plurality of IP communication-use communication means with a capability of changing over a plurality of communication means seamlessly at the time of performing an IP communication.

A packet relay apparatus according to the present invention premises one connecting a sub-network accommodated by the apparatus itself to a global network, grouping terminals within the sub-network virtually and building up a virtual private network by an inter-group member communication.

A packet relay apparatus according to a first aspect of the present invention comprises a storage unit which stores routing information, for use in an inter-group member communication, related to a main route, and a sub-route, of a first Internet protocol (IP) packet that is managed by an internal management transfer number for identifying a main route used for the inter-group communication, by a sub internal management transfer number for identifying a sub-route used for the inter-group communication, by a transfer number for identifying a transfer route of the first IP packet which is transferred to another packet relay apparatus and by a group number for identifying a group, and of a second IP packet for transmitting and receiving to and from a terminal under the control of the apparatus itself, and which stores route identification information that is information for identifying an event of being transferred by way of two routes, that is, the main route and sub-route; an information management unit for setting, and updating, the management information and route identification information stored in the storage unit; a first transmission/reception unit for transmitting and receiving the second IP packet between itself and the terminal under the control of the apparatus itself; a first packet creation unit for creating the first IP packet by adding an inter-packet relay apparatus header including information for use between the group members, information related to the main route, the route identification information and a packet identification information for identifying a packet to the second IP packet received by the first transmission/reception unit by referring to the routing information and route identification information which are stored in the storage unit; a second transmission/reception unit for transmitting the first IP packet created by the first packet creation unit to another packet relay apparatus by referring to the routing information and route identification information which are stored in the storage unit and also receiving the first IP packet addressed to a terminal under control of the apparatus itself from another packet relay apparatus; and a second packet creation unit for creating the second IP packet by deleting the inter-packet relay apparatus header from the first IP packet received by the second transmission/reception unit and outputs the second IP packet to the first transmission/reception unit.

The first aspect of the packet relay apparatus according to the present invention seamlessly and easily enables communication routes (i.e., packet transfer paths) to switch over between packet relay apparatuses in a network system by operating the routing information and route identification information. Therefore, a proper selection of a communication route with good transfer efficiency makes it possible to improve packet transfer efficiency.

A second aspect of the packet relay apparatus according to the present invention further comprises, in addition to the units comprised by the first aspect of the packet relay apparatus, a communication route optimization unit for optimizing a communication route for the first IP packet by updating the routing information and route identification information.

The packet relay apparatus according to the second aspect of the present invention makes it possible to optimize the packet transfer path in a network system.

A third aspect of the packet relay apparatus according to the present invention further comprises, in addition to the units comprised by the first aspect of the packet relay apparatus, a synchronous update unit for monitoring a usage condition of a communication route used by a terminal under the control of the apparatus itself for a communication of the second IP packet, and updating the routing information and route identification information synchronously with another packet relay apparatus placed in the communication route.

The packet relay apparatus according to the third aspect of the present invention enables a packet relay apparatus accommodating a terminal belonging to the same group to carry out a synchronous update process of the routing information and route identification information quickly in response to a condition change of a route used for inter-group communications.

A terminal apparatus according to the present invention premises one communicating an IP packet with a packet relay apparatus connecting a sub-network accommodated by the apparatus itself to a global network, grouping terminals within the sub-network virtually and building up a virtual private network by an inter-group member communication.

A first aspect of a terminal apparatus according to the present invention comprises a storage unit which stores routing information, for use in an inter-group member communication, related to a main route, and a sub-route, of a first Internet protocol (IP) packet that is managed by an internal management transfer number for identifying a main route used for the inter-group communication, by a sub internal management transfer number for identifying a sub-route used for the inter-group communication, by a transfer number for identifying a transfer route of the first IP packet which is transferred to another packet relay apparatus and by a group number for identifying a group, and of a second IP packet for processing a transmission and reception within the apparatus itself, and which stores route identification information that is information for identifying an event of being transferred by way of two routes, that is, the main route and sub-route;

an information management unit for setting, and updating, the management information and route identification information stored in the storage unit;

a first packet creation unit for creating the first IP packet by adding the second IP packet, for which a real IP address of the apparatus itself is set as a sender address of an IP header and a virtual IP address of a transmission destination terminal is set as a destination address, and an inter-packet relay apparatus header including information for use between the group member, information related to the main route, the route identification information and a packet identification number for identifying a packet by referring to the routing information stored in the storage unit;

a transmission/reception unit for transmitting the first IP packet created by the first packet creation unit to a packet relay apparatus accommodating the terminal apparatus itself by referring to the routing information and route identification information which are stored in the storage unit and also receiving the first IP packet from the packet relay apparatus; and a second packet creation unit for by deleting the inter-packet relay apparatus header from the first IP packet received by the transmission/reception unit, followed by creating the second IP packet by referring to the routing information stored in the storage unit.

The first aspect of the terminal apparatus according to the present invention makes it possible to switch over the packet transfer paths seamlessly and easily by updating the routing information and route identification information. Therefore, it is possible to improve packet transfer efficiency by the terminal apparatus side properly selecting a communication route with good transfer efficiency.

A second aspect of a terminal apparatus according to the present invention, in the first aspect of the terminal apparatus, the transmission/reception unit, comprising a communication unit used for a wired communication and one used for a wireless communication, transmits and receives the first IP packet to and from the packet relay apparatus by utilizing the wired communication-use communication unit and wireless communication-use communication unit.

The second aspect of the terminal apparatus according to the present invention enables a utilization of the wired communication-use communication unit and wireless communication-use communication unit when communicating the first IP packet. Therefore, the first IP packet can be communicated by utilizing both of the wired route and wireless route.

The present invention provides the following benefits:

(1) Packet transfer efficiency can be improved because communication paths can be changed at an opportune time in a communication between gateways, or between a client (i.e., a terminal) and a gateway; and (2) A client (i.e., a terminal) comprising a plurality of communication means that is enabled communication paths to switch over properly and seamlessly by changing over the plurality of communication means during a communication.

BRIEF DESCRIPTION OF THE DRAWINGS

FIG. 2 is a diagram showing a state of a Note-C having moved from an own home network system to an away-office network in the IP network shown in FIG. 1.

FIG. 4 is a diagram describing a problem occurring in the case of a multicast being carried out in the network system shown in FIG. 3.

FIG. 7 is a flow chart showing an algorithm of a tunnel route switching trigger process of a tunnel in a stepwise fashion by an end terminal according to the first embodiment.

FIGS. 11A through 11E are diagrams showing tables possessed by a GW-A of a network system according to the second embodiment.

FIGS. 13A through 13E are diagrams showing tables possessed by a GW-C of the network system according to the second embodiment.

FIG. 14 is a flow chart showing an internal table setup process of a GW-A at the time of determining two routes according to the second embodiment.

FIGS. 18A through 18E are diagrams showing states of internal tables of the GW-A when changing over routes, as shown in FIG. 10, according to the second embodiment.

FIGS. 19A through 19E are diagrams showing states of internal tables of the GW-B when changing over routes, as shown in FIG. 10, according to the second embodiment.

FIGS. 20A through 20E are diagrams showing states of internal tables of the GW-C when changing over routes, as shown in FIG. 10, according to the second embodiment.

FIG. 21 is a flow chart showing a procedure of an internal table setup process of the GW-A according to the second embodiment.

FIG. 28 is a diagram showing a state of temporary two-route transfer in a network system according to a fourth embodiment.

FIGS. 30A through 30E are diagrams showing a structure, and a state, of an internal table of a GW-A accomplishing a seamless path change method shown in FIG. 29 according to the fourth embodiment.

FIGS. 31A through 31E are diagrams showing a structure, and a state, of an internal table of a GW-B accomplishing a seamless path change method shown in FIG. 29 according to the fourth embodiment.

FIGS. 32A through 32E are diagrams showing a structure, and a state, of an internal table of a GW-C accomplishing a seamless path change method shown in FIG. 29 according to the fourth embodiment.

FIGS. 35A through 35E are diagrams showing contents of internal tables of the GW-A in the state shown in FIG. 34.

FIGS. 36A through 36E are diagrams showing contents of internal tables of the GW-B in the state shown in FIG. 34.

FIGS. 37A through 37E are diagrams showing contents of internal tables of the GW-C in the state shown in FIG. 34.

FIG. 38 is a flow chart showing a process for the GW-A changing the internal table from the state shown in FIG. 30 to the one shown in FIG. 35 according to the fourth embodiment.

FIG. 44 is a diagram showing a configuration example of a two-route connection of the Note-C according to a sixth embodiment.

FIG. 47 is a sequence diagram showing a process procedure for structuring a two-route connection for the Note-C shown in FIG. 46.

FIG. 48 is a diagram showing a system configuration of the Note-C shown in FIGS. 43 and 45.

DESCRIPTION OF THE PREFERRED EMBODIMENTS

The following is a description of the preferred embodiment of the present invention by referring to the accompanying drawings.

First Embodiment

Figure 1:
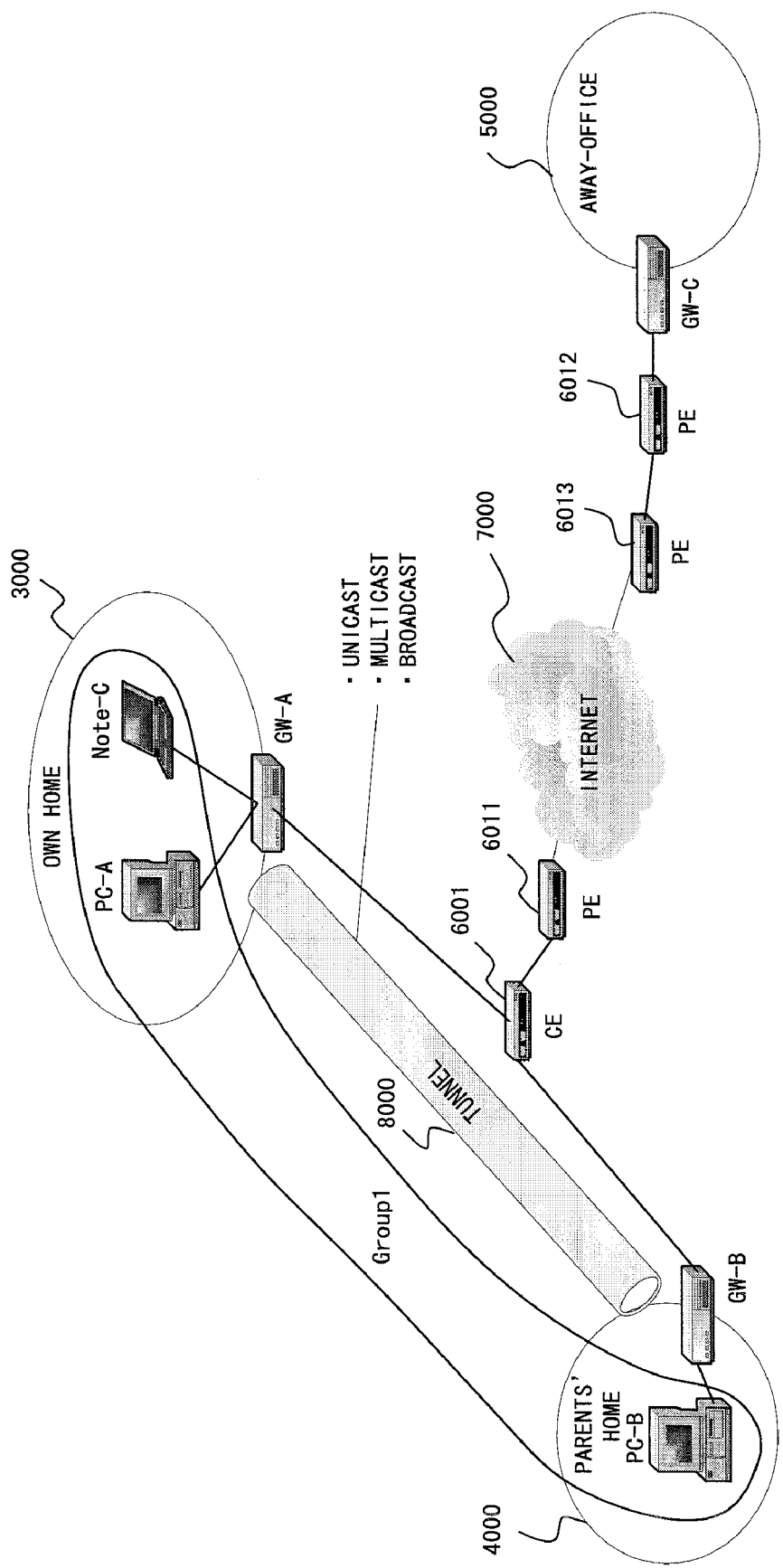
FIG. 1 exemplifies a system in which hosts are grouped in an IP network (i.e., a network system).
Figure 3:
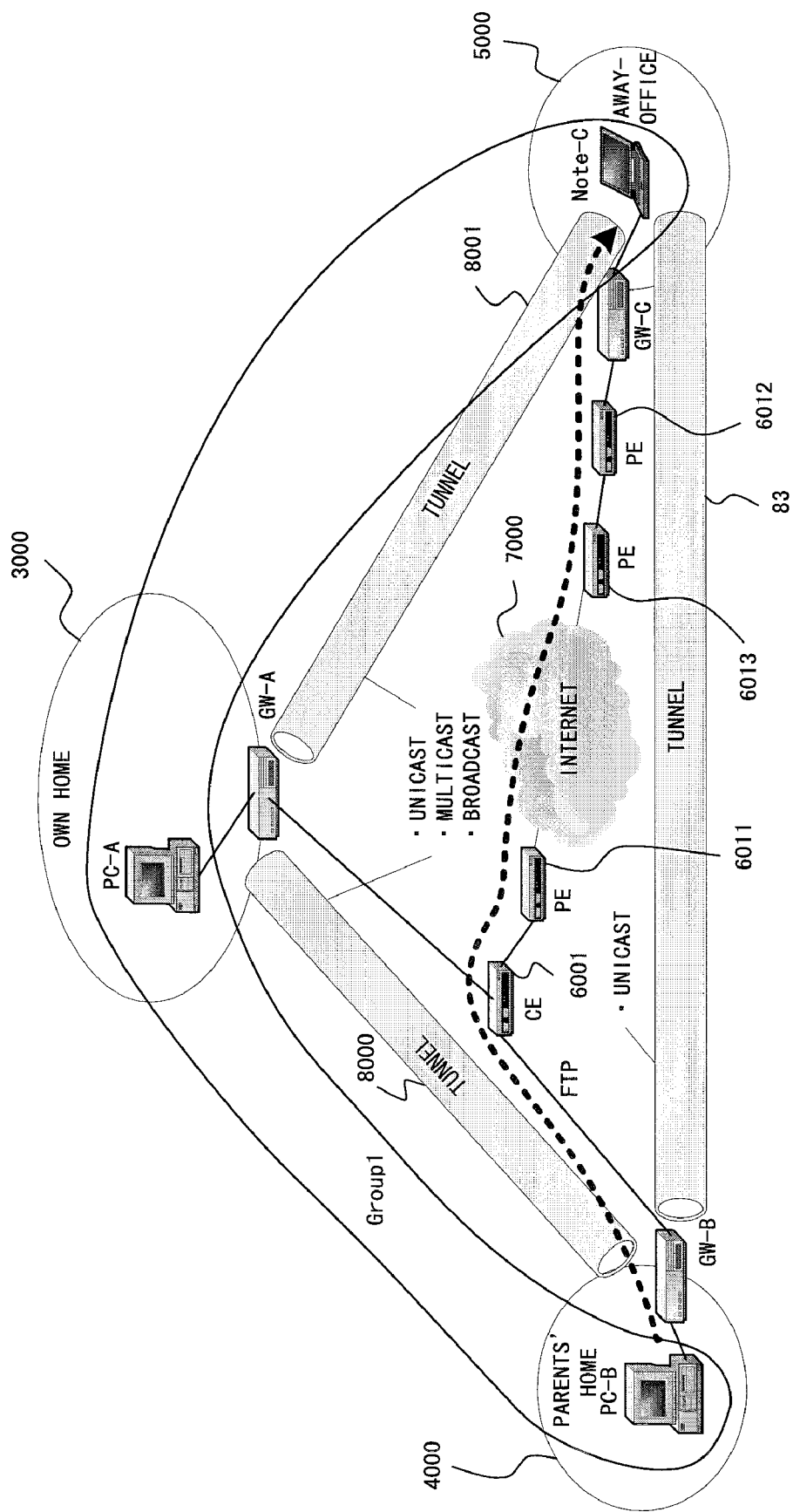
FIG. 3 is a diagram showing a network system as a target of optimization of a packet transfer path according to a first embodiment of the present invention.
Figure 5:
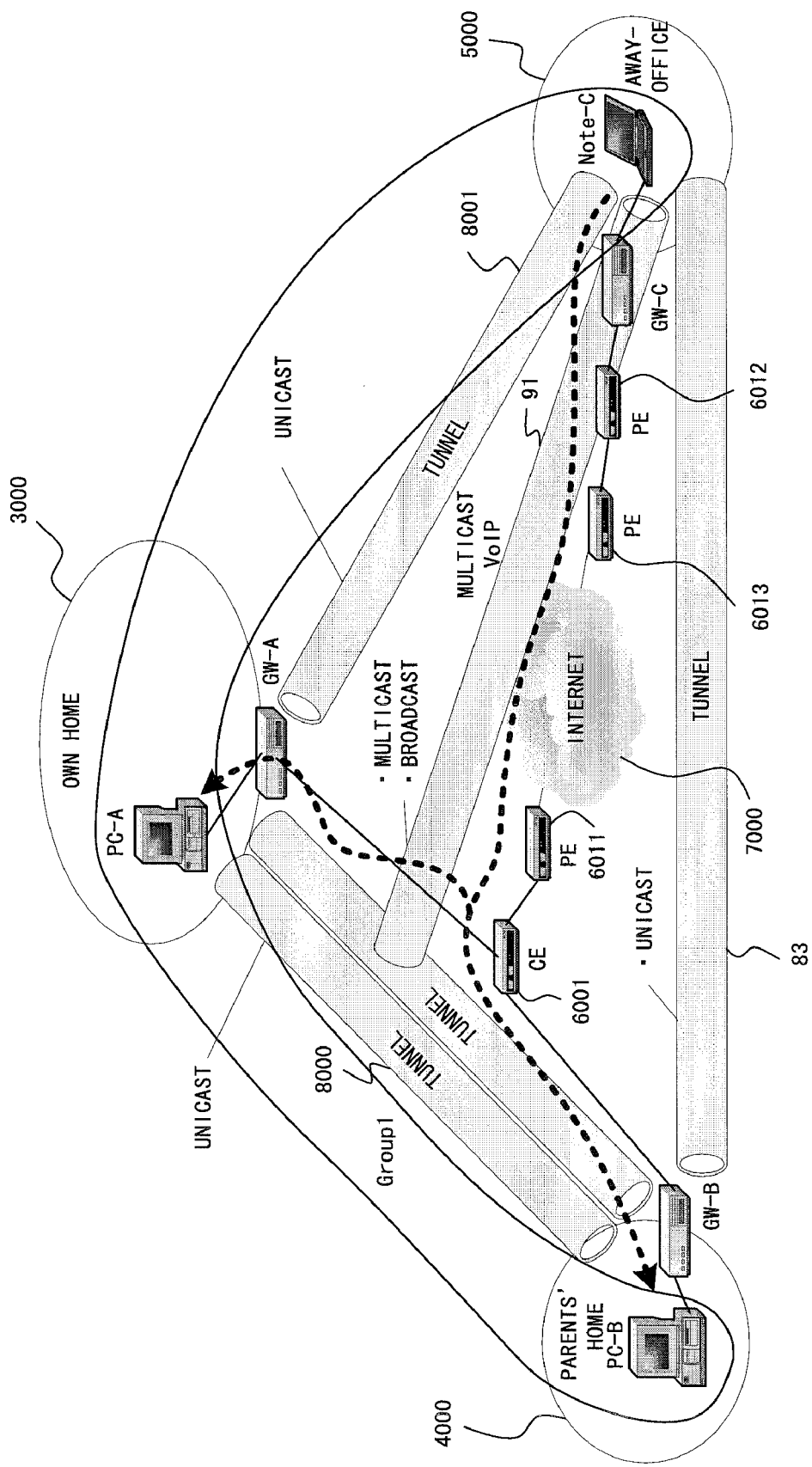
FIG. 5 is a diagram showing a method for optimizing the network system shown in FIG. 3.

The first embodiment provides a technique for optimizing an inter-GW communication path for eliminating the problem shown in FIG. 2. This technique is carrier out in two stages. Referring to FIGS. 3 through 5 hereby explains the technique. Note that the same component sign is assigned to the same configuration as in FIG. 2 in the showing of FIGS. 3 through 5 with the description thereof being omitted here.

<Technique for Optimizing a Communication Path>
{First Stage of Optimization}

FIG. 3 is a diagram showing a method of the first stage for optimizing a packet transfer path according to the first embodiment.

A supposition here is that a Note-C has moved from the own home network 3000 to an away-office network 5000 as shown in FIG. 2. In this case, the first stage to an optimized path first adds a communication path of a point-to-point (P to P) connection between the Note-C and GW-B as shown in FIG. 3. That is, a tunnel 83 for a unicast is established between the Note-C and GW-B. The tunnel 83 is physically established as a communication path by way of the GW-B, CE 6001, PE 6011, PE 6013, PE 6012, GW-C and Note-C. The establishment of the tunnel 83 is carried out by utilizing a technique disclosed by the fifth embodiment of the invention of the patent document 3. That is, the Note-C, comprising the same as a client according to the fifth embodiment of the patent document 3, is enabled to establish a tunnel 83 with the GW-A. Note that the present first embodiment is enabled to process only the common IP packet (i.e., an IP packet not encapsulated by an inter-GW header) in the period between the GW-C and CE 6001, and therefore a packet communication is performed in a unicast or broadcast/multicast by using an IP packet of a format shown in FIG. 6. A detail of the IP packet is described later.

By this setup, a unicast-use packet by the FTP and such from the PC-B to Note-C flows in the tunnel 83 as indicated by the dotted line arrow in FIG. 3. This configuration therefore alleviates a process load on the GW-A when performing a unicast packet communication between the PC-B and Note-C. Besides, an unnecessary unicast packet does not flow between the CE 6001 and GW-A and therefore the communication load (i.e., the traffic) is reduced in the IP network.

{Second Stage of Optimization}

The second stage to an optimized path optimizes a multicast and a broadcast.

FIG. 4 is a diagram describing a problem occurring in the case of carrying out a multicast in the network system shown in FIG. 3. Let it consider the case of transferring a VoIP (Voice over IP) from the Note-C to the PC-A and PC-B in a multicast as shown in FIG. 4. In this case, an extraneous packet is transferred between the GW-A and CE 6001 since the packet transmitted from the Note-C to GW-B is relayed by the GW-A as indicated by the dotted line arrow in FIG. 4. That is, an unnecessary packet path 81 is actually generated between the GW-A and CE 6001.

A method for solving the problem is for the GW-A, GW-B and Note-C to participate in a multicast address that becomes valid in a real network. By this, the CE 6001 existing between the GW-A and GW-B copies a packet specified for a multicast address and routes it through other two directions (i.e., toward the GW-A and GW-B).

Figure 6:
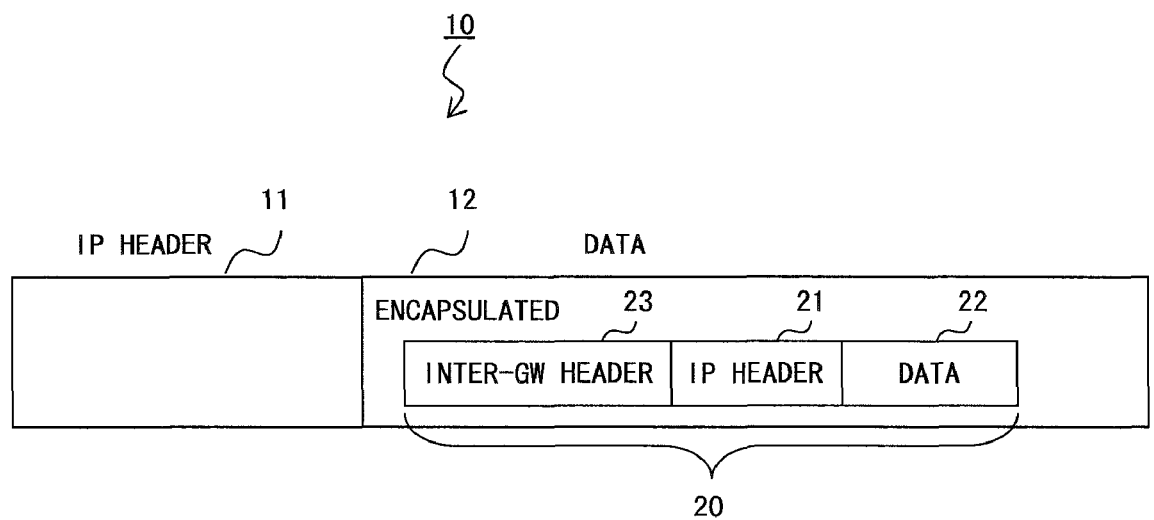
FIG. 6 is a diagram showing a format of an IP packet used by the Note-C using in a packet communication according to the first embodiment.

FIG. 5 is a diagram showing a method for optimizing the network system shown in FIG. 3. FIG. 6 is a diagram showing a format of an IP packet used for a multicast in the network system shown by FIG. 5.

Here, a description is on a format of an IP packet 10 shown in FIG. 6. The IP packet 10 shown in FIG. 6 is constituted by an IP header 11 and a data part 12. The IP header 11 is one in compliance with standards of the Internet Protocol version 4 (IP v4) and Internet Protocol version 6 (IP v6). In the case of the network system shown in FIG. 5, a "multicast address" is set to the IP header 11 as the destination address. The data part 12 stores a packet 20 that encapsulates an IP packet constituted by an IP header 21 and data 22 by an inter-GW header 23. As such, the IP packet 10 is configured to encapsulate the packet 20 by the IP header 11.

The first embodiment is configured in a manner that the Note-C transmits the IP packet 10 to the GW-C in the case of the Note-C performing a packet communication with the GW-A or GW-B. In the case of the Note-C performing a multicast with the PC-A and PC-B, a virtual tunnel 91 is formed between the Note-C and section between the GW-A and GW-B by the IP packet 10 that is encapsulated by an IP header to which a multicast address is set. The virtual tunnel 91 is virtually formed by way of the Note-C, GW-C, PE 6012, PE 6013, Internet 7000, PE 6011, CE 6001 and section between the GW-A and GW-B.

The first embodiment is configured so as to enable the GE-A, GW-B and Note-C to participate in a multicast address which becomes valid in a real network in order to eliminate the unnecessary packet path 81 by adopting the solution method as described above. As the Note-C transmits, to the GW-C, the IP packet 10 that is set by a multicast address in the IP header 11, then the IP packet 10 is transferred to the CE 6001 by way of the virtual tunnel 91. The CE 6001 copies the received IP packet 10 to perform a routing process, and transfers the copied IP packet to the GW-A and BW-B. As a result, the unnecessary packet path 81 can be eliminated in the case of the Note-C carrying out a multicast to the GW-A and GW-B as shown in FIG. 5. That is, the network system shown in FIG. 3 can be optimized for a multicast shown in FIG. 5.

Also, in the case of carrying out a broadcast to a member of the group 1, the Note-C sets a "multicast address" in the IP header 11 of the packet 10. By this, a broadcast-use packet transmitted from the Note-C is applied a routing process by the CE 6001, transferred by way of the GW-A and GW-B and transmitted to the PC-A and PC-B as a broadcast in the same manner as the transfer mechanism for the multicast-use packet. That is, having received the packet 10 transmitted from the Note-C, the CE 6001 refers to the IP header 11 and recognizes that the packet 10 is a multicast packet, followed by copying the packet 10 and transferring the copied packet to the GW-A and GW-B.

By such an introduction of the IP packet 10 encapsulated by the IP header 11, a unicast between the Note-C and the PC-A and PC-B is carried out by utilizing the tunnel 8001 (i.e., the tunnel between the Note-C and GW-A) and tunnel 83 as shown in FIG. 5. Also, a multicast/broadcast between the Note-C and PC-A and a multicast/broadcast between the Note-C and the PC-B are carried out by utilizing the virtual tunnel 91 (i.e., a tunnel connecting the Note-C and section between the GW-A and GW-B). Note that the tunnels 8001 and 83 are established by using a technique disclosed in the invention of the patent document 3.

<Trigger for a Stepwise Switching of a Tunnel Connection>

The first embodiment is configured such that a stepwise switching of tunnel routes described above is performed by the trigger as described in the following paragraphs (1), (2) and (3) for example.

(1) Direct Optimization in Two Stages

If a user of the Note-C is already presumed to be a heavy-duty user who runs such as teleconferences by the FTP and multicast, the above-described configuration of the second stage of optimization is directly built up at the time of configuring a network in the group 1.

(2) Stepwise Configuration Change According to a Packet Usage Volume (Judgment by an End Terminal)

An end terminal positioned at an end of a packet communication path, such as the Note-C and PC-B, judges a situation of a unicast or multicast and makes a transition to the respective optimization stage.

(3) Stepwise Configuration Change According to a Packet Passage Volume (Judgment by a Relay Apparatus)

A GW (i.e., a relay apparatus) relaying a packet to another GW in a packet communication path, such as the GW-A, judges a passage volume of the relayed packets, and requests end terminals such as the Note-C and PC-B to shift to the respective optimization stages so that the end terminals shifts to the respective optimization stage.

Incidentally, if the Note-C moves frequently and if a tunnel connection is structured at every movement of it, an extraneous load is levied to the each GW. Therefore, an initial tunnel connection state is purposely maintained in such a case.

{Stepwise Switching Process Flow}

<Stepwise Switching Process Flow of a Tunnel Connection in the Case of Paragraph (2) Above>

A description here is on a trigger process of a stepwise route switching by an end terminal described in the paragraph (2) by referring to the flow chart shown in FIG. 7. FIG. 7 is a flow chart showing an algorithm of a tunnel route switching trigger process of a tunnel in a stepwise fashion by an end terminal according to the first embodiment. Here, the end terminal corresponds to the Note-C and PC-B in the network shown in FIG. 3.

The end terminal counts a packet transmission and reception of itself (S11). Then, the end terminal judges whether or not a usage volume of unicast exceeds a predefined specification value (i.e., a first specification value) (S12) ("specification" is abbreviated as "spec" hereinafter). If the end terminal judges that the usage volume exceeds the first spec value ("yes" for S12), it shifts the process to the step S13, otherwise ("no" for S12) it shifts the process to the step S15.

In the step S13, the end terminal judges whether or not the packet communication path is in a state of no optimization (i.e., a state of the first stage of optimization being not performed). And, if the end terminal judges that it is a state of no optimization, the end terminal shifts the process to the step S14. Contrarily, if the judgment is that it is in the state of an optimization (i.e., the state of the first stage of optimization being performed), the end terminal shifts the process back to the step S1. In the step S14, the state makes a transition to the first stage of optimization as shown in FIG. 3.

In the step S15, the end terminal judges whether or not a usage volume of a multicast/broadcast has exceeded a predefined spec value (i.e., a second spec value). If the judgment is that the usage volume has not exceeded the second spec value ("no" for S15), the end terminal shifts the process back to the step S11, while if the judgment is that the volume has exceeded the second spec value ("yes" for S15), it shifts the process to the step S16.

In the step S16, the end terminal judges whether or not the packet communication path is in a state of no optimization (i.e., a state of the first stage of optimization being not performed). And, if the end terminal judges that the packet communication path is in a state of no optimization, the end terminal shifts the process to the step S17, whereas if the judgment is in the state of optimization (i.e., the state of the first stage of optimization being performed), it shifts the process to the step S18.

In the step S17, the state makes a transition to the first stage of optimization as shown in FIG. 3. In the step S18, the end terminal judges whether a state is in the first stage of optimization. And, if the judgment is the first stage of optimization ("yes" for S18), the end terminal shifts the process to the step S19. Contrarily, if the judgment is not in the first stage of optimization ("no" for S18), the end terminal returns the process back to step 51. In the step S19, the state makes a transition to the second stage of optimization shown in FIG. 5.

<Stepwise Switching Process Flow of a Tunnel Connection in the Case of Paragraph (3) Above>

Figure 8:
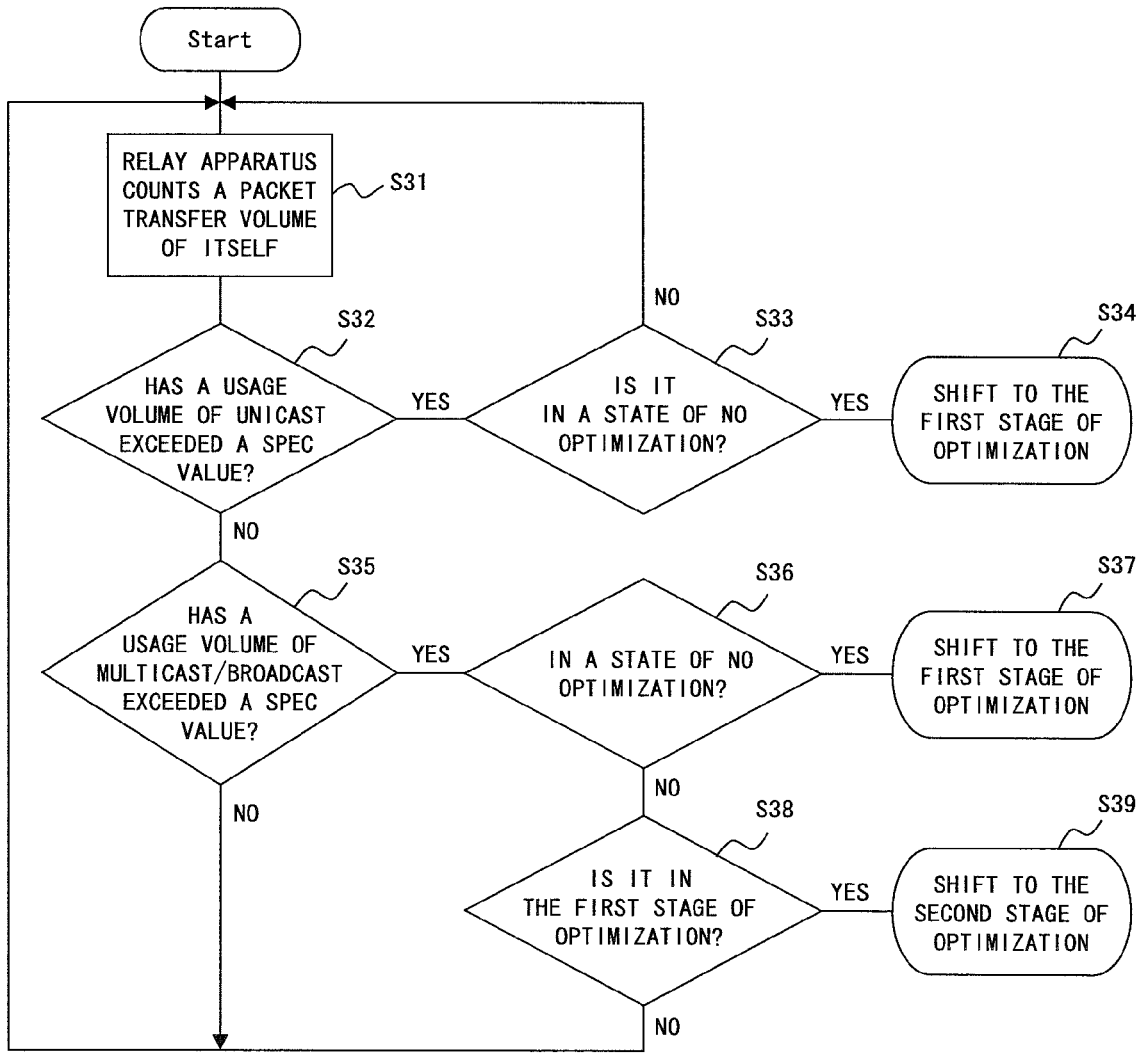
FIG. 8 is a flow chart showing an algorithm of a route switching trigger process for a tunnel in a stepwise fashion by a relay apparatus according to the first embodiment.

A description here is on a trigger process of a stepwise route switching by a relay apparatus described in the paragraph (3) by referring to the flow chart shown in FIG. 8. FIG. 8 is a flow chart showing an algorithm of a route switching trigger process for a tunnel in a stepwise fashion by a relay apparatus according to the first embodiment. Here, the relay apparatus corresponds to the GW-A in the network system shown in FIG. 8.

The relay apparatus counts a packet transmission and reception of itself (S31). Then, the relay apparatus judges whether or not a usage volume of unicast exceeds a predefined specification value (i.e., a third spec value) (S32). If the judgment is that the usage volume exceeds the first spec value, the relay apparatus shifts the process to the step S35.

In the step S33, the relay apparatus judges whether or not the packet communication path is in a state of no optimization (i.e., a state of the first stage of optimization being not performed). And, if the judgment is that the path is in a state of no optimization, the relay apparatus shifts the process to the step S34. Contrarily, if the judgment is that the path is in the state of optimization (i.e., the state of the first stage of optimization being performed), the relay apparatus returns the process back to the step S31. In the step S34, the state makes a transition to the first stage of optimization as shown in FIG. 3.

In the step S35, the relay apparatus judges whether or not a usage volume of a multicast/broadcast exceeds a predefined spec value (i.e., a fourth spec value). If the judgment is that the usage volume does not exceed the fourth spec value ("no" for S35), the relay apparatus shifts the process back to the step S31, while if the judgment is that it exceeds the second spec value ("yes" for S35), shifts the process to the step S36.

In the step S36, the relay apparatus judges whether or not the packet communication path is in a state of no optimization (i.e., a state of the first stage of optimization being not performed). And, if the relay apparatus judges that the path is in a state of no optimization, the relay apparatus shifts the process to the step S37, whereas if the judgment is in the state of optimization (i.e., the state of the first stage of optimization being performed), it shifts the process to the step S38.

In the step S37, the state makes a transition to the first stage of optimization as shown in FIG. 3. In the step S38, the relay apparatus judges whether a state is in the first stage of optimization. And, if the judgment is the first stage of optimization ("yes" for S38), the relay apparatus shifts the process to the step S39. Contrarily, if the judgment is not in the first stage of optimization ("no" for S38), the relay apparatus returns the process back to the step S31. In the step S39, the state makes a transition to the second stage of optimization shown in FIG. 5.

Second Embodiment

The next description is on a second embodiment of the present invention. The second embodiment is related to a technique of changing an inter-GW path to an optimized path seamlessly.

{Network Configuration}

Figure 9:
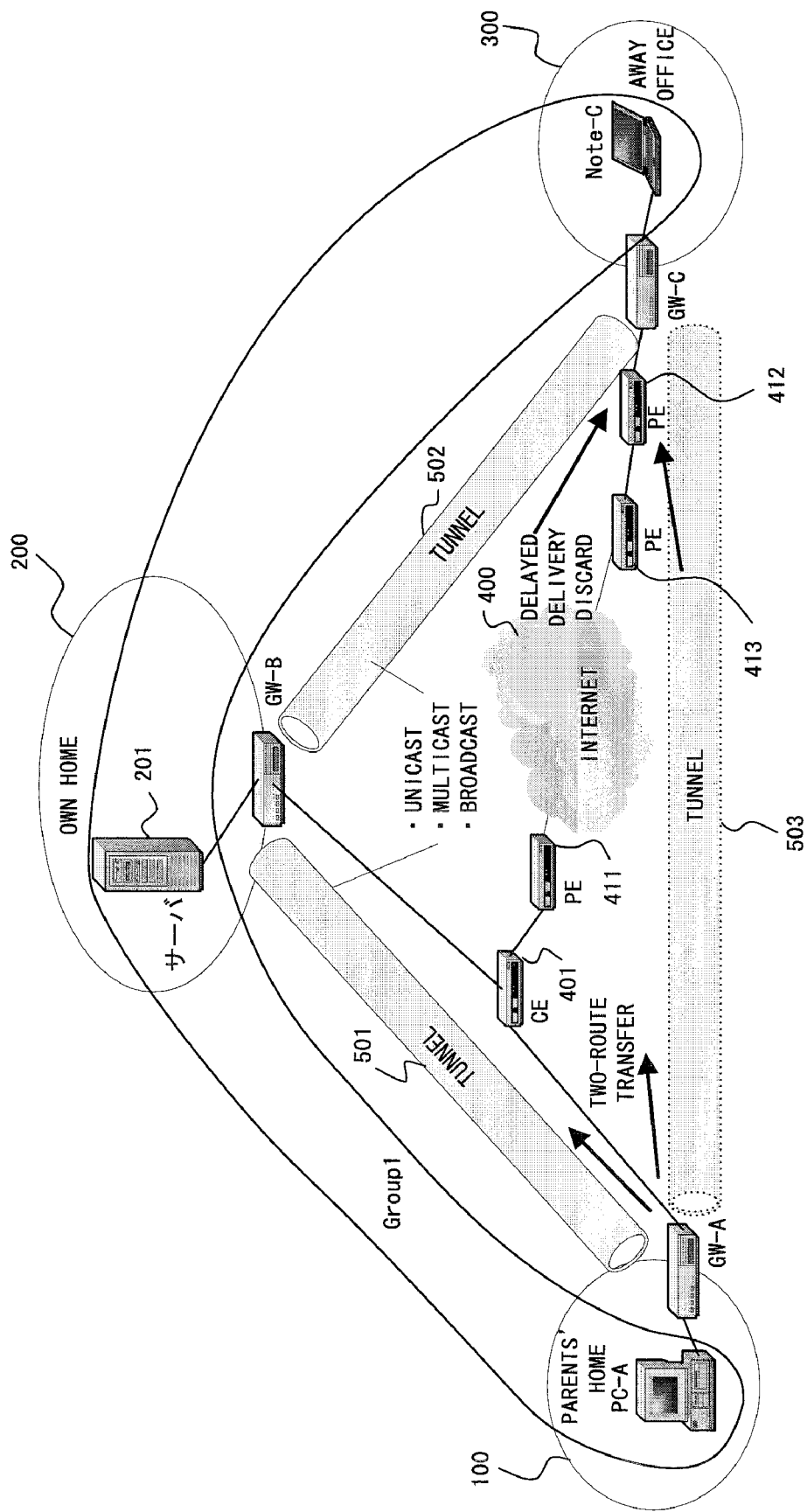
FIG. 9 is an overall configuration diagram of a network system according to a second embodiment.

FIG. 9 is an overall configuration diagram of a network system according to the second embodiment.

The network system according to the second embodiment comprises a parents' home network 100, an own home network 200 and an away-office network 300. The three networks are interconnected for communications by way of the Internet 400 that is a core network.

The network 100 includes a desktop PC PC-A (noted as "PC-A" hereinafter) as a host, and a gateway GW-A (noted as "GW-A" hereinafter) as a packet relay apparatus. The PC-A is connected to the GW-A. The network 200 includes a server 201 as a host, and a gateway GW-B (noted as "GW-B" hereinafter) as a packet relay apparatus. The server 201 is connected to the GW-B.

The network 300 includes a laptop PC Note-C (noted as "Note-C" hereinafter) as a host, and a gateway GW-C (noted as "GW-C" hereinafter) as a packet relay apparatus. The Note-C is connected to the GW-C.

The GW-A is connected to the GW-B by way of a CE 401 that is connected to a PE 411 by way of a communication line. The PE 411 is connected to the Internet 400 by way of a communication line. The GW-C is connected to a PE 412 via a communication line. The PE 412 is connected to a PE 413 by way of the communication line. The PE 413 is connected to the Internet 400 by way of a communication line. Note that the CE 401 is a CE device, and the PE 411, 412 and 413 are PE devices.

In the IP network configured as described above, the PC-A, server 201 and Note-C are grouped as Group 1. This grouping is carried out by a technique disclosed in the patent document 1.

{Stepwise Seamless Change to an Optimized Path}

Considered here is an occasion of changing to an optimized path stepwise and seamlessly in the case of carrying out a packet transfer by a unicast in the network shown by FIG. 9. This occasion requires a packet transfer temporarily on two routes (i.e., an existing route and a new route).

The assumption here is that a tunnel 501 is established between the GW-A and GW-B; a tunnel 502 is established between the GW-B and GW-C; and a route (i.e., an existing route) constituted by the tunnel 501 and tunnel 502 is established between the PC-A within the network 100 and the Note-C within the network 300. In this case, a tunnel 503 is established anew between the GW-A and GW-C so that a new route is set up between the PC-A and Note-C by way of the tunnel 503.

The tunnel 501 is a communication path (i.e., a channel) connecting the GW-A, CE 401 and GW-B together. The tunnel 502 is a communication path connecting the GW-B, CE 401, PE 411, Internet 400, PE 413, PE 412 and GW-C together. The tunnel 503 is a communication path connecting the GW-A, CE 401, PE 411, Internet 400, PE 413, PE 412 and GW-C together.

The GW-A transmits a unicast-use packet addressed to the Note-C simultaneously to two routes, that is, the existing route and new route. The GW-C accordingly receives the same unicast-use packet via the two routes. Therefore the GW-C is required to carry out a process such as discarding one of the unicast packets that is received later (i.e., a delayed delivery discard process).

Figure 10:
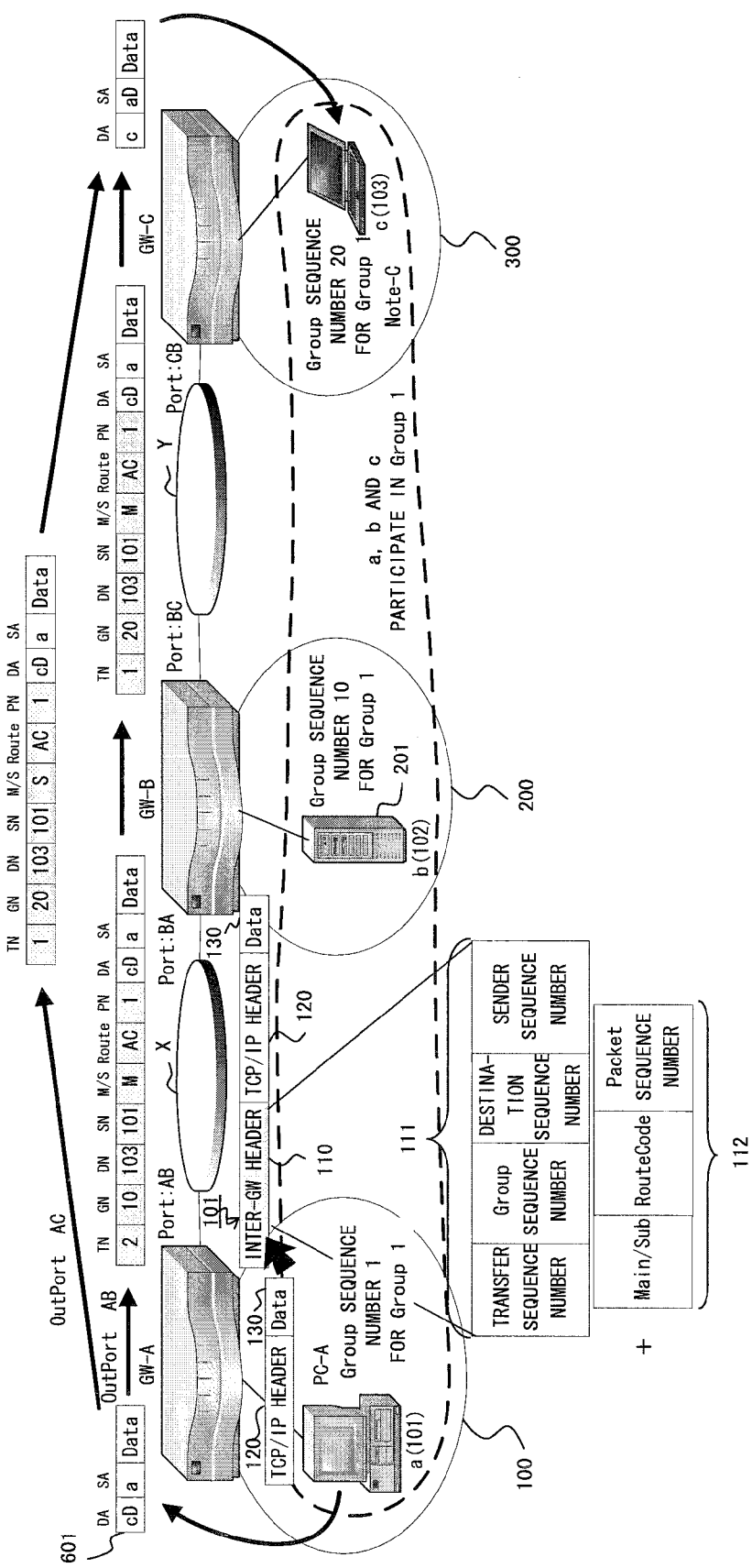
FIG. 10 is a diagram showing a state of temporary two-route transfer in the network system according to the second embodiment.
Figure 12A:
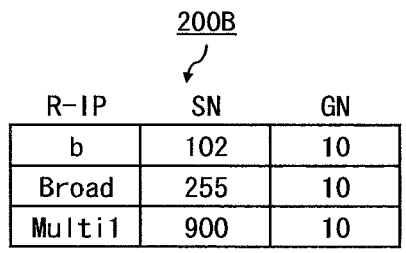
FIGS. 12A through 12E are diagrams showing tables possessed by a GW-B of the network system according to the second embodiment.
Figure 12B:
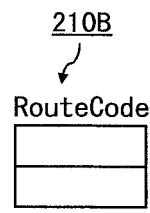
Figure 12C:
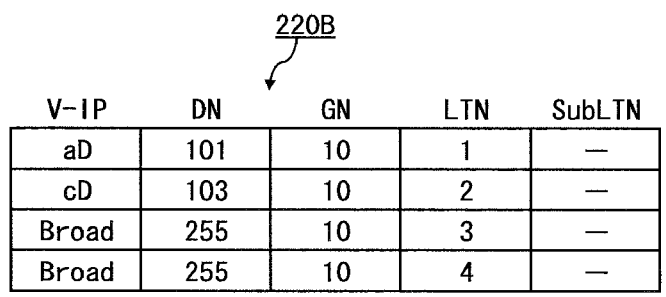
Figure 12D:
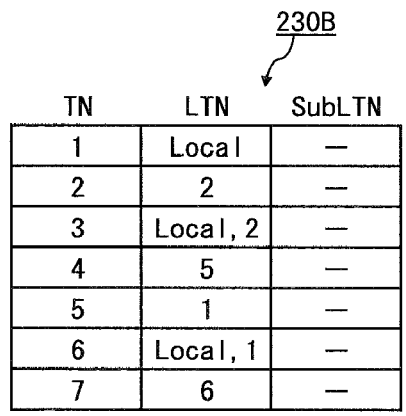
Figure 12E:
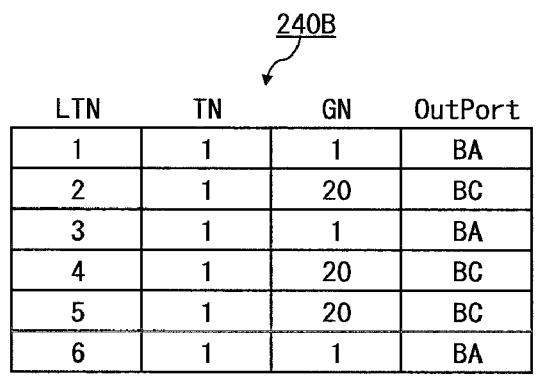

FIG. 10 is a diagram showing a state of temporary two-route transfer in the network system according to the second embodiment. FIG. 10 corresponds to the network system shown in FIG. 9, with the same component sign being assigned to the same constituent component as shown in FIG. 9.

Figure 17:
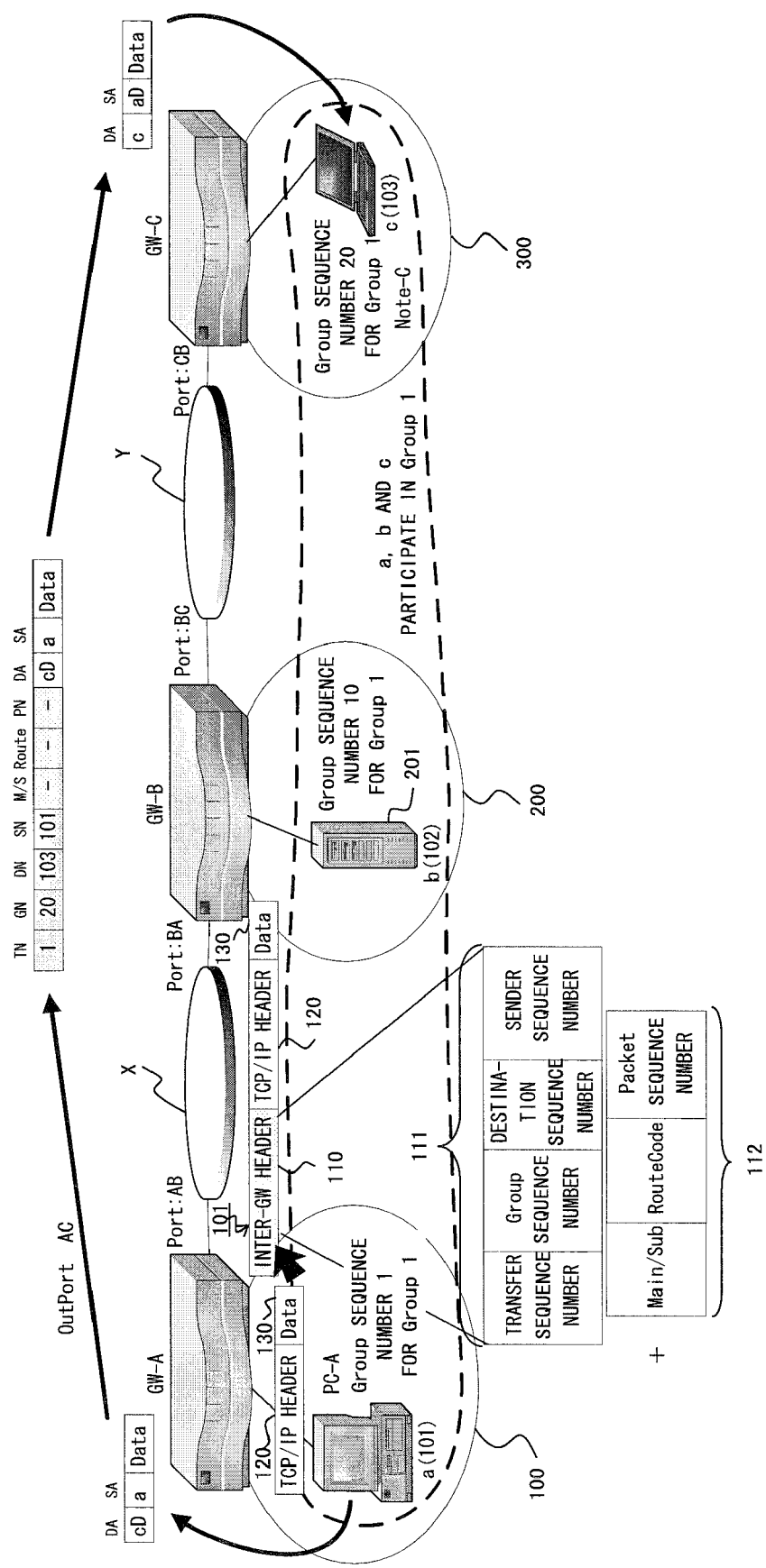
FIG. 17 is a diagram showing a state of a switching from a main route to a sub-route occurring from a state of performing a unicast on two routes, as shown in FIG. 10, according to the second embodiment.
Figure 29:
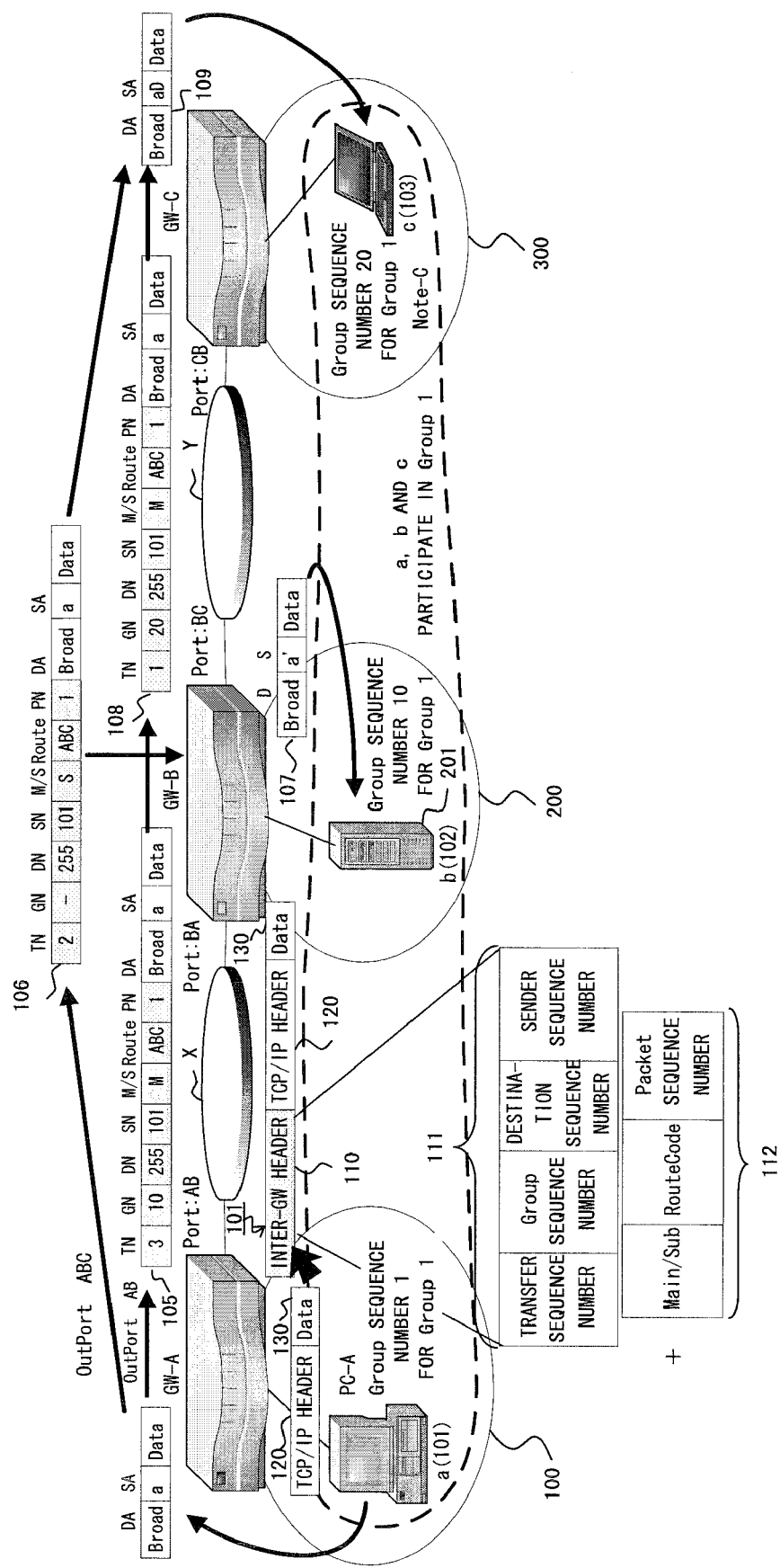
FIG. 29 is a diagram totally showing a seamless path change method according to the fourth embodiment.
Figure 34:
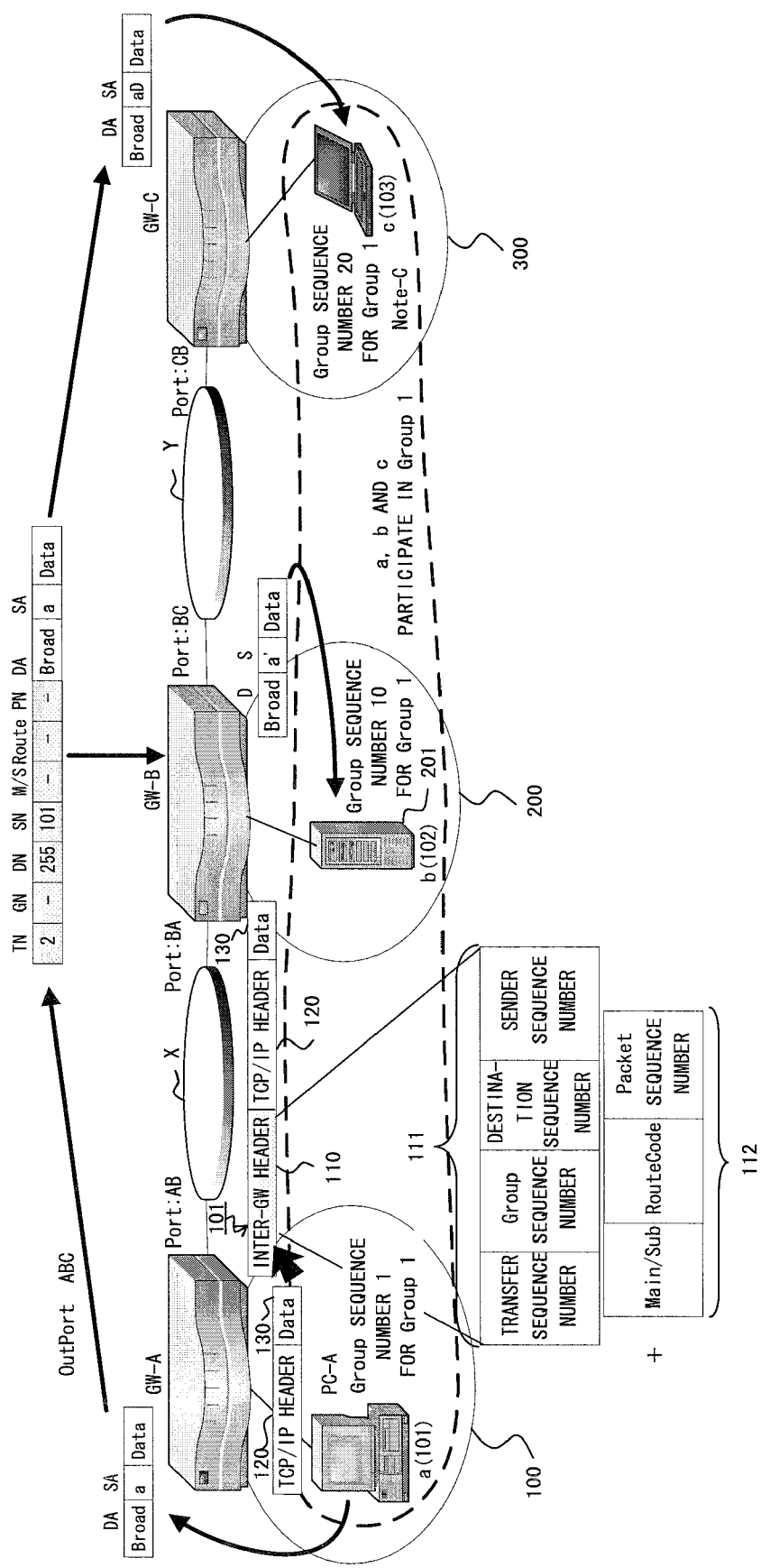
FIG. 34 is a diagram showing a state of a two-route transfer state of a broadcast/multicast shown in FIG. 30 being changed over to a one-route transfer according to the fourth embodiment.

Referring to FIG. 10, the GW-A connects a network 100 accommodated by the apparatus itself (i.e., a local network) to a global network X. The GW-B connects the global network X to a network 200 accommodated by the apparatus itself (i.e., a local network) and to a global network Y. The GW-C connects the global network Y to a network 300 accommodated by the apparatus itself (i.e., a local network). As such, the GW-B constitutes a gateway relaying the global networks X and Y. Note that those network systems shown in, and described later for, FIGS. 17, 29 and 34 are configured similar to FIG. 9.

The second embodiment is configured to implement the delayed delivery discard process by using a packet 101 to which an inter-GW header 110 as shown in FIG. 10 is added at the head, as a unicast-use packet.

The inter-GW header 110 is configured in a manner that an inter-GW extension header 112, which includes "Main/Sub", "RouteCode" and "packet sequence number (PN)", is further added to the inter-GW header disclosed in the patent document 3. At this point, a description is on the three items of functions adding in the second embodiment.

Main/Sub: information for identifying a route, which is used for identifying as to which route of the two routes a packet has been transmitted through. The main route is indicated by "M", the sub-route by "S" according to the second embodiment.

RouteCode: a code for identifying the fact of being transferred on two routes. The two routes set between the GW-A and GW-C are invested with a code of "AC"; and the two routes connecting the GW-A, GW-B and GW-C are invested with a code of "ABC" in the second embodiment.

Packet sequence number: a sequence number invested to a packet that is transferred simultaneously on two routes. An apparatus at a destination performs a delayed delivery discard based on the sequence number.

The inter-GW header 110 is set up by "transfer sequence number (TN)", "group sequence number (GN)", "destination sequence number (DN)" and "sender sequence number (SN)" in addition to the above-described three items. Detailed descriptions of these four items are found in the patent document 3. Incidentally, the transfer sequence number is noted as "transfer serial number" in the patent document 3. Also, the group sequence number is noted as "group serial number", the destination sequence number as "destination serial number", and the sender sequence number as "sender serial number" in the patent document-3. The second embodiment names the part constituted by the four items which are used in the invention disclosed in the patent document 3, among the inter-GW header 110, as "inter-GW standard header 111".

The unicast-use packet 101 is constituted of the inter-GW header 110, a TCP/IP header 120 and Data 130.

The GWs according to the second embodiment comprises a "route code table (RouteCode table)" anew in addition to a table comprised by the GW according to the invention disclosed by the patent document 3. Also, a "sub internal management transfer sequence number (i.e., SubLTN)" is added to a record of "global table" and "reception transfer table" possessed by the GW according to the invention disclosed in the patent document 3.

FIGS. 11, 12 and 13 show tables (i.e., internal tables) respectively possessed by the GW-A, GW-B and GW-C that are shown in FIG. 10.

As shown in FIG. 11, the GW-A comprises a Local table 200A, a RouteCode table 210A, a Global table 220A, a reception transfer table 230A and a transmission transfer table 240A. Likewise the GW-A, the GW-B and GW-C respectively comprise Local tables (200B and 200C), RouteCode tables (210B and 210C), Global tables (220B and 220C), reception transfer tables (230B and 230C) and transmission transfer tables (240B and 240C) (refer to FIGS. 12 and 13).

Each of the Local tables 200 (200A, 200B and 200C) stores "real IP address (R-IP)", "sender sequence number (SN)" and "group sequence number (GN)" in a record of each entry. Each of the RouteCode tables 210 (210A, 210B and 210C) stores "RouteCode" in a record of each entry. Each of the Global tables 220 (220A, 220B and 220C) stores "virtual IP address (V-IP)", "destination sequence number (DN)", "group sequence number (GN)", "internal management transfer sequence number (LTN)" and "sub internal management transfer sequence number (SubLTN)" in a record of each entry. Each of the reception transfer tables 230 (230A, 230B and 230C) stores "transfer sequence number (TN)", "internal management transfer sequence number (LTN)" and "sub internal management transfer sequence number (SubLTN). Each of the transmission transfer tables 240 (240A, 240B and 240C) stores "internal management transfer sequence number (LTN)", "transfer sequence number (TN)", "group sequence number (GN)" and "output port value (OUTPUT PORT)".

Among the tables 200 through 240, the record structures of the Local tables 200 and transmission transfer tables 240 are configured likewise the tables of the same names as noted in the patent document 3, with the record structures of those tables being described in details in the patent document 3.

Records of the Global tables 220 and reception transfer tables 230 according to the second embodiment are configured to add "sub internal management transfer sequence number (i.e., sub internal management transfer identification number)" at the end of a record disclosed by the patent document 3. And the GWs according to the second embodiment comprise the RouteCode tables 210 which are not comprised by the GW noted in the patent document 3.

The sub internal management transfer sequence number is introduced for managing routing information of a sub-route, which is used for managing the routing information of the sub-route in the same mechanism as the internal management transfer sequence number (i.e., the internal management transfer identification number). That is, the internal management transfer sequence number is used for managing the routing information of the main route and the sub internal management transfer sequence number is used for managing the routing information of the sub-route according to the present embodiment.

The reception transfer table 230 is a table used for the GW carrying out a process for routing an IP packet received from an external network (i.e., a global network) to a network (i.e., a local network) under the control of the present GW. The transmission transfer table 240 is a table used for the GW carrying out a process for routing an IP packet transmitted from a terminal within a network under the control of the present GW to the external network.

The Local table 200 is a table used for the GW managing the "real IP address (R-IP)", "sender sequence number (SN)" and "group number to which a terminal belongs (group sequence number)" which are assigned to a terminal within a network under the control of the present GW. The Global table 220 is a table used for the GW managing the "virtual IP address (V-IP)", "destination address (DN)" and "group number to which a terminal belongs (group sequence number)" which are assigned to a terminal within a network under the control of the present GW; and, furthermore, "internal management transfer sequence number (LTN) of the main route on which an IP packet transmitted from the terminal is transferred" and "sub internal management transfer sequence number (SubLTN) of the sub-route on which an IP packet transmitted from the terminal is transferred".

Now a description is of a two-route transfer of a unicast packet in the network system shown in FIG. 9 by referring to FIG. 10.

The present embodiment defines the main route as one constituted by the tunnel 501 and tunnel 502, while the sub-route as one constituted by the tunnel 503. The GW-A comprises a port for the GW-B (i.e., an output port AB) and a port for the GW-C (i.e., an output port AC) as output ports. Since the main route and sub-routes are configured as described above, the GW-A transmits a packet destined to the main route from the output port AB, and one destined to the sub-route from the output port AC.

{Outline of the Process}

The GW-A adds a newly created record about output port AC for the tunnel 503 to the transmission transfer table 240A (refer to FIG. 11E).

The GW-A sets a sequence number (i.e., "5") for a route constituting a sub-route to a virtual IP address (i.e., "cD") of a host to which a unicast packet is to be sent.

The GW-A adds an inter-GW header 110 to a unicast IP packet of which the virtual IP address (i.e., "cD") is the DN. And then, the GW-A transmits a packet 101, to which the inter-GW header 110 is added, to two routes, that is, the main route and sub-route.

The GW-B performs a transfer process by processing only the standard inter-GW header 111 (refer to the patent document 3).

The GW-C checks the "GN", "DN", "SN", "RouteCode" and "PN" which are set to the inter-GW header 110 of each of the packets 101 respectively received from the two routes, that is, the main route and sub-route, and then carries out a delayed delivery discard process.

{Internal Table Setup}

FIG. 14 is a flow chart showing an internal table setup process of a GW-A at the time of determining two routes according to the second embodiment. The next is a description of a process procedure in the case of the GW-A setting up two communication routes for a unicast packet between itself and the GW-C by referring to FIG. 14. Incidentally, the assumption here is that the GW-A has already established a tunnel with the GW-C prior to starting the process.

The GW-A determines two routes for a unicast (S40). The example shown in FIG. 10 determines two routes between the GW-A and GW-C, that is, the two routes, i.e., a route using the output port AB and another route using the output port AC.

The GW-A sets a RouteCode of a unicast packet transmission-use communication path in the RouteCode table 210A (S41). The example shown in FIG. 10 establishes the tunnel between the GW-A and GW-C as communication path, and therefore a RouteCode of "AC" is set in the RouteCode table 210A.

Then the GW-A extracts address information (i.e., a real IP address pairing with a sender sequence number) of a unicast from a local table 200 managed by a gateway at a transmission destination of the unicast (S42). The example shown in FIG. 10 extracts the real IP address (i.e., "c") and sender sequence number (i.e., "103").

Subsequently, the GW-A refers to the transmission transfer table 240A and examines whether or not an internal management transfer sequence number (LTN) for a new route is set in the transmission transfer table 240A (S43). And, if the internal management transfer sequence number for a new route is not set ("no" for S43), it shifts the process to the step S44, while if the internal management transfer sequence number is set ("yes" for S43), it shifts the process to the step S45.

In the step S44, the GW-A adds a record constituted by a new route-use internal management transfer sequence number, and a transfer sequence number, group number (also named as "group sequence number" hereinafter) and output port value which correspond to the internal management transfer sequence number. Upon completing the process of the step S44, it shifts the process to the step S45.

The GW-A adds the record made up of the internal management transfer sequence number (i.e., "5"), transfer sequence number (i.e., "1"), group number (i.e., "20") and output port value (i.e., "AC") to the transmission transfer table 240A in the example shown in FIG. 10.

In the step S45, it sets the internal management transfer sequence number for the new route in a sub internal management transfer sequence number (SubLTN) corresponding to unicast address information of the Global table 220A based on the unicast address information (i.e., a real IP address pairing with a sender sequence number) extracted in the step S12. The GW-A carries out the process of the step S45 for all of the unicast address information extracted in the step S42.

In the example shown in FIG. 10, a "5" is set in the "sub internal management transfer sequence number" item of the record in which "cD" and "103" are stored, of the Global table 220A.

While the GW-A has been described herein, the GW-C also performs approximately the same process as shown in FIG. 14 and updates the RouteCode table 210C, Global table 220C and transmission transfer table 240C.

{Simple Method for Changing Over Routes}

The assumption here is that a two-route transfer is carried out between the GW-A and GW-C as shown in FIG. 9. That is, the GW-A and GW-C carry out the two-route transfer by utilizing the main route constituted by the tunnels 501 and 502, and the sub-route constituted by the tunnel 503. A description here is on a method for the GW-C changing the transfer route to the GW-A over to a single route from the two routes based on a reception packet volume in the aforementioned case, by referring to the flow chart shown in FIG. 15.

Figure 15:
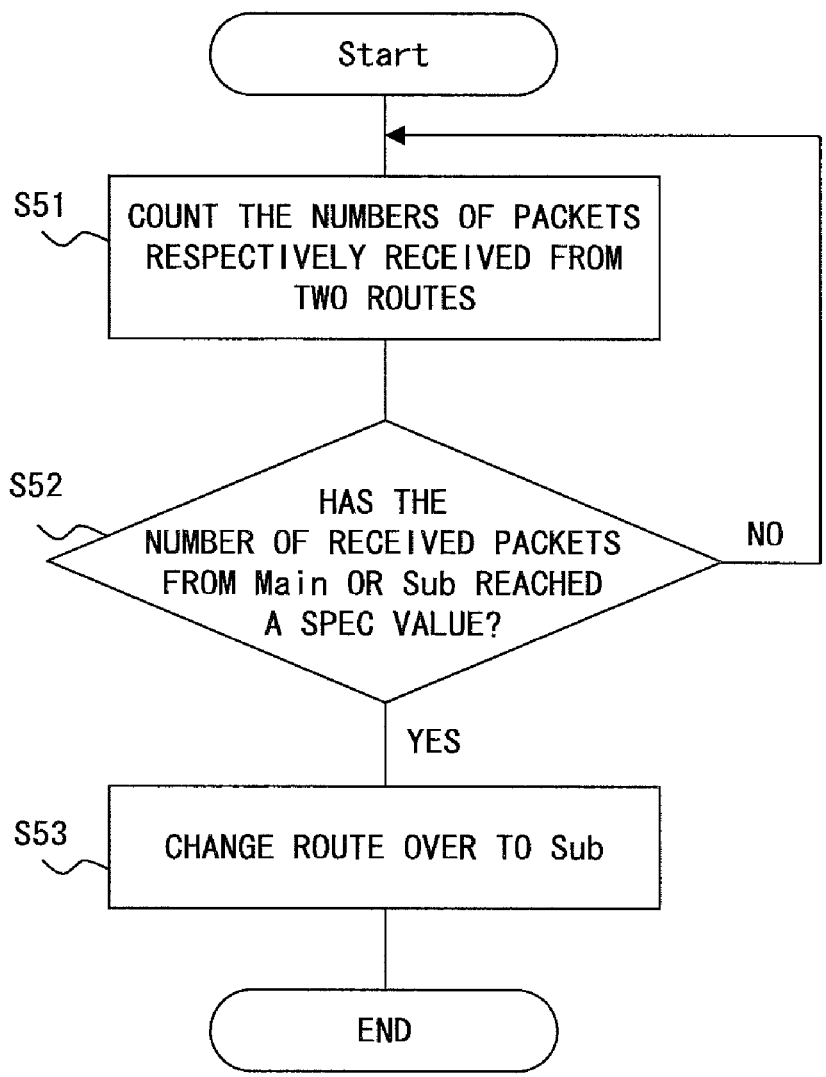
FIG. 15 is a flow chart showing a process procedure of a simple route switching method carried out by the GW-C according to the second embodiment.

FIG. 15 is a flow chart showing a process procedure of a simple route switching method carried out by the GW-C according to the second embodiment.

The GW-C counts the number of unicast packets received from the main route and sub-route respectively (S51). Then, it judges whether or not the counted number of packets is no less than a predefined spec value in each of the routes (S52) and, if the counted number is less than the predefined spec value, it returns the process back to the step S51. Contrarily, if the counted number is no less than the spec value, it shifts the process to the step S53.

In the step S53, the GW-C performs the process of interchanging the main route and sub-route so as to make the communication path only the sub-route. That is, the sub-route is now changed to the main route that is utilized for performing a unicast with the GW-C.

In the step S53, the GW-C carries out the process for changing over between an internal management transfer sequence number and a sub internal management transfer sequence number for a record of which the sender sequence number in the Global table 220C points at the GW-A (i.e., "101") That is, it changes the internal management transfer sequence number for the record over to a "5".

The GW-C changes over between the main route and sub-route after receiving 20 packets respectively from the main route and sub-route for example, and unifies the communication route to one route.

Likewise the GW-C, the GW-A also carries out the process for changing over between an internal management transfer sequence number and a sub internal management transfer sequence number for a record of which the destination sequence number in the Global table 220A points at the GW-C. That is, the GW-A changes over the internal management transfer sequence number for the record of which the destination sequence number in the Global table 220A points at the GW-C (i.e., "103") over to the sub internal management transfer sequence number. Specifically, it sets the internal management transfer sequence number at a "5".

As such, the GW-C is enabled to determine an actually adopted route while receiving a packet from two routes and carrying out a delayed delivery discard process. Also, the present embodiment is capable of changing over between the main route and sub-route simply and quickly only by performing the process for changing over between the internal management transfer sequence number and sub internal management transfer sequence number of the Global table 220 of a gateway carrying out a unicast.

{Method for Keeping a Route with a Good Transfer Rate}

The next is a description on the method for carrying out a unicast only by a route with a good transfer rate in the case of the GW-C performing a unicast with the GW-A by two routes, that is, the main route and sub-route as shown in FIG. 9.

Figure 16:
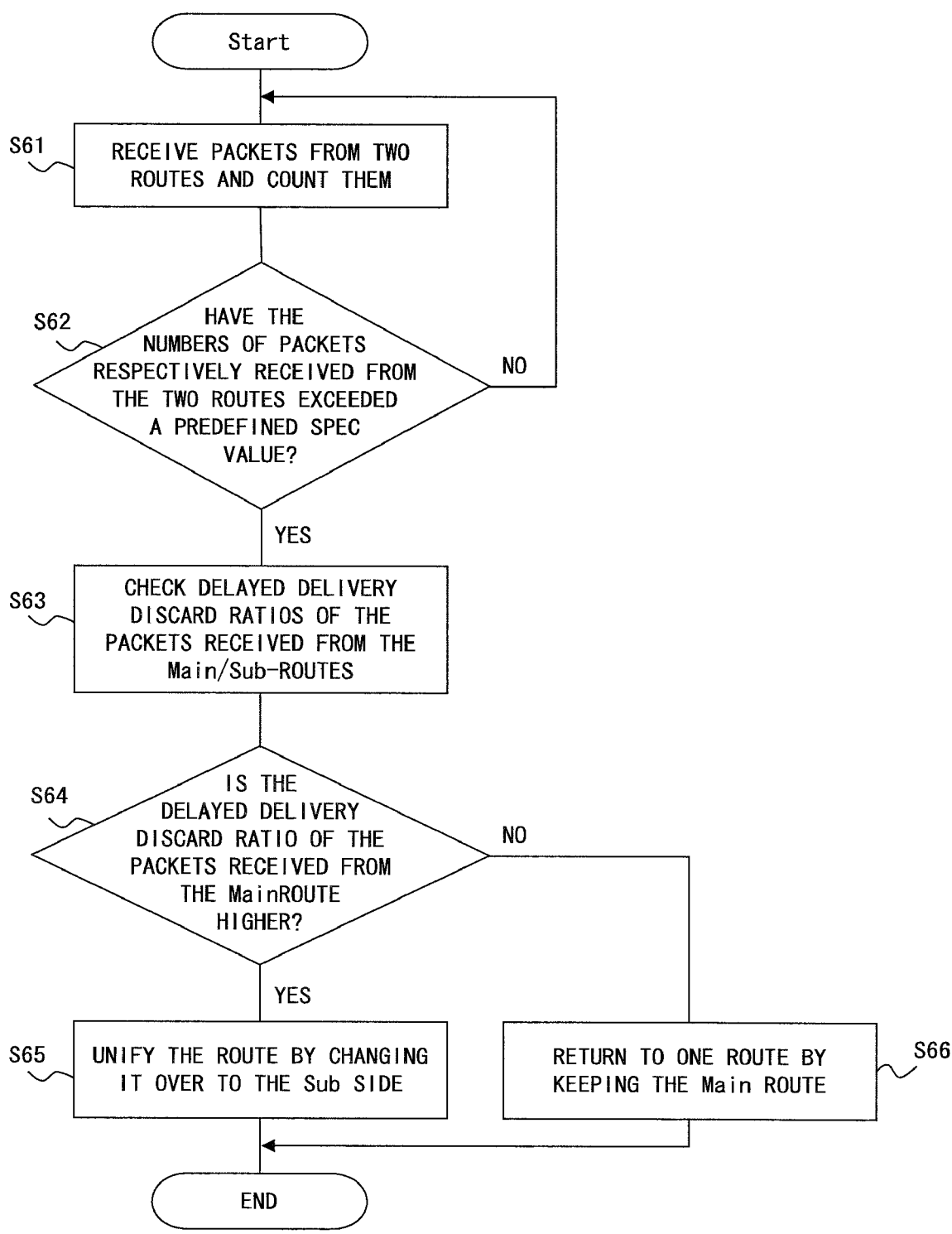
FIG. 16 is a flow chart showing a process procedure of a route switching process keeping one having a better transfer rate as main route, which is carried out by the GW-C according to the second embodiment.

FIG. 16 is a flow chart showing a process procedure of a route switching process keeping one having a better transfer rate as main route by monitoring delayed delivery discard ratios of the two routes in the case of the GW-C carrying out a unicast with the GW-A by two routes according to the second embodiment.

The GW-C counts the numbers of packets respectively received from the two routes (S61). And it judges whether or not the numbers of packets respectively received from the two routes exceeds a predefined spec value (S62). If the judgment is that the number of received packets has not reached the spec value (e.g., 20 pieces) ("no" for S62), it returns the process back to the step S61. Meanwhile if the number has reached the spec value ("yes" for S62), it shifts the process to the step S63.

In the step S63, the GW-C examines delayed delivery discard ratios of the packets received from the main route and sub-route, respectively, followed by judging whether the delayed delivery discard ratio of the packets received from the main route is higher than that of the packets received from the sub-route (S64). And, if the judgment is that the delayed delivery discard ratio is higher with the packets received from the main route ("yes" for S64), the GW-C shifts the process to the step S65, while if the judgment is that the delayed delivery discard ratio is higher with the packets received from the sub-route, it shifts the process to the step S66.

In the step S65, it changes over between the main route and sub-route to make the sub-rout a new main route, unifying the unicast to the new main route. In the step S66, it deletes the sub-route, leaving the main route for carrying out the unicast thereby.

The process of the step S65 is similar to that of the step S53 shown in FIG. 15. That is, the GW-C and GW-A carry out the similar process to that of the step S53 for updating the Global table 220 and transmission transfer table 240.

In the step S66, the GW-C deletes a sub internal management transfer sequence number (i.e., "5") set up in a record of which the sender sequence number in the Global table 220C points at the GW-A (i.e., "101"). It also deletes a record corresponding to the deleted sub internal management transfer sequence number (i.e., "5") from the transmission transfer table 240C. Likewise the GW-C, the GW-A also carries out a similar process and deletes an internal management transfer sequence number (i.e., "5") from the Global table 220A and also deletes a record corresponding to the internal management transfer sequence number (i.e., "5") from the transmission transfer table 240A.

{Route Unification by Changing from the Main Route Over to Sub-Route}

FIG. 17 is a diagram showing a state of a switching from a main route to a sub-route (i.e., a route unification) occurring from a state of performing a unicast on two routes by using the main route and sub-route between the GW-A and GW-C, as shown in FIG. 10. The route unification is carried out by the GW-A, GW-B and GW-C changing over between the internal management transfer sequence number and sub internal management transfer sequence number, or deleting an unnecessary transfer sequence number (TN) or internal management transfer sequence number (LTN) from the reception transfer table 230 or transmission transfer table 240.

FIGS. 18, 19, and 20 are diagrams showing the states of internal tables of the GW-A, GW-B and GW-C, respectively, at the time of route switches as shown in FIG. 17 being carried out.

As shown in FIG. 17, in the case of the route determining the tunnel 503 (refer to FIG. 9), which is established between the GW-A and GW-C, as the communication path changing from the sub-route over to main route and a unicast being carried out between the GW-A and GW-C only by the new route, the GW-A, GW-B and GW-C change the respective internal tables to the states shown in FIGS. 18, 19 and 20, respectively.

The GW-A deletes the RouteCode (i.e., "AC") set in the RouteCode table 210A. And in the Global table 220A, it interchanges the internal management transfer sequence number (i.e., "2") and sub internal management transfer sequence number (i.e., "5"), followed by deleting the sub internal management transfer sequence number, resulting in setting up the internal management transfer sequence number with (i.e., "5") (refer to FIG. 18C). Also, it deletes a record corresponding to the internal management transfer sequence number (i.e., "2"), which is deleted in the Global table 220A, from the transmission transfer table 240A (refer to FIG. 18E).

The GW-B, because the main route is deleted, deletes the record related to the transfer sequence number regarding the main route, that is, deletes records corresponding to the transfer sequence numbers "2" and "5" from the reception transfer table 230B (refer to FIG. 19D).

The GW-C deletes the RouteCode (i.e., "AC") set in the RouteCode table 210C. And it interchanges between the internal management transfer sequence number (i.e., "1") and sub internal management transfer sequence number (i.e., "5") in a record of which the destination sequence number is "101" within the Global table 220C, followed by deleting the sub internal management transfer sequence number (i.e., "1") and further deleting a record corresponding to the deleted sub internal management transfer sequence number (i.e., "1").

As described above, the internal table updating process of the GW-A, GW-B and GW-C makes the communication path for the unicast between the GW-A and GW-C unified to the tunnel 503.

<Table Setup Process Flow of GW>

Figure 22:
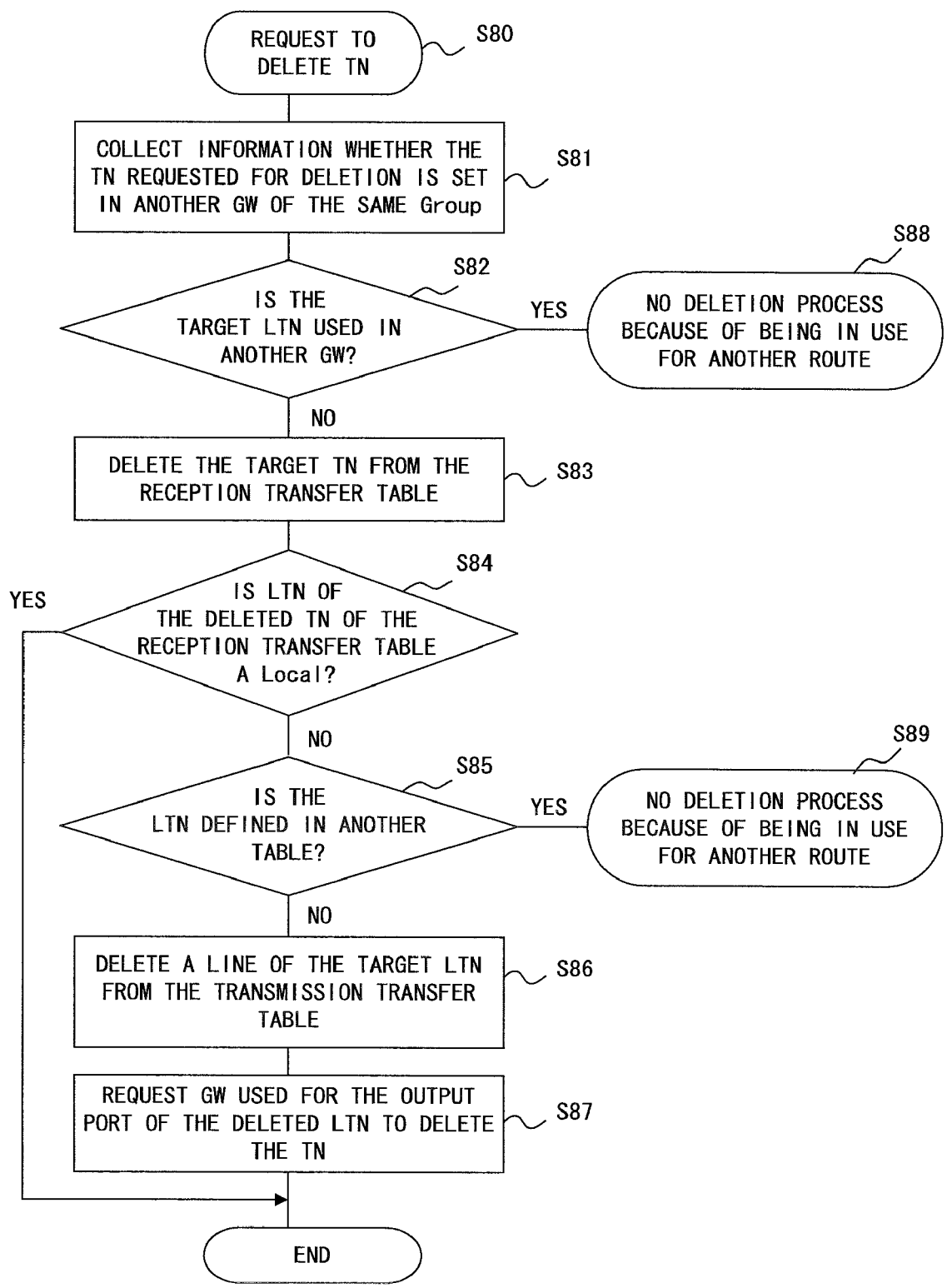
FIG. 22 is a flow chart showing a procedure of an internal table setup process carried out by the GW-B in the case of unifying a route as shown in FIG. 17 according to the second embodiment.

The next is a description of internal table process of the GW-A and GW-B at the time of unifying the communication path between the GW-A and GW-B shown in the above-mentioned FIG. 17, by referring to FIGS. 21 and 22, respectively.

{Internal Table Process of the GW-A}

FIG. 21 is a flow chart showing a procedure of an internal table setup process of the GW-A according to the second embodiment.

The GW-A determines a single route for the route to the GW-C (S70), that is, in the example shown in FIG. 17, determines on the route utilizing the output port AC, that is, the sub-route. In this process, the GW-A interchanges the internal management transfer sequence number (LTN) and sub internal management transfer sequence number (SubLTN) of a line of which the virtual IP address (V-IP) is "cD" of the Global table 220A, followed by deleting the sub internal management transfer sequence number.

The GW-A deletes the RouteCode from the RouteCode table 210A (S71). The RouteCode of "AC" is deleted in the example shown in FIG. 17 (refer to FIG. 18B).

Then it extracts the internal management transfer sequence number deleted from the Global table 220A (S72), extracting the internal management transfer sequence number of "2" in the example shown in FIG. 17.

Then it carries out processes of the steps S73 through 76 for all of the internal management transfer sequence numbers extracted in the step S72. Note that each of internal management transfer sequence numbers extracted in the step S72 is called an "extracted internal management transfer sequence number" for convenience in the following description.

In the step S73, the GW-A judges whether or not the extracted internal management transfer sequence number is defined (i.e., set) in a table other than the Global table 220A. And, if the number is not defined elsewhere, it shifts the process to the step S74. While the number is defined, it shifts the process to the step S76.

In the step S74, the GW-A deletes a line (i.e., a record) set with the extracted internal management transfer sequence number from the transmission transfer table 240A, deleting the record on the second line of the transmission transfer table 240A in the example shown in FIG. 17 (refer to FIG. 18E).

It then requests an opposite GW, which is defined by the output port set for an output port item of the record deleted in the step S74, to delete the transfer sequence number (S75), that is, requesting the GW-B to delete the transfer sequence number of "2" in the example shown in FIG. 17. Note that the transfer sequence number that is requested for deletion is named as "target transfer sequence number" for convenience in the following description.

Contrarily, in the case of the extracted internal management transfer sequence number not being defined in another table in the step S73, meaning that the extracted internal management transfer sequence number is in use for another route, the GW-A performs no deletion process related to the extracted internal management transfer sequence number (S76).

{Internal Table Process of GW-B}

FIG. 22 is a flow chart showing a procedure of an internal table setup process carried out by the GW-B in the case of unifying a route as shown in FIG. 17. Having received a request from the GW-A for deleting the transfer sequence number of "2", the GW-B carries out the process shown in the flow chart of FIG. 22.

The GW-B receives a request from the GW-A for deleting the transfer sequence number (S80), that is, the GW-B receives the deletion request for the transfer sequence number (i.e., "2") in the example of FIG. 17.

Then the GW-B collects information on whether the transfer sequence number that has been requested to delete is set at another GW in the same group (S81). Information of the transfer sequence number (i.e., "2") for the GW-B related to the GW-A and GW-C is collected in the example of FIG. 17.

Then it judges whether the target transfer sequence number is used in another GW, based on the above described information collection result (S82). And, if the target transfer sequence number is not used elsewhere, it shifts the process to the step S83. Contrarily, if the target transfer sequence number is used, it shifts the process to the step S88.

In the step S83, the GW-B deletes a record, in which the target transfer sequence number is set, from the reception transfer table 230B, deleting the record on the second line of the reception transfer table 230B in the example of FIG. 17 (refer to FIG. 19D).

Subsequently, the GW-B judges whether an internal management transfer sequence number corresponding to the target transfer sequence number deleted in the step S83 is "Local" (S84). And, if the internal management transfer sequence number is not "Local", it shifts the process to the step S85, while if "Local", it ends the process of the present flow chart. The internal management transfer sequence number is not "Local" in the example of FIG. 17, it shifts the process to the step S85.

In the step S85, the GW-B judges whether the internal management transfers sequence number (named as "target internal management transfer sequence number" hereinafter) is defined (i.e., set) in another table (i.e., a Global table 220B). And, if the number is not defined in another table, it shifts the process to the step S86. While the number defined in another table, it shifts the process to the step S89. In the example of FIG. 17, the internal management transfer sequence number (i.e., "2") is defined (i.e., set) in the Global table 220B, and therefore it shifts the process to the step S89.

In the step S89, the GW-B deletes a line (i.e., a record), in which the target internal management transfer sequence number is set, from the transmission transfer table 240B. And, it requests the GW used for the output port corresponding to the internal management transfer sequence number which has been deleted (i.e., the deleted internal management transfer sequence number) in the step S86 (S87).

{Comprisal of Each GW}

Figure 23:
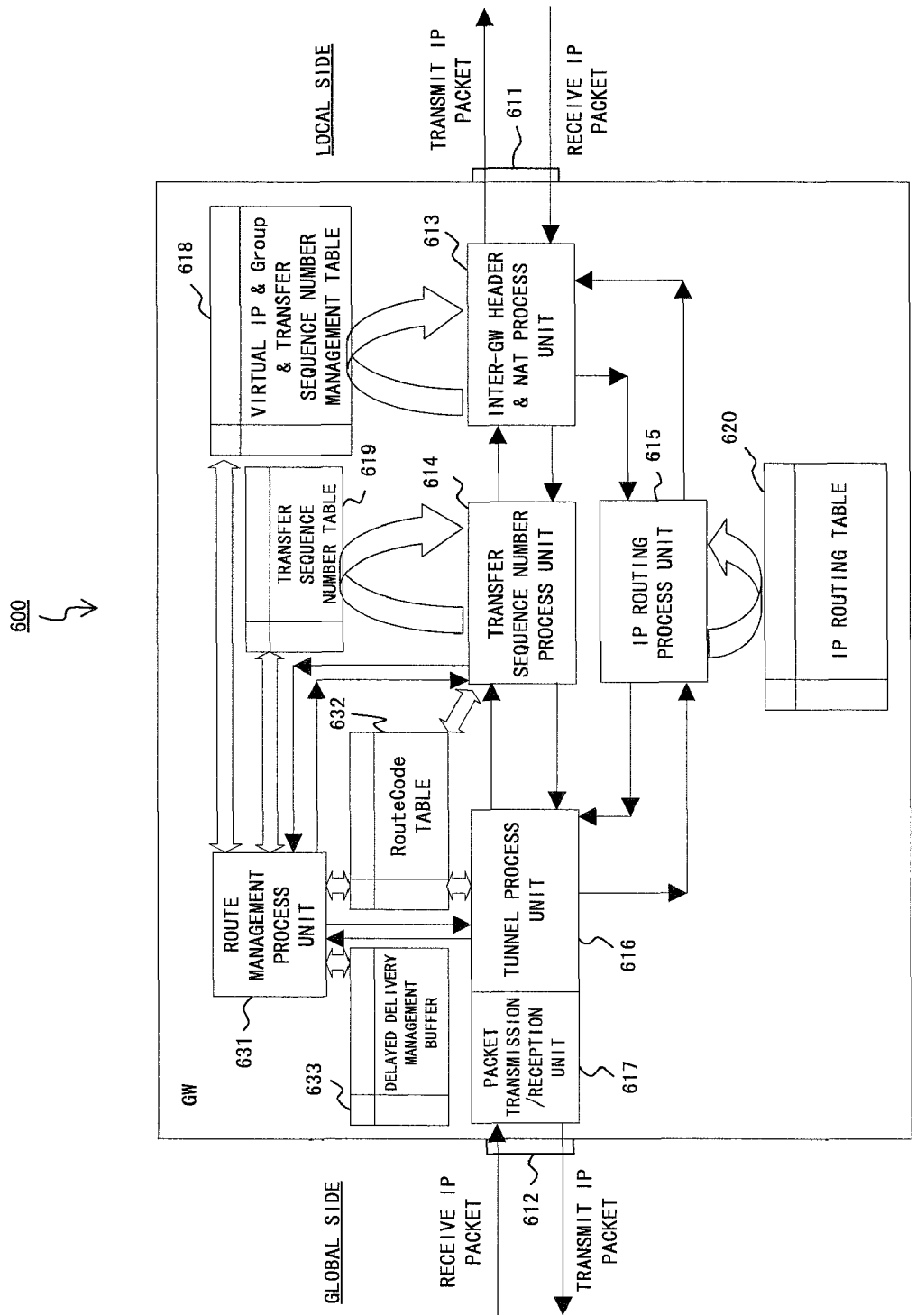
FIG. 23 exemplifies comprisals of GWs (i.e., GW-A, GW-B and GW-C) according to the second embodiment.

FIG. 23 exemplifies comprisals of GWs (i.e., GW-A, GW-B and GW-C) according to the second embodiment.

A GW 600 shown in FIG. 23 comprises a local side interface 611 to be connected to a terminal (i.e., a local side network), and a global side interface 612 connected to a CE, PE or opposite GW. Also comprised are an inter-GW header & NAT process unit 613 (abbreviated as "header process unit 613" hereinafter), a transfer sequence number process unit 614, an IP routing process unit 615, a tunnel process unit 616, a packet transmission/reception unit 617, a virtual IP & Group & transfer sequence number management table 618 (abbreviated as "management table 618" hereinafter), a transfer sequence number table 619 and an IP routing table 620.

In addition to the above constituent components, the GW according to the present embodiment comprises a route management process unit 631, a RouteCode table 632 and a delay management buffer 633. The characteristic of the present embodiment lies in comprising these constituent components 631 through 633, accomplishing an addition of the inter-GW extension header 112 to an IP packet, a management of a RouteCode, and such, by the functions of the three components 631 through 633.

The management table 618 corresponds to the Local table 200 and Global table 220 according to FIGS. 11 through 13, and FIGS. 18 through 20. The transfer sequence number table 619 corresponds to the reception transfer table 230 and transmission transfer table 240 according to FIGS. 11 through 13 and FIGS. 18 through 20.

The GW 600 according to the second embodiment processes four kinds of packets. That is, four packets, i.e., a "packet as a result of adding the IP packet, inter-GW standard header 111 and inter-GW extension header 112" (abbreviated as "inter-GW extension header-attached packet" hereinafter), a "packet as a result of adding the IP packet and inter-GW standard header 111" (abbreviated as "inter-GW standard header-attached packet"), a "packet for relaying a GW as a result of adding the IP packet and inter-GW standard header 111" (noted as "inter-GW standard header-attached relay-use packet" hereinafter) and a "normal IP packet (that is, the IP packet not added an inter-GW standard header 111 or inter-GW extension header 112)" (noted as "normal IP packet" hereinafter).

These four kinds of packets are processed in the following flow within the GW 600. Note that the symbol "←→" indicates a bidirectional flow.

Inter-GW extension header-attached packet: packet transmission/reception unit 617←→ tunnel process unit 616←→ route management process unit 631←→ transfer sequence number process unit 614←→ header process unit 613

Inter-GW standard header 111: packet transmission/reception unit 617←→ tunnel process unit 616←→ transfer sequence number process unit 614←→ header process unit 613

Inter-GW standard header-attached packet: packet transmission/reception unit 617←→ tunnel process unit 616←→ transfer sequence number process unit 614←→ tunnel process unit 616←→ packet transmission/reception unit 617

Normal IP packet: packet transmission/reception unit 617←→ tunnel process unit 616←→ IP routing process unit 615←→ header process unit 613

Having received an IP packet from the local side interface 611 (noted as "local path side IP packet" hereinafter), the header process unit 613 judges whether it is a normal IP packet or the one (noted as "inter-group member communication IP packet" hereinafter) that is exchanged between the group members. This judgment is made whether or not a destination address of a local path side IP packet is set in the management table 618. That is, if the destination address is set in the management table 618 (i.e., the Global table), the judgment is the inter-group member communication IP packet, while if the destination address is not set in the management table 618, the judgment is the normal IP packet. And, if the local path side IP packet is the normal IP packet, the header process unit 613 transfers it to the IP routing process unit 615. Contrarily, if the local path side IP packet is the inter-group member communication IP packet, it refers to the management table 618 and applies a Network Address Translation (NAT) process to the destination address of the inter-group member communication IP packet. The NAT process converts between a virtual IP address and a real IP address (i.e., a local address) for a destination address (D) or sender address (S) of the inter-group member communication IP packet. The header process unit 613 further adds a destination sequence number (DN) and a sender sequence number (SN) and also notifies the transfer sequence number process unit 614 of an internal management transfer sequence number (LTN). Also, if a sub internal management transfers sequence number (SubLTN) is set in the management table 618, the header process unit 613 notifies the transfer sequence number process unit 614 of it as well.

If an IP packet having the inter-GW standard header 111 (i.e., an inter-GW extension header-attached packet or inter-GW standard header-attached packet) is received from the transfer sequence number process unit 614, the header process unit 613 refers to the management table 618, converts the sender address from a real IP address into a virtual IP address and converts the destination address from a virtual IP address into a real IP address. It also deletes the inter-GW standard header 111, followed by transmitting the IP packet, from which the inter-GW standard header 111 is deleted, to a terminal byway of the local side interface 611. Meanwhile, if an IP packet is received from the IP routing process unit 615, the header process unit 613 transmits the IP packet to a terminal by way of the local side interface 611.

If the IP packet is received from the header process unit 613, the transfer sequence number process unit 614 refers to the transfer sequence number table 619 based on the internal management transfer sequence number notified from the header process unit 613, adds a transfer sequence number (TN) and a group sequence number (GN) to the IP packet and also obtains output port information. Then, it sends an IP packet added by the inter-GW standard header 111 to the tunnel process unit 616 and also notifies the tunnel process unit 616 of the output port information (OutPort). If the header process unit 613 notifies the transfer sequence number process unit 614 of a sub internal management transfer sequence number in addition to an internal management transfer sequence number, the transfer sequence number process unit 614 refers to the transfer sequence number table 619 based on the sub internal management transfer sequence number, adds an inter-GW standard header 111 to the IP packet received from the header process unit 613 and also obtains output port information, followed by sending the IP packet added by the inter-GW standard header 111 and output port information to the tunnel process unit 616.

And, if the transfer sequence number process unit 614 receives an IP packet (i.e., an inter-GW extension header-attached packet, inter-GW standard header-attached packet or inter-GW standard header-attached relay-use packet) from the tunnel process unit 616 or route management process unit 631, then the transfer sequence number process unit 614 refers to the transfer sequence number table 619 based on the transfer sequence number (TN) set in the inter-GW standard header 111 of the IP packet and sends the IP packet to the header process unit 613 if the destination of the IP packet is Local, or sends it to the tunnel process unit 616 if the destination is LTN.

The IP routing process unit 615, if a normal IP packet is received from the header process unit 613, refers to the IP routing table 620 and obtains output port information corresponding to the destination address (DA) of the normal IP packet, followed by sending the normal IP packet and output port information to the tunnel process unit 616. Meanwhile, the IP routing process unit 615, if a normal IP packet is received from the tunnel process unit 616, refers to the IP routing table 620, and obtains output port information corresponding to the destination address (DA) of the normal IP packet. Then, it sends the normal IP packet and output port information to the header process unit 613.

The tunnel process unit 616 encrypts an IP packet received from the transfer sequence number process unit 614, IP routing process unit 615 or route management process unit 631, and transfers the encrypted IP packet to the packet transmission/reception unit 617. The tunnel process unit 616 also decrypts an IP packet received from the packet transmission/reception unit 617 and transfers the decrypted IP packet to the route management process unit 631, transfer sequence number process unit 614 or IP routing process unit 615.

The packet transmission/reception unit 617 transmits, by way of the global side interface 612, an IP packet received from the tunnel process unit 616. The packet transmission/reception unit 617 also transfers an IP packet received by way of the global side interface 612 to the tunnel process unit 616.

<Process Detail of GW>

Figure 24:
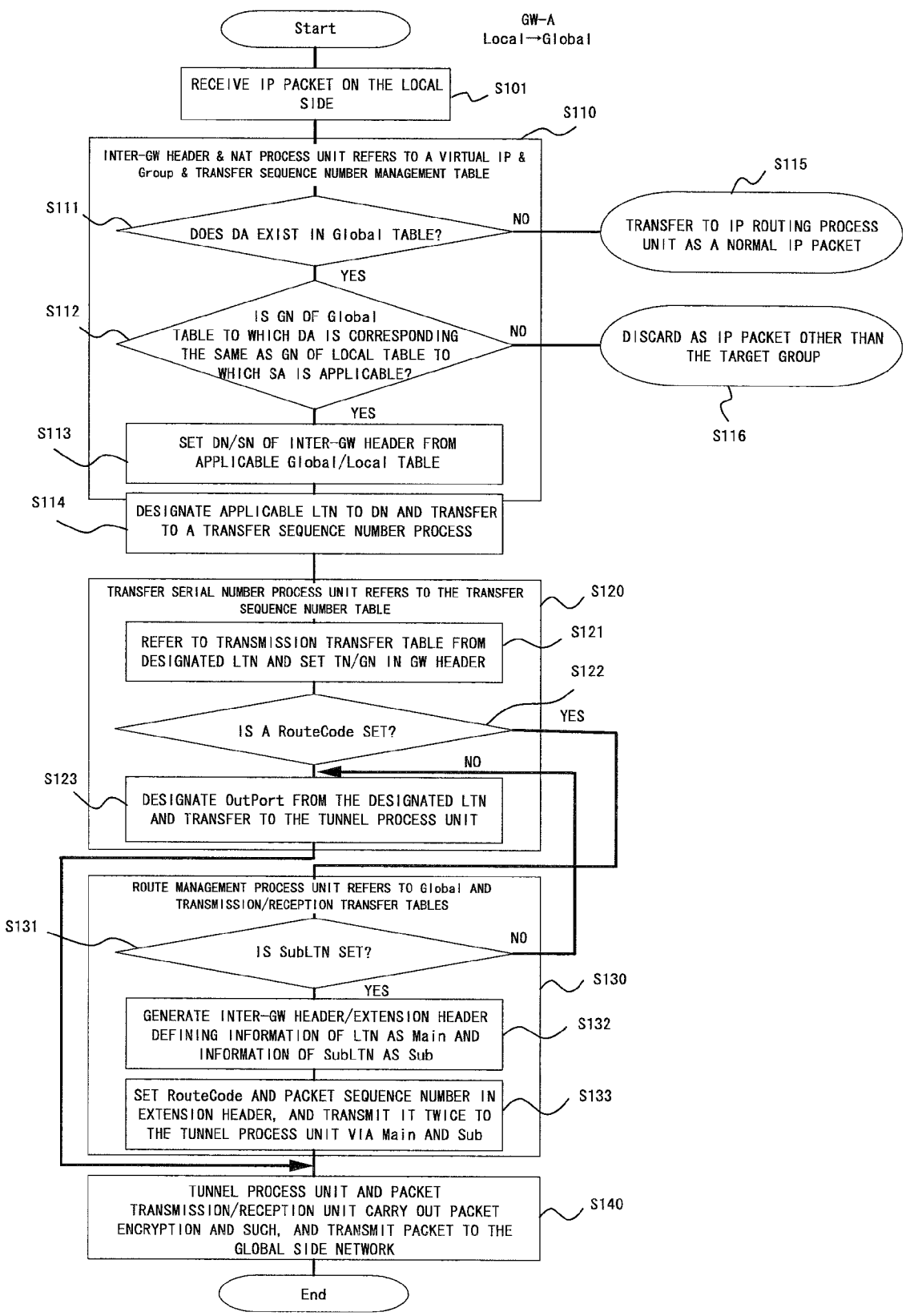
FIG. 24 is a flow chart showing a process procedure starting from the GW-A receiving an IP packet at a local side interface until transmitting it from a global side interface according to the second embodiment.
Figure 25:
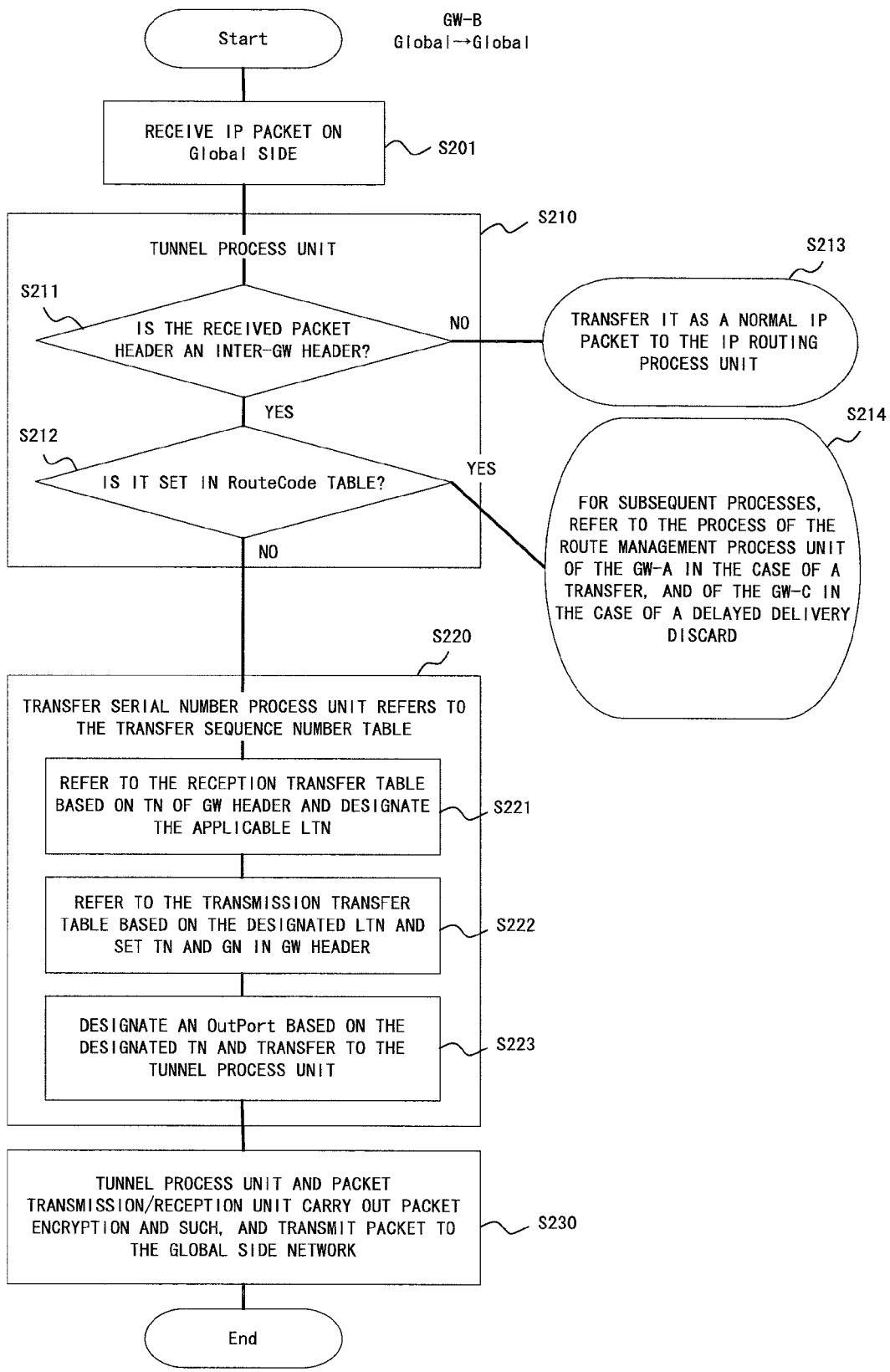
FIG. 25 is a flow chart showing a procedure for the GW-B processing an IP packet received from a global side interface according to the second embodiment.
Figure 26:
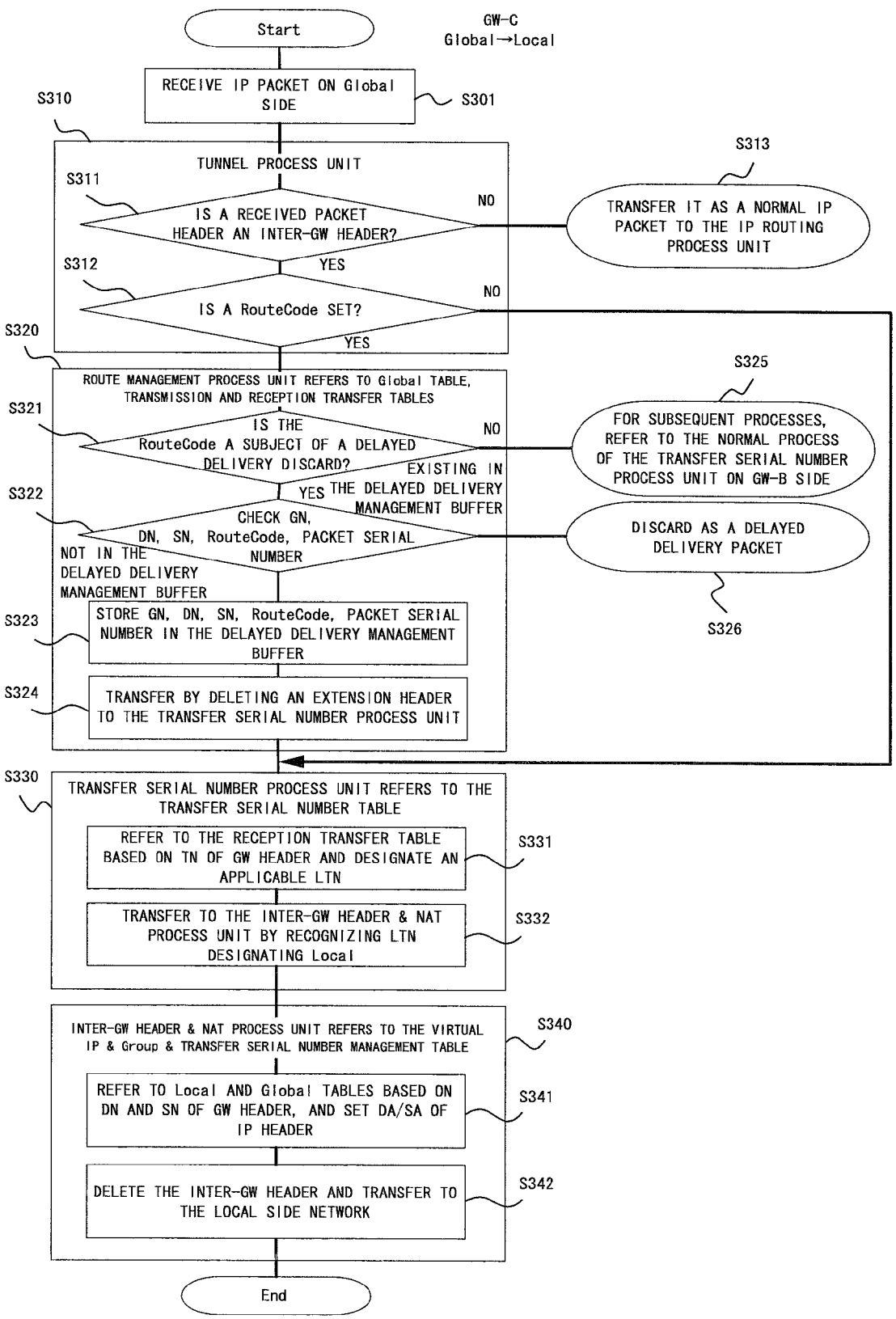
FIG. 26 is a flow chart showing a process procedure starting from the GW-C receiving an IP packet at a global side interface until outputting it to a local side interface according to the second embodiment.

The next is a description of a detail of processes at the GWs (i.e., the GW-A, GW-B and GW-C) according to the present embodiment by referring to the flow charts shown in FIGS. 24 through 26. Here, the description is on the process in the case of the PC-A included in the network 100 transmitting an IP packet to the Note-C included in the network 300 within the network system shown in FIGS. 10 and 17.

{Process at the GW-A}

FIG. 24 is a flow chart showing a process procedure starting from the GW-A receiving an IP packet from the local side interface 611 until transmitting it from the global side interface 612. A description now is of a reception and transmission processes of the IP packet at the GW-A by referring to FIG. 24.

The header process unit 613 receives an IP packet from the local side interface 611 (S101). The header process unit 613 refers to the management table 618 and carries out the process of the step S110 that is constituted by the steps S111 through S116.

The header process unit 613 first judges whether a destination address (DA) of the IP packet (noted as "received IP packet" hereinafter) received in the step S101 exists in the Global table 220A. And, if the destination address exists therein, it shifts the process to the step S112, while if not, then it shifts the process to the step S115.

In the step S112, it refers to the Global table 220A and extracts a group sequence number (GN) corresponding to the destination address. It also refers to the Local table 200A and extracts a group sequence number (GN) corresponding to the sender address (SA) of the received IP packet. Then, the header process unit 613 judges whether the group sequence number extracted from the Global table 220A is the same as one extracted from the Local table 200A (S112).

And if both of the group serial numbers are the same, it shifts the process to the step S113, while, if they are not the same, it shifts the process to the S116.

In the step S113, the header process unit 613 obtains a destination sequence number (DN) corresponding to the destination address (DA) from the Global table 220A. Then it obtains a sender sequence number (SN) corresponding to the sender address (SA) from the Local table 200A. And it adds the destination serial number and sender sequence number to an inter-GW standard header 111 of the received IP packet.

Subsequently, the header process unit 613 obtains an internal management transfer sequence number (LTN) corresponding to the destination address (DA) from the Global table 220A. Then, it transfers, to the transfer sequence number process unit 614, the IP packet with the destination sequence number and sender sequence number being added. It notifies the transfer sequence number process unit 614 of the internal management transfer sequence number in this event (S114).

In the step S115, it transfers the received IP packet to the IP routing process unit 615.

In the step S116, it regards the received IP packet as one other than of the target group (i.e., the group member) and accordingly discards the received IP packet.

Subsequent to the step S114, the transfer sequence number process unit 614 carries out the process of the step S120 by referring to the transfer sequence number table 619 and RouteCode table 632. The step S120 is consisted of the steps S121 through S123.

The transfer sequence number process unit 614 refers to the transmission transfer table 240A based on the internal management transfer sequence number (LTN) specified by the header process unit 613, and obtains a transfer sequence number (TN) and a sender sequence number (SN), which correspond to the internal management transfer sequence number, from the transmission transfer table 240. And it sets these numbers in the inter-GW standard header 111 of the IP packet received from the header process unit 613 (S121).

It then judges whether a RouteCode is set in the RouteCode table 632 (S122). This judgment is for judging whether or not the GW-A currently needs to transfer an IP packet by two routes.

If the judgment of the step S122 is that a RouteCode is not set, the transfer sequence number process unit 614 shifts the process to the step S123, while if the judgment is that a RouteCode is set, it shifts the process to the step S130.

In the step S123, it refers to the transmission transfer table 240 and obtains output port information (Outport) corresponding to the internal management transfer sequence number (LTN). It then transfers an IP packet added by the inter- GW standard header 111 to the tunnel process unit 616. The transfer sequence number process unit 614 designates (i.e., notifies) the tunnel process unit 616 as the output port information in this event. Upon finishing the process of the step S123, it shifts the process to the step S140.

The process of the step S130 is carried out by the route management process unit 631 that refers to the management table 618 and transfer sequence number table 619 to carry out the process of the step S130 that is constituted by the steps S131 through S133.

Note that the route management process unit 631 receives an IP packet added by an inter-GW standard header 111 from the transfer sequence number process unit 614 and also is designated (i.e., notified) an internal management transfer sequence number (LTN) on starting the process of the step S130.

The route management process unit 631 first refers to the Global table 220A based on an internal management transfer sequence number (LTN) specified by the transfer sequence number process unit 614, based on the internal management transfer sequence number and judges whether a sub internal management transfer sequence number (SubLTN) corresponding to the internal management transfer sequence number is set in the Global table 220A (S131). Then, if the sub internal management transfer sequence number is set, it shifts the process to the step S132, while if a sub internal management transfer sequence number is not set, it returns the process back to the step S123.

In the step S132, it generates a main route-use inter-GW extension header defining information related to the internal management transfer sequence number as Main in inter-GW extension header 112 and a sub route-use inter-GW extension header defining information related to the sub internal management transfer sequence number as Sub in inter-GW extension header 112.

Then, it obtains a RouteCode set in the RouteCode table 632 and also obtains output port information (i.e., main route output port information) corresponding to the internal management transfer sequence number (LTN) and output port information (i.e., sub route output port information) corresponding to the sub internal management transfer sequence number from the Global table 220A. Then it sets the RouteCode and packet serial number in the main route-use inter-GW extension header and sub route-use inter-GW extension header, thereby completing the inter-GW extension header. Also the route management process unit 631 refers to the transmission transfer table 240A based on the internal management transfer sequence number and sub internal management transfer sequence number, and obtains output port information corresponding to the internal management transfer serial number and one corresponding to the sub internal management transfer sequence number from the transmission transfer table 240A. And it transmits, to the tunnel process unit 616, an IP packet (i.e., a main route-use IP packet) added by the main route-use inter-GW extension header and an IP packet (i.e., a sub route-use IP packet) added by the sub route-use inter-GW extension header.

In this event, the route management process unit 631 notifies the tunnel process unit 616 of output port information indicating a port to which an IP packet is to be output when transmitting the main route-use IP packet to the tunnel process unit 616. Likewise, when transmitting the sub route-use IP packet to the tunnel process unit 616, the route management process unit 631 notifies it of output port information indicating a port to which the IP packet is to be output (S133).

The tunnel process unit 616 and packet transmission/reception unit 617 carry out process of the step S140.

In the step S140, the tunnel process unit 616 encrypts a packet received from the route management process unit 631, transfer sequence number process unit 614 or IP routing process unit 615. The packet transmission/reception unit 617 transmits the encrypted packet from an output port of the global side interface 612 that is notified (i.e., designated) to the transfer sequence number process unit 614 by the route management process unit 631, transfer sequence number process unit 614 or IP routing process unit 615.

By the process of the step S140, the main route-use IP packet is transmitted to the GW-B and the sub route-use IP packet is transmitted to the GW-C.

{Process at GW-B}

The next is a description on a process of an IP packet at the GW-B received from the global side interface 612 by referring to FIG. 25.

FIG. 25 is a flow chart showing a procedure for the GW-B processing an IP packet received from the global side interface 612.

The packet transmission/reception unit 617 first receives an IP packet from the global side interface 612 and transfers the IP packet (noted as "received IP packet" hereinafter) to the tunnel process unit 616 (S201).

Then the tunnel process unit 616 applies the process of the step S210 to the received IP packet. The step S210 is consisted of the steps S211 and S212.

In the step S211, the tunnel process unit 616 decrypts the received IP packet. Then it judges whether or not the header of the IP packet obtained by the decryption is an inter-GW header (i.e., a header constituted by the inter-GW standard header 111 and inter-GW extension header 112 (S211). And, if the header of the IP packet is an inter-GW header, it shifts the process to the step S212. On the contrary if not an inter-GW header, it shifts the process to the step S213.

In the step S212, the tunnel process unit 616 judges whether the RouteCode set in the inter-GW header is a subject of a delayed delivery discard. In this judgment, the tunnel process unit 616 examines whether the RouteCode set in the inter-GW header is set in the RouteCode table 632 and, if it is set therein, the RouteCode is judged to be the subject of a delayed delivery discard. If the judgment is that the RouteCode is the subject of a delayed delivery discard, the tunnel process unit 616 shifts the process to the step S214, while if the judgment is not a subject of a delayed delivery discard, it shifts the process to the step S220.

In the step S213, the tunnel process unit 616 judges that the received IP packet is a normal IP packet and transfer it to the IP routing process unit 615.

Process of the step 214 is different depending on the GW-B transferring the IP packet received from the tunnel process unit 616 or discarding it as a delayed delivery. In the case of transferring it, the process of the step S220 is carried out as described later. In the case of discarding it as a delayed delivery, a process of the route management process unit 631 of the GW-C is carried out as described later.

The transfer sequence number process unit 614 carries out S220. The steps S221 through S223 constitute S220.

In the step S221, the transfer sequence number process unit 614 refers to the reception transfer table 230B based on the transfer sequence number (TN) of the inter-GW header of the IP packet received from the tunnel process unit 616, and obtains an internal management transfer sequence number (LTN) corresponding to the destination sequence number from the reception transfer table 230B, followed by designating the internal management transfer sequence number.

Then, the transfer sequence number process unit 614 refers to the transmission transfer table 240B based on the designated internal management transfer sequence number, and obtains a transfer sequence number (TN) and a group sequence number (GN) corresponding to the designated internal management transfer sequence number from the transmission transfer table 240B. It then replaces the transfer sequence number (TN) and group sequence number (GN), of the IP packet received from the tunnel process unit 616, with the obtained transfer sequence number and group sequence number, respectively (S222).

Subsequently the transfer sequence number process unit 614 refers to the transmission transfer table 240B based on the designated internal management transfer sequence number, obtains an output port (OutPort) corresponding thereto from the transmission transfer table 240B, and transfer the IP packet in which a part of the inter-GW header (the destination sequence number and sender sequence number) is rewritten to the tunnel process unit 616 by designating the output port (S223).

Subsequent to the step S223, the process of the step S230 is carried out. The tunnel process unit 616 and packet transmission/reception unit 617 carry out the process of the step S230.

In the step S230, the tunnel process unit 616 encrypts the IP packet received from the transfer sequence number process unit 614, and then transmits the encrypted IP packet to the packet transmission/reception unit 617 along with the output port designated by the transfer sequence number process unit 614. The packet transmission/reception unit 617 transmits the IP packet received from the transfer sequence number process unit 614 from the designated output port of the global side interface 612.

In the process of the step S230, the IP packet is transmitted to the GW-C.

{Process at GW-C}

The next is a description of the process in the case of the GW-C receiving an IP packet from the global side interface 612. FIG. 26 is a flow chart showing a process procedure starting from the GW-C receiving an IP packet at the global side interface 612 until outputting it to a local side interface 611.

The packet transmission/reception unit 617 receives an IP packet from the global side interface 612 and transfers it to the tunnel process unit 616 (S301).

Then the tunnel process unit 616 carries out the process of the step S310 that is constituted by the steps S311 and S312.

In the step S311, the tunnel process unit 616 decrypts an IP packet (i.e., a first IP packet) received from the packet transmission/reception unit 617, followed by judging whether the header of the IP packet obtained by the decryption (i.e., the second IP packet) is an inter-GW header (i.e., a header constituted by the inter-GW standard header 111 and inter-GW extension header 112). And, if the header is an inter-GW header, it shifts the process to the step S312. On the other hand, if not an inter-GW header, it shifts the process to the step S313.

In the step S312, the tunnel process unit 616 judges whether a RouteCode is set for the route management process unit 631 and, if a RouteCode is set, it transfers the second IP packet to the route management process unit 631, while if a RouteCode is not set, it shifts the process to the step S330.

In the step S313, the tunnel process unit 616 transfers the second IP packet to the IP routing process unit 615.

The route management process unit 631 carries out the process of the step S320 that is constituted by the steps 321 through S324.

In the step S321, the route management process unit 631 judges whether the RouteCode set in the inter-GW header of the second IP packet is a subject of a delayed delivery discard.

In this judgment, it examines whether the RouteCode set in the inter-GW header is set in the RouteCode table 632 and, if set, the RouteCode is judged to be the subject of a delayed delivery discard. The route management process unit 631 shifts the process to the step S322 if it judges that the Route-Code is the subject of a delayed delivery discard, or shifts the process to the step S325 if it judges that the RouteCode is not the subject.

In the step S322, the route management process unit 631 examines the group sequence number (GN), destination sequence number (DN), RouteCode and packet sequence number which are set in the inter-GW header of the second IP packet, and judges whether a set of these is stored in the delayed delivery management buffer 633. And, if the set of these is stored in the delayed delivery management buffer 633, it discards the second IP packet as a delayed delivery packet (S326).

Contrarily, if a set of the group sequence number, destination sequence number, RouteCode and packet sequence number is not stored in the delayed delivery management buffer 633, it stores the set of these therein (S323).

Upon completing the process of the step S323, the route management process unit 631 deletes the inter-GW extension header 112 from the second IP packet and transfers the IP packet (the third IP packet), which is the resultant of the deletion, to the transfer sequence number process unit 614 (S324).

Meanwhile, if the judgment in the step S312 is "no", or when completing the process of the step S324, it shifts the process to the step S330.

The transfer sequence number process unit 614 carries out the process of the step S330 that is constituted by the steps S331 through S332.

In the step S331, the transfer sequence number process unit 614 refers to the reception transfer table 230C based on the transfer sequence number (TN) of the inter-GW standard header 111, and obtains, from reception transfer table 230C, an internal management transfer sequence number (LTN) corresponding to the transfer serial number, followed by designating the internal management transfer sequence number.

Then the transfer sequence number process unit 614 recognizes that the designated internal management transfer sequence number is a designation of "Local", and transfers the third IP packet to the header process unit 613 (S332).

Subsequent to the process of the step S332, the process of the step S340 is carried out. The header process unit 613 carries out the process of the step S340 that is constituted by the steps S341 and S342.

In the step S341, the header process unit 613 refers to the Local table 200C and Global table 220C based on the destination sequence number (DN) and sender sequence number (SN) set in the inter-GW standard header 111 of the third IP packet, and obtains a destination address (DA) and a sender address (SA) corresponding to the sender sequence number. The destination address is obtained from the Local table 200C based on the destination sequence number. The sender address is obtained from the Global table 220C based on the sender sequence number. Then the header process unit 613 replaces the destination address (DA) and sender address (SA), of the IP header of the third IP packet, with the obtained destination address and sender address, respectively.

Then the header process unit 613 deletes the inter-GW standard header 111 from the third IP packet, followed by transferring the IP packet as a resultant of the deletion to the local side network 300 by way of the local side interface 611 (S342).

Third Embodiment

In the case of a certain GW performing a communication on two routes in the IP network system shown by the first and second embodiments, all of the GWs placed in communication paths of packets (i.e., transfer paths) need to share the latest inter-GW extension header information at a start/end of the communication. Consequently, required is a process for updating inter-GW extension header information possessed by individual GWs to the latest information by synchronizing with one another.

The third embodiment is for implementation method of a synchronous process for updating the inter-GW extension header among the GWs.

The description here is on a synchronous update process of the inter-GW extension header information by exemplifying the network system shown in FIG. 9. That is, the description exemplifies the case that the PC-A, server 201 and Note-C are grouped as the group 1 with the PC-A being a terminal under the control of the GW-A, the server 201 being a terminal under the control of the GW-B and the Note-C being a terminal under the control of the GW-C. Assume that between the GW-A and GW-B, and between the GW-B and GW-C, are already connected by tunnels, respectively. That is, one route communication is already performed between the GW-A and GW-C. The description here is on the process of the case of a communication between the GW-A and GW-C shifting to a two-route communication by establishing a unicast-use tunnel anew between the GW-A and GW-C.

Figure 27:
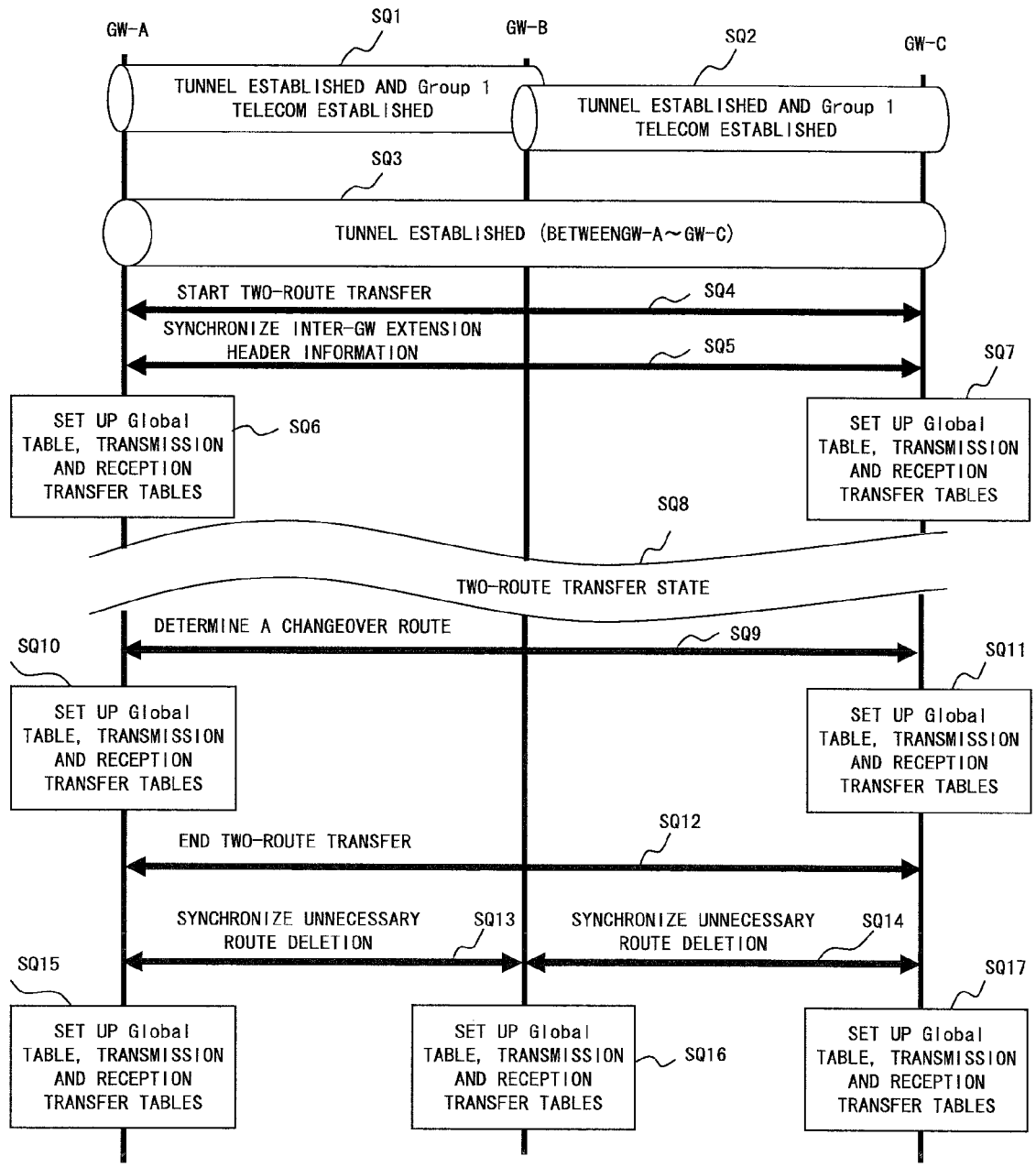
FIG. 27 is a sequence diagram of a synchronous update process for inter-GW extension header information according to a third embodiment.

FIG. 27 is a sequence diagram showing a method for the GW-A, GW-B and GW-C updating inter-GW extension header information by synchronizing with one another in the case of the communication between the GW-A and GW-C shifting from one route to two routes.

The next is a description on a synchronous update process of the inter-GW extension header information by referring to FIG. 27.

Assumption is that a tunnel is established between the GW-A and GW-B and a communication for the group 1 (i.e., a group 1 communication) is established (SQ 1). Also, a tunnel is established between the GW-B and GW-C and the group 1 communication is established (SQ 2).

In this state, a unicast-use tunnel is established between the GW-A and GW-C (SQ 3), starting a two-route transfer between the GW-A and GW-C (SQ 4). It may be configured to perform an inter-GW certification between the GW-A and GW-C.

By establishing the tunnel, the GW-A and GW-C determine a RouteCode, and start checking inter-GW extension header information.

Carried out next is a synchronous process for the inter-GW extension information between the GW-A and GW-C (SQ 5).

By the inter-GW extension information synchronous process, the GW-A sets necessary information in the RouteCode table 210A, Global table 220A and transmission transfer table 240A (SQ 6) for carrying out a unicast with the GW-C. Also, the GW-C sets necessary information in the RouteCode table 210C, Global table 220C and transmission transfer table 240C for carrying out a unicast with the GW-A (SQ 7).

That is, the GW-A sets a RouteCode ("AC") in the RouteCode table 210A (refer to FIG. 11A). It also sets "5" to the sub internal management transfer sequence number item of a record where the virtual IP address (V-IP) item of the Global table 220A is the virtual IP address (i.e., "cD") of the Note-C under the control of the GW-C (refer to FIG. 11C). Furthermore, it adds a record related to the sub internal management transfer sequence number (i.e., "5") to the Global table 220A (refer to FIG. 11E).

The GW-C sets the RouteCode ("AC") in the RouteCode table 210C (refer to FIG. 13A). It also sets "5" to the sub internal management transfer sequence number item of a record where the virtual IP address (V-IP) item of the Global table 220C is the virtual IP address (i.e., "aD") of the PC-A under the control of the GW-A (refer to FIG. 13C). Furthermore, it adds a record related to the sub internal management transfer sequence number to the transmission transfer table 240C (refer to FIG. 13E).

As described above, when the GW-A and GW-C synchronously update the RouteCode table 210, Global table 220 and transmission transfer table 240 of their own, a two-route transfer state utilizing two routes, i.e., the existing route and newly added route (SQ 8) is started.

That is, a unicast is carried out between the GW-A and GW-C by utilizing the two routes, i.e., the existing route of the GW-A to GW-B to GW-C, and the new route of the GW-A to GW-C. Then the GW-A and GW-C start checking the inter-GW extension header 112 of an IP packet to be receiving.

Subsequently, a route switching occurs for unifying a route by the method described for the second embodiment, thus establishing a unicast-use route (SQ 9). In this case, the assumption is that it has been unified to the new route.

The GW-A deletes the RouteCode (i.e., "A") set in the RouteCode table 210A (SQ 10). The GW-C deletes the RouteCode (i.e., "AC") set in the RouteCode table 210C (SQ 11).

By the above-described processes, the two-route transfer ends and the GW-A and GW-C end checking the inter-GW extension header 112 of the received IP packet (SQ 12).

Subsequently a synchronous process for deleting a route becoming unnecessary associated with the route unification is carried out between the GW-A and GW-B, and between the GW-B and GW-C (SQ 13 and SQ 14).

By the route deletion synchronous process, the GW-A updates the Global table 220A and transmission transfer table 240A as shown in FIG. 18 (SQ 15). And the GW-B updates the reception transfer table 230B as shown in FIG. 19 (SQ 16). And the GW-C updates the Global table 220C and transmission transfer table 240C as shown in FIG. 20 (SQ 17).

Fourth Embodiment

The above-described second embodiment is a method for shifting an inter-GW communication path (i.e., a transfer path) stepwise and seamlessly to an optimized path in the case of the inter-GW communication being a unicast.

The fourth embodiment (also noted as "the present embodiment" hereinafter) is related to a method for shifting an inter-GW communication path (i.e., a transfer path) stepwise and seamlessly to an optimized path in the case of the inter-GW communication being a broadcast and multicast.

FIG. 28 is a diagram showing a state of temporary two-route transfer in a network system according to the fourth embodiment. Note that the same component sign is assigned to the same constituent component as one shown in FIG. 9, in the showing of FIG. 28.

A temporary two-route communication (i.e., a transfer) is also required between the GW-A and GW-C for the present embodiment as shown in FIG. 28.

As shown in FIG. 28, the present embodiment is configured to establish a tunnel 501 between the GW-A and GW-B, and also establish a tunnel 502 between the GW-B and GW-C. Also a tunnel 504 between the GW-A and section between the GW-A and GW-B for a multicast is established. The tunnel 504 is similar to the virtual tunnel 91 according to the first embodiment. The PC-A under the control of the GW-A transmits a packet to the server 201 under the control of the GW-B and to the Note-C under the control of the GW-C on broadcast/multicast by utilizing these tunnels. In this case, a packet of a broadcast/multicast transmitted from the GW-A to the tunnel 504 is copied by the CE 401 and transferred to the GW-B and also to the GW-C side. The packet of the broadcast/multicast transferred to the PE 411 is transmitted to the GW-C by way of the PE 411, Internet 400, PE 413 and PE 412. Note that the tunnel 503 (shown in FIG. 28) established between the GW-A and GW-C is one for a unicast.

As such, the packet of the broadcast/multicast transmitted by the PC-A is transferred by utilizing the two routes, that is, the first route constituted by the tunnel 501 and tunnel 502, and the second route constituted by the tunnel 504 in the IP network shown in FIG. 28. In this case, the GW-C receives the same packet of the broadcast/multicast from the two routes, and therefore performs a delayed delivery discard process.

The next is a description of a seamless path change method of a broadcast/multicast by means of a technique according to the present embodiment by referring to FIGS. 29 through 32.

FIG. 29 is a diagram totally showing a seamless path change method according to the fourth embodiment. FIGS. 30, 31 and 32 are diagrams showing structures, and states, of the respective internal tables of the GW-A, GW-B and GW-C accomplishing the seamless path change method. Note that the description here is based on the assumption that the previous states of the tables shown in FIGS. 30, 31 and 32 are as shown in FIGS. 18, 19 and 20, respectively.

{Outline}

The fourth embodiment is configured to add a group sequence number (GN) item to a record of the reception transfer table 230 as shown in FIGS. 30 through 32. This is for identifying a group to which a packet received by each GW belongs. In a broadcast and multicast, a single packet is transferred to a plurality of points, and therefore a transfer sequence number (TN) needs to be common and a group sequence number (GN) needs to be forcibly converted.

The present embodiment is configured to carry out the process as described in the following paragraphs (1) through (6).

(1) The GW-A newly equips the global side interface 612 with an output port defined as "ABC" used for a broadcast/multicast. And it sets the output port (i.e., "ABC") in a spare internal management transfer sequence number (i.e., "2") of the transmission transfer table 240A as shown in FIG. 30E.

(2) The GW-A sets the sub internal management transfer sequence number (i.e., "2") as the sub-route-use internal management transfer sequence number to the virtual IP address (i.e., "Broad") used for a broadcast as shown in FIG. 30C. It also sets the sub internal management transfer sequence number (i.e., "2") likewise to the virtual IP address (i.e., "Multi") used for a multicast.

(3) A transfer sequence number (i.e., "2") commonly usable among the GW-A, GW-B and GW-C is figured out, and the GW-A and GW-C set the transfer sequence number (i.e., "2") to the respective transmission transfer table 240 (refer to FIGS. 30C and 32C).

(4) The GW-A, GW-B and GW-C set the figured-out common transfer sequence number (i.e., "2") to the respective reception transfer table 230A along with the group sequence number (GN) for the group 1 of the terminal under the respective control of themselves (refer to FIGS. 30D, 31D and 32D).

(5) The GW-A, when receiving an IP packet set up with a broadcast address at the IP header, adds an inter-GW header 110 (i.e., inter-GW standard header 111 and inter-GW extension header 112) to the IP packet and transmits it to two routes (refer to FIG. 29).

(6) The GW-B, when receiving a broadcast packet from two routes transmitted by the GW-A, refers only to the inter-GW standard header 111 (i.e., TN, GN, DN and SN) of the packet and performs a transfer process to the GW-C. It also checks the group sequence number (GN) destination sequence number (DN), sender sequence number (SN), RouteCode and packer sequence number (PN) of the inter-GW header 110 of the broadcast packet received from the two routes, and carries out a delayed delivery discard process related to a transfer packet to the Local, that is, the packet to be transferred to the server 201 under the control of itself.

(6) The GW-C checks the group sequence number (GN) destination sequence number (DN), sender sequence number (SN), RouteCode and packer sequence number (PN) of the inter-GW header 110 of the broadcast packet received from the two routes, and carries out a delayed delivery discard process.

{Internal Table Setup Process of GW}

The next is a description on the internal table setup process of the GW-A, GW-B and GW-C. Here, the description exemplifies the internal table setup process of the GW-A.

Figure 33:
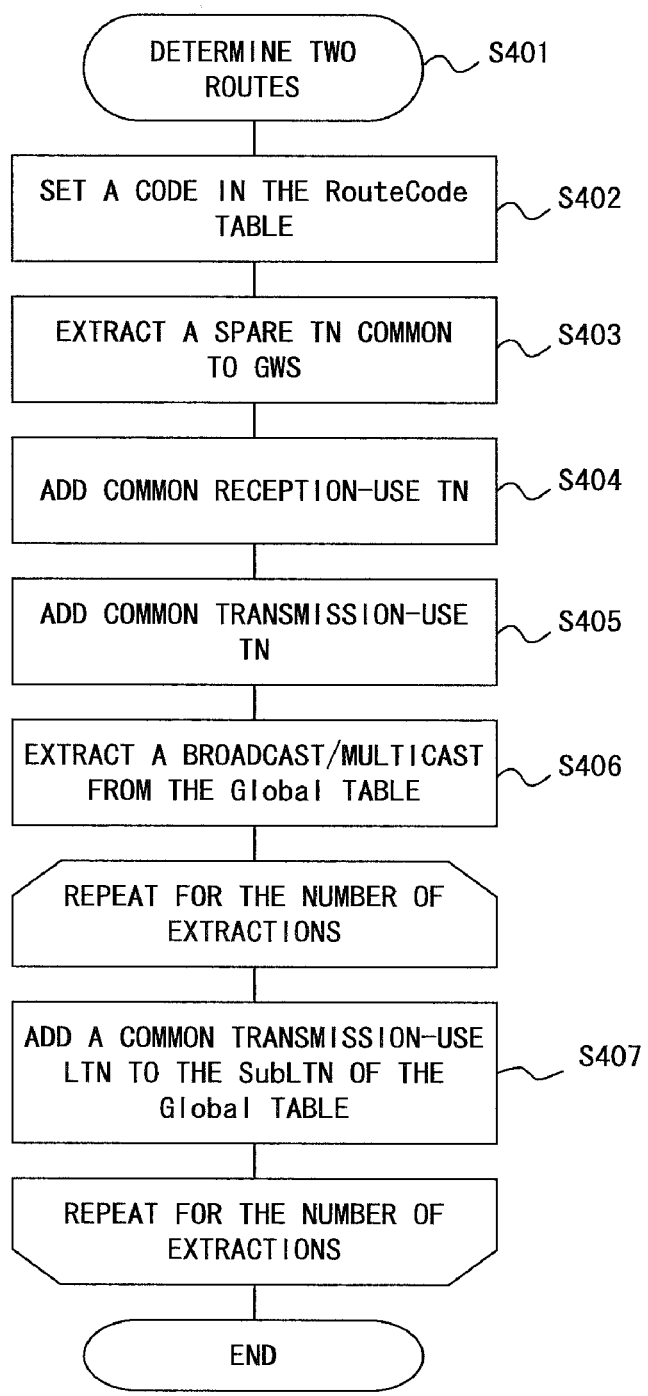
FIG. 33 is a flow chart showing a procedure of an internal table setup process of a GW-A according to the fourth embodiment.

FIG. 33 is a flow chart showing a procedure of an internal table setup process of a GW-A according to the fourth embodiment.

The GW-A determines two routes for transmitting a broadcast packet (S401). It then sets a RouteCode to the RouteCode table 210A (S402). According to the example shown in FIG. 30, an "ABC" is set as the RouteCode.

Then it extracts a spare transfer sequence number (TN) that is common to all of the gateways (i.e., GW-A, GW-B and GW-C) placed on the two routes (S403). According to the example shown in FIG. 30, a "2" is extracted as the spare transfer sequence number.

It then adds the extracted transfer sequence number to the reception transfer table 230A (S404). The GW-A is the sender gateway of the broadcast/multicast packet, and therefore adds a record constituted by four items, that is, the "transfer sequence number ("2")", "internal management transfer sequence number ("Local")", "group sequence number ("1")" and "sub internal management transfer sequence number (not set)", according to the example shown in FIG. 30.

Then the GW-A adds an internal management transfers sequence number (LTN) corresponding to the output port used for a broadcast/multicast to the transmission transfer table 240A (S405). It adds a record constituted by the "internal management transfer sequence number ("2")", "transfer sequence number ("2")", "group sequence number (not set)" and "output port ("ABC")" to a spare entry of the transmission transfer table 240A according to the example shown in FIG. 30.

Subsequently, the GW-A extracts an address used for a broadcast/multicast from the Global table 220A (S406). It extracts one broadcast address (i.e., "Broad") and one multicast address (i.e., "Multi") according to the example shown in FIG. 30.

And lastly, the GW-A adds the internal management transfer sequence number (i.e., the common transmission-use internal management transfer sequence number), which has been added to the transmission transfer table 240A in the step S405, to the item of "sub internal management transfer sequence number" of the record to which a virtual IP address used for a broadcast, or one used for a multicast, is set, of the Global table 220A (S407).

The process of the step S407 is repeated for the number of addresses extracted in the step S406. What is set by a repeated process of the step S407 are the sub internal management transfer sequence numbers (i.e., "2") to the sub internal management transfer sequence number item of the record, to which the broadcast-use virtual IP address (i.e., "Broad") is set, and to the sub internal management transfer sequence number item of the record, to which the multicast-use virtual IP address is set, respectively, according to the example shown in FIG. 30.

{Route Switching}

In reference to FIGS. 34 through 37, Let us describe the technique for unifying a route by switching routes in the state of transferring broadcast packet/multicast packet temporarily on two routes as shown in FIG. 29.

FIG. 34 is a diagram showing a state of a two-route transfer state of a broadcast/multicast shown in FIG. 29 being switched to a one-route transfer. In the showing of FIG. 34, the same component sign is assigned to the same constituent component as that of FIG. 29. FIGS. 35, 36 and 37 are diagrams showing contents of the respective internal tables of the GW-A, GW-B and GW-C in the state shown in FIG. 34.

Referring to FIG. 29, the main route is defined as the one for transmitting a packet from the output port AB of the GW-A, while the sub-route is defined as the one for transmitting a packet from the output port ABC thereof. FIG. 34 shows an example of unifying the route for use in a broadcast/multicast to the sub-route by changing the main route over to the sub-route.

Such a unification to the sub-route is implemented by the GW-A, GW-B and GW-C carrying out the processes for switching between an internal management transfer sequence number (LTN) and a sub internal management transfer sequence number (SubLTN) in the respective tables, and for deleting an unnecessary internal management transfer sequence number (LTN) from the transmission transfer table 240 (refer to FIGS. 35 through 37).

The next is a description of the processes for the GW-A, GW-B and GW-C changing the respective internal tables from the state shown in FIG. 30 through 32 to the state shown in FIGS. 35 through 37 by means of the route unification.

{Internal Table Change Process of GW as Subject of Two-Route}

FIG. 38 is a flow chart showing a process for the GW-A changing the internal table from the state shown in FIG. 30 to the one shown in FIG. 35. In the state of FIG. 30, the GW-A is the GW for a sender of a two-route transfer (i.e., the GW as a subject of two routes). The flow chart shown in FIG. 38 is the same as the one shown in the already described FIG. 21.

The GW-A determines a route used for a broadcast/multicast as one route (S501). The GW-A determines the route transmitting a packet from the output port ABC according to the example shown in FIG. 34. In this process, it interchanges the internal management transfer sequence number (LTN) and sub internal management transfer sequence number (SubLTN) of lines in which virtual IP addresses (V-IP) are set as "Broad" and "Multi", respectively, and the interchanging is followed by deleting the sub internal management transfer sequence number.

Then the GW-A deletes a RouteCode, which has become unnecessary associated with the determining the route, from the RouteCode table 210A (S502). This process deletes the RouteCode (i.e., "ABC") from the RouteCode table 210A as shown in FIG. 35.

It then extracts an internal management transfer sequence number (LTN) corresponding to the route as the subject of deletion from the Global table 220A (S503). This process extracts the internal management transfer sequence number of "3" and "4" from the Global table 220A.

The processes of the following steps 504 through 507 are repeated for the number of the internal management transfer sequence numbers extracted in the step S503. The processes of the steps 504 through 506 are repeated twice according to the example shown in FIG. 30.

In the step S504, the GW-A judges whether the internal management transfers sequence number (noted as "target internal management transfer sequence number" hereinafter) is set (i.e., defined) in another table. And, if the number is not defined in another table, it shifts the process to the step S505. While if the number is defined in another table, it shifts the process to the step S507.

In the step S505, the GW-A deletes, from the transmission transfer table 240A, a line (i.e., the record) in which the target internal management transfer sequence number is set. This process first deletes the line in which the target internal management transfer sequence number of "3" is set, followed by the second repetition deleting, from the transmission transfer table 240A, the line in which the target internal management transfer sequence number of "4" is set.

In the step S507, the target internal management transfer sequence number is used in another route and therefore a deletion process is not carried out.

Upon completing the process of the step S505, the GW-A requests the opposite GW of the output port set in the output port item of the line deleted in the step S504 for deleting the transfer sequence number (TN) that has been set in the deleted line (S506). This process first requests the GW-B for deleting the transfer sequence number of "3", followed by requesting the GW-B for deleting the transfer sequence number of "4" in the second time.

The above described processes change the Global table 220A and transmission transfer table 240A, among the internal tables of the GW-A, to the respective manners as shown in FIGS. 35C and 35E.

{Internal Table Change Process of GW as Subject of a Transfer Sequence Number (Tn) Deletion Process}

<Process at GW-B>

Figure 39:
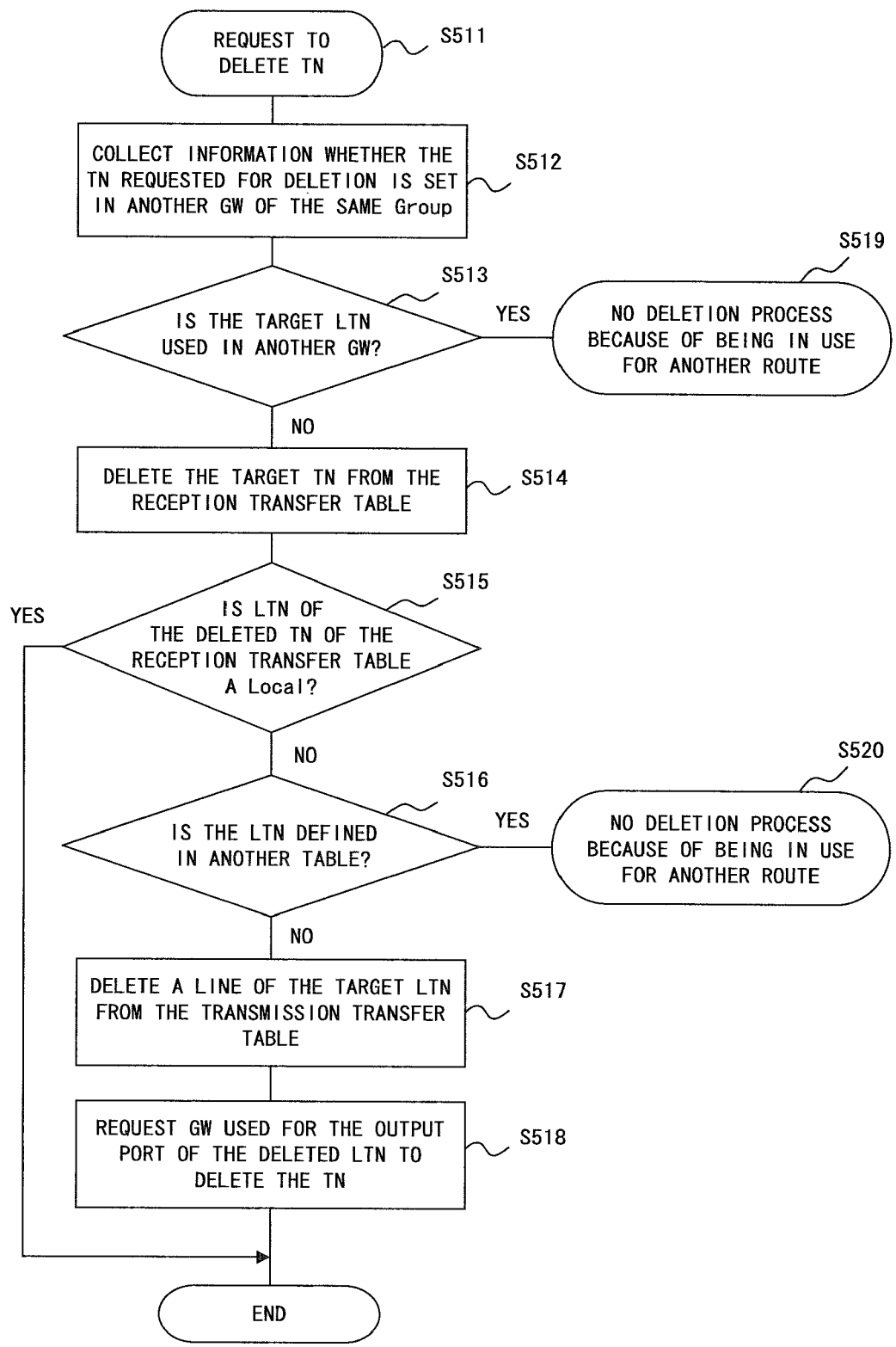
FIG. 39 is a flow chart showing an internal table change process of a GW-B according to the fourth embodiment.

FIG. 39 is a flow chart showing an internal table change process of a GW-B according to the fourth embodiment. The flow chart shown in FIG. 39 is the same as the above-described flow chart shown in FIG. 22.

The GW-B receives the request from the GW-A for deleting the two transfer sequence numbers (i.e., "3" and "4") by the process of the step S506 shown in FIG. 38 (S511).

Having received the deletion request, the GW-B refers to the transmission transfer table 240B and collects information as to whether the two transfer sequence numbers (i.e., "3" and "4") requested for deletion as described above are set for other GWs (i.e., the GW-A and GW-C) of the same group (i.e., Group 1, of the group sequence number (GN) being "1", to which the PC-A belongs in this case) (S512). The information of the transfer sequence numbers "3" and "4" destined for the GW-B related to the GW-A and GW-C in the example of FIG. 29.

Subsequently the GW-B judges whether or not the transfer sequence number (i.e., the target transfer sequence number) requested for deletion as described above is used in another GW based on the collection result (S513). And, if the target transfer sequence number is not used in another GW, it shifts the process to the step S514. While if the target transfer sequence number is used, it shifts the process to the step S519. Since the number is not used in the example of FIG. 31, the process accordingly shifts to the step 514.

In the step S514, the GW-B deletes the target transfer sequence number from the reception transfer table 230B. This process deletes the lines in which "3" and "4" are set as the transfer sequence numbers from the reception transfer table 230B.

Subsequent to the step S514, the GW-B judges whether the internal management transfer sequence number (LTN) of the transfer sequence number, which has been deleted, from the reception transfer table 230B is "Local" (S515). If the number is not "Local", it shifts the process to the step S516, while if the number is "Local", it terminates the execution of the process of the present flow chart. In the example of FIG. 29, the internal management transfer sequence number corresponding to the transfer sequence number (i.e., "3") is a "2", and the internal management transfer sequence number corresponding to the transfer sequence number (i.e., "4") is a "5" (refer to FIG. 31D). Therefore the process shifts the step S516.

In the step S516, the GW-B judges whether the transfer sequence number is defined in another table. And, if the transfer sequence number is not defined in another table, it shifts the process to the step S517, while, if the transfer sequence number is defined, it shifts the process to the step S520. In the example of FIG. 31, the internal management transfer sequence number, i.e., "2", is defined in the reception transfer table 230A; an internal management transfer sequence number, i.e., "5", is not defined. Therefore, it shifts the process to the step S520 for the transfer sequence number of "2", and to the step S517 for the transfer sequence number of "5".

In the step S517, the GW-B deletes a line, in which the target internal management transfer sequence number is set, from the transmission transfer table 240B. In the example of FIG. 31, it deletes the line in which the internal management transfer sequence number of "5" is set, of the transmission transfer table 240B.

And lastly, the GW-B requests a GW, which is for an output port corresponding to the internal management transfer sequence number that has been deleted in the step S517 to delete a transfer sequence number (TN) corresponding to the internal management transfer sequence number (S518). In the example of FIG. 31, the output port corresponding to the deleted internal management transfer sequence number is "BC", and therefore it requests the GW-C to delete the transfer sequence number of "1".

<Process at GW-C>

The process at the GW-C is carried out by the procedure shown in the flow chart of FIG. 39 as in the case of the GW-B. The description here exemplifies the case of FIG. 29.

In the step S511, the GW-C receives a request from the GW-B for deleting the transfer sequence number of "1". The GW-C collects information of the transfer sequence number of "1" for the GW-C from the GW-A and GW-B by carrying out the process of the step S512. Then, it carries out a judgment process of the step S513 and judges that the transfer sequence number of "1" from the GW-B is set in the transmission transfer table 240C. Therefore, the process shifts to the step S519 and ends the process of the flow chart of FIG. 39.

{Process at Each GW}
<Process at GW-A>

Figure 40:
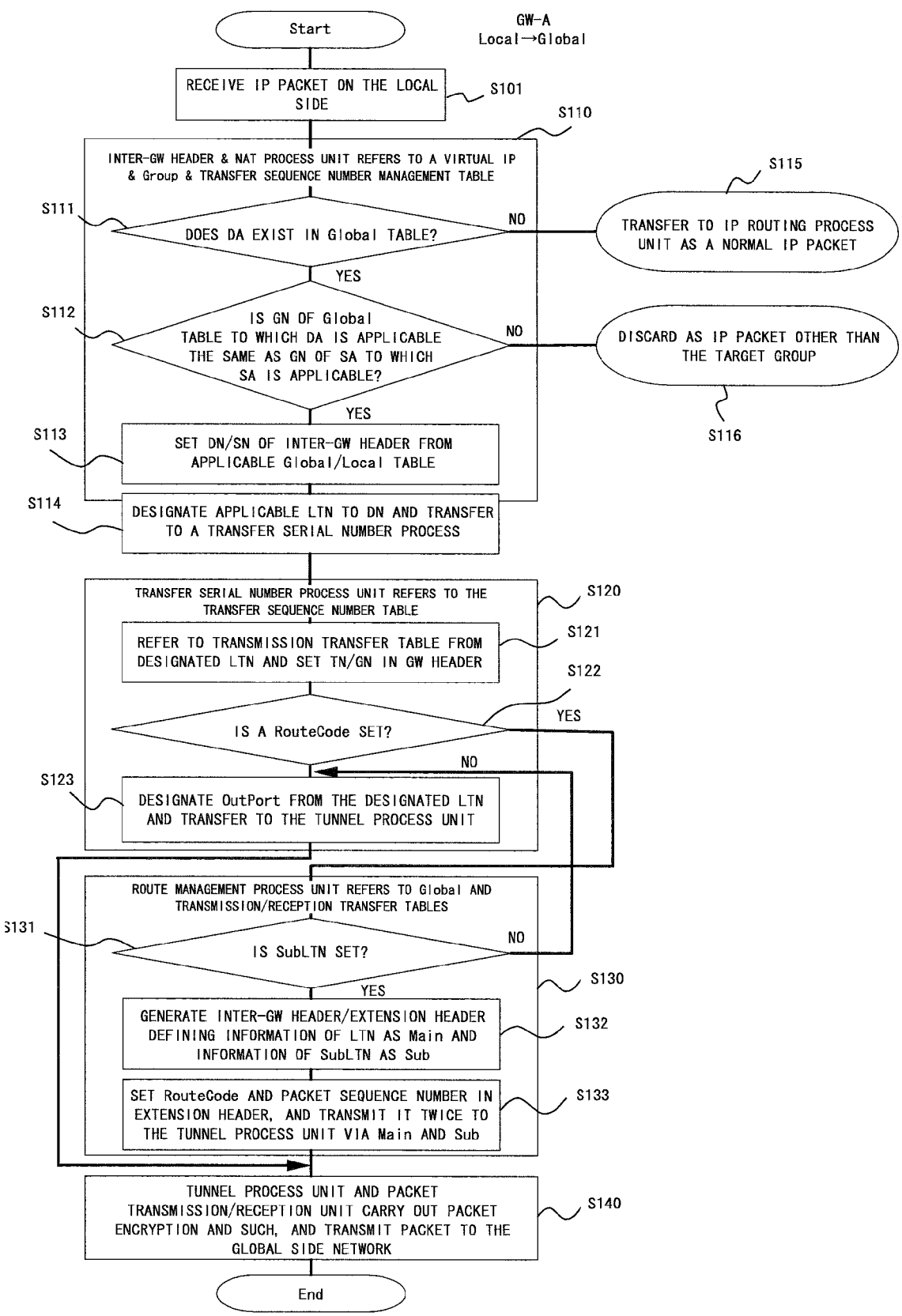
FIG. 40 is a flow chart showing a transmission/reception process for an IP packet of the GW-A according to the fourth embodiment.

FIG. 40 is a flow chart showing a transmission/reception process for an IP packet of the GW-A according to the fourth embodiment. In the showing of FIG. 40, the same step number is assigned to the same step as that of FIG. 22. The flow chart of FIG. 40 is exactly the same as the one shown in FIG. 22. Therefore, a description of the flow chart of FIG. 40 is omitted here.

<Process at GW-B>

Figure 41:
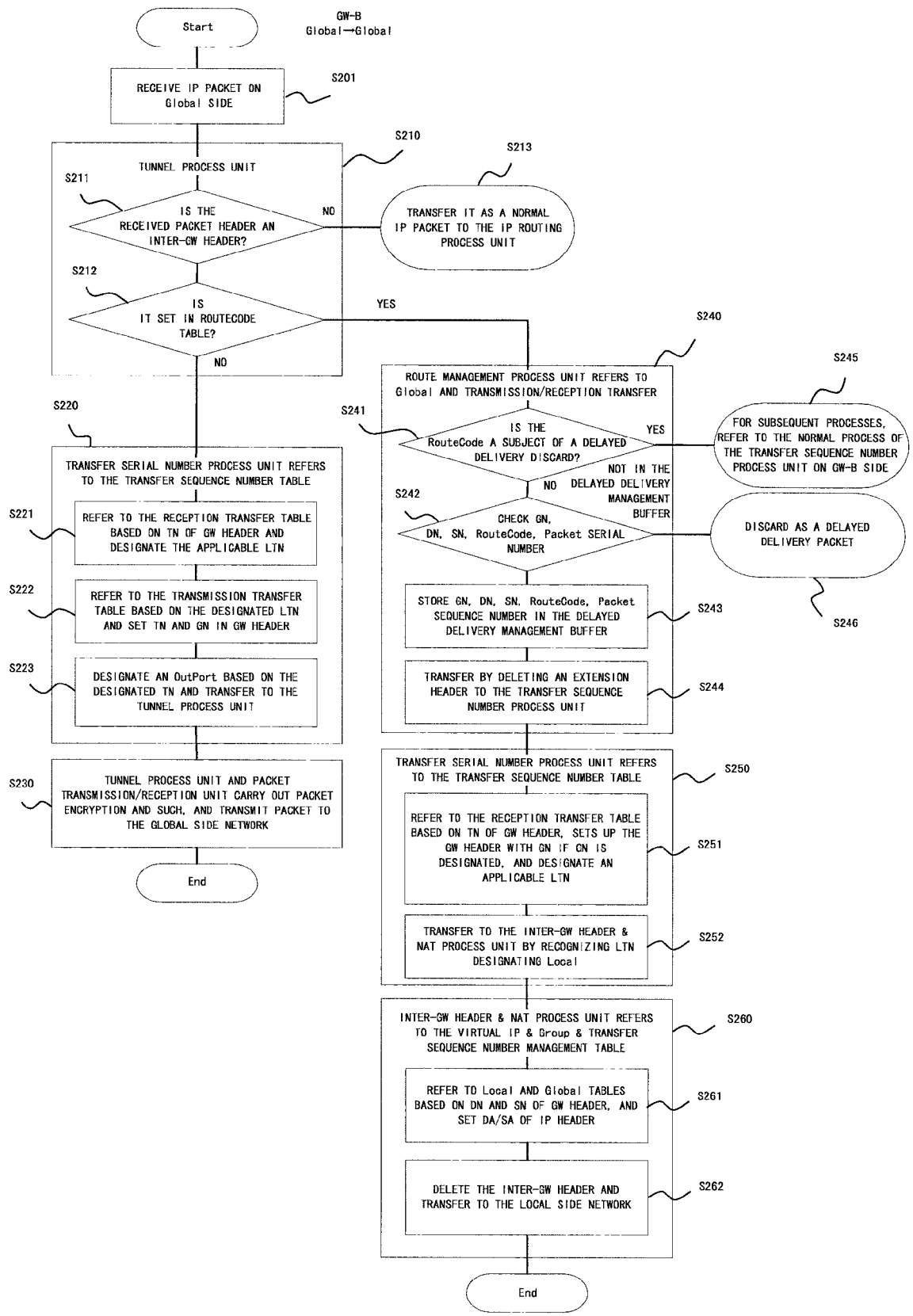
FIG. 41 is a flow chart showing a transmission/reception process for an IP packet of the GW-B according to the fourth embodiment.

FIG. 41 is a flow chart showing a transmission/reception process for an IP packet of the GW-B according to the fourth embodiment. In the showing of FIG. 41, the same step number is assigned to the same step as that of FIG. 25. The step 240 (i.e., S241 through S244), and the step 260 (i.e., S261 and S262), of FIG. 41 are similar to the steps S320, S330, S340 and S340 of FIG. 26, respectively. And the steps S245 and S246 of FIG. 41 are similar to the steps S325 and S326 of FIG. 26, respectively.

Although the step S250 (i.e., S251 and S252) of FIG. 41 resembles the step S330 (i.e., S331 and S332) of FIG. 26, the process of the step S251 is a little different from that of the step S331. This is due to the fact that the record of the reception transfer table comprised by the GW according to the fourth embodiment is different from the record of the reception transfer table comprised by the GW according to the second embodiment. That is, a record of the reception transfer table has an item of a group sequence number (GN).

Here, the description is of the process of the step S251. The transfer sequence number process unit 614 refers to the reception transfer table 230B based on the transfer sequence number (TN) of the inter-GW header and, if a group sequence number (GN) is set (i.e., designated) in a record in which the transfer sequence number is set, sets the group sequence number (GN) in the inter-GW header in the step S251. It also designates an internal management transfer sequence number (LTN) specified in the record.

In the example of FIG. 29, the GW-B receives broadcast packets 105 and 106 transmitted by the GW-A from the global side interface 612. The transfer sequence number (TN) of the inter-GW header 110 of the broadcast packet 105 is "3", and the transfer sequence number (TN) of the broadcast packet 106 is "2". Therefore, a reference to the reception transfer table 230B shown in FIG. 31D finds out the fact that a group sequence number of "10" is designated for the transfer sequence number "2" which is set in the inter-GW header 110 of the broadcast packet 105. It also finds out the fact that a group sequence number is not designated for the transfer sequence number of "3" which is set in the inter-GW header 110 of the broadcast packet 106. Therefore, a group sequence number (GN) of the inter-GW header 110 of the broadcast packet 106 is set (i.e., changed) to "10". Meanwhile, the internal management transfer sequence number of the applicable record of the reception transfer table 230B is "Local", and therefore, the designated internal management transfer sequence number is set to "Local". Since the group sequence number of "20" is set for the broadcast packet 105, the group sequence number (GN) of the inter-GW header is not rewritten.

The transfer sequence number process unit 614 transfers either the broadcast packet 105 or 106 (whichever is received first) to the header process unit 613. Then in the step S260, the header process unit 613 refers to the Local table 200B and Global table 220B based on the destination sequence number of "255" and sender sequence number of "101" which are set in the inter-GW header of the broadcast packet, and sets (i.e., changes) the destination address (DA) and sender address (SA) of the TCP/IP header 120 of the broadcast packet at "Broad" and "aD", respectively (S261). Subsequently, the header process unit 613 deletes the inter-GW header 110 from the broadcast packet and transfers the IP packet obtained by the deletion to the server 201 by way of the local side interface 611.

<Process at GW-C>

Figure 42:
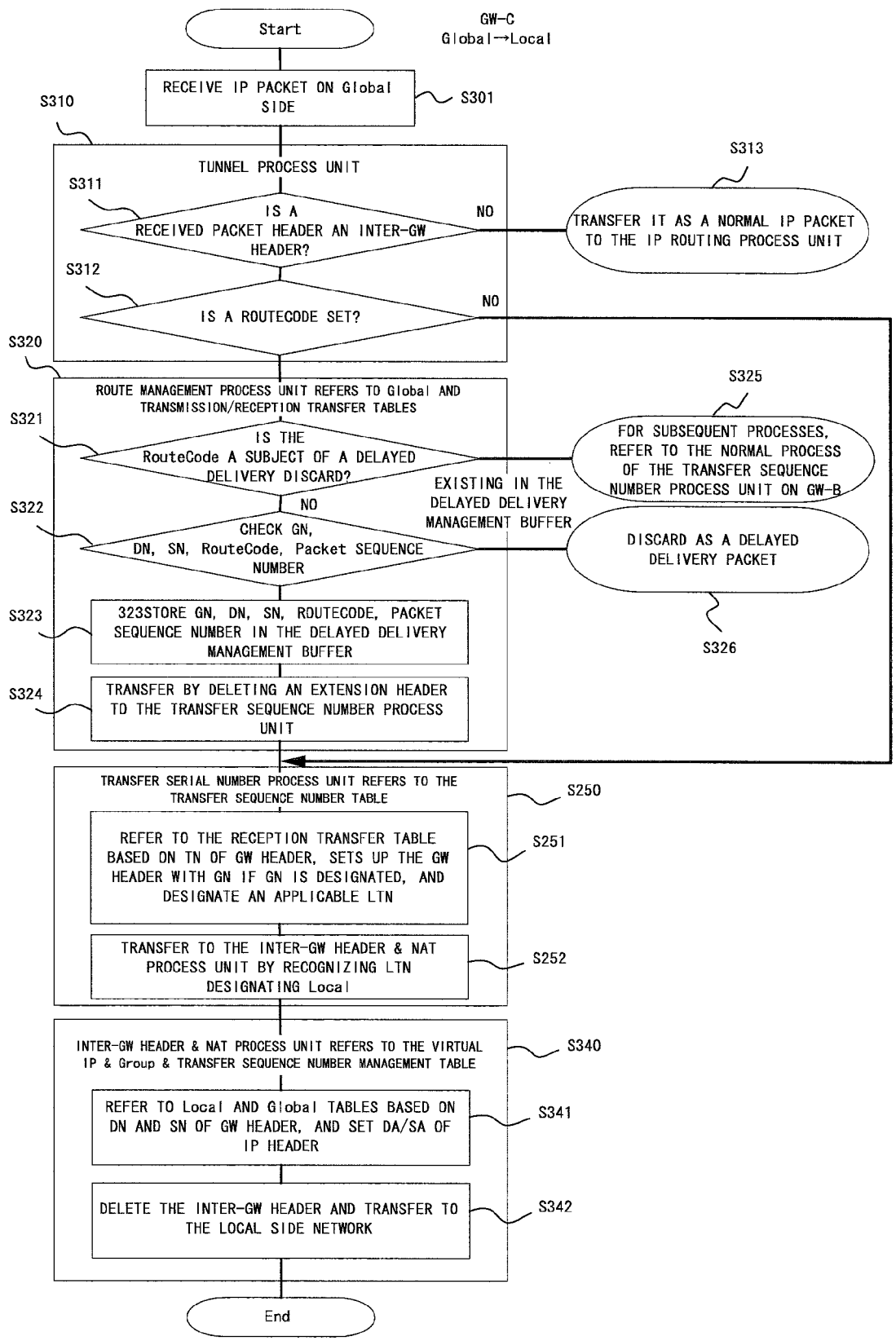
FIG. 42 is a flow chart showing a transmission/reception process for an IP packet at the GW-C according to the fourth embodiment.

FIG. 42 is a flow chart showing a transmission/reception process for an IP packet at the GW-C according to the fourth embodiment. In the showing of FIG. 42, the same step number is assigned to the same step as that of FIGS. 26 and 41, respectively. The process carried out by the transfer sequence number process unit 614 comprised by the GW-C is the same as one carried out by the transfer sequence number process unit 614 comprised by the GW-B (refer to the step S250).

In the case of the example shown in FIG. 29, the GW-C receives broadcast packets 105 and 108 from the GW-B. Then the GW-C applies the processes in order of the steps S320, S250 and S340 to the already received broadcast packet and transmits an IP packet 109 to the Note-C by way of the local side interface 611.

Fifth Embodiment

The fifth embodiment relates to a technique of a synchronous process for inter-GW extension header information among the individual GWs in the case of adding a multicast route as in the case of the fourth embodiment as described above.

Figure 43:
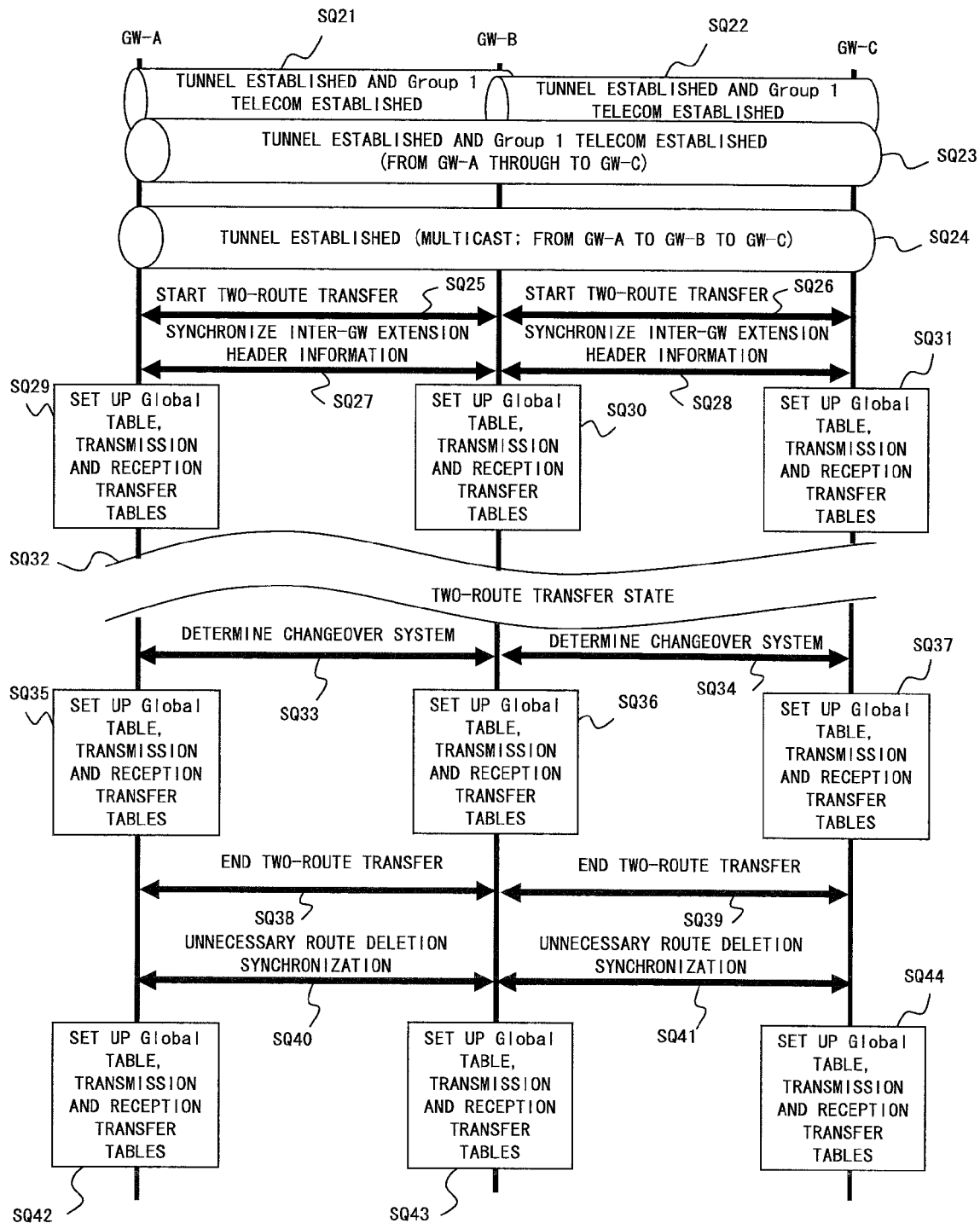
FIG. 43 is a diagram describing a sequence of a synchronous process for inter-GW extension header information between individual GWs according to a fifth embodiment.

FIG. 43 is a diagram describing a sequence of a synchronous process for inter-GW extension header information between individual GWs according to the fifth embodiment. FIG. 43 shows a sequence in the case of newly establishing a tunnel which is used for a broadcast/multicast and shifting to a broadcast/multicast on two routes, following a state of the GW-A and GW-B, the GW-B and GW-C, and the GW-A and GW-C being tunnel-connected, respectively, where the GW-A, GW-B and GW-C possess the respective terminals belonging to the group 1 as shown in FIG. 29.

The next is a description of a sequence of a synchronous process for inter-GW extension header information in the case of shifting the broadcast/multicast route from one to two routes by referring to FIG. 43.

A tunnel is established between the GW-A and GW-B, and a communication in the group 1 (noted as "group 1 communication" hereinafter) is established between the GW-A and GW-B (SQ 21). Then, a tunnel is established between the GW-B and GW-C, and a group 1 communication is established therebetween (SQ 22). Furthermore, a tunnel is established between the GW-A and GW-C, and a group 1 communication is established therebetween (SQ 23).

An assumption here is that the communication path constituted by the tunnel established between the GW-A and GW-B, and by the one established between the GW-B and GW-C, is capable of carrying out a broadcast/multicast (i.e., a state of a broadcast/multicast being enabled on one route).

Then a tunnel for carrying out a broadcast/multicast between the GW-A/GW-B and GW-C is established (SQ 24) and a transfer of a broadcast/multicast on the two routes is started between the GW-A, GW-B and GW-C (SQ 25 and SQ 26).

The tunnel established in the sequence SQ 24 (noted as "new tunnel" hereinafter) is accomplished by establishing a tunnel used for a broadcast/multicast anew between the GW-A/GW-B and GW-C when the GW-A, GW-B and GW-C are equipped, as shown in FIG. 28 for example. In this case the GW-A transmits a packet of the format as shown in FIG. 6 to the CE by utilizing the new tunnel. A multicast address is set to the IP header 11 of the packet.

The CE transfers the packet to the GW-B and GW-C since the multicast address is set to the IP header of the packet. Therefore, established are the existing broadcast/multicast-use route, that is, GW-A to GW-B to GW-C, and new broadcast/multicast-use route constituted by the route, that is, GW-A to CE to GW-B to GW-C, and the one, that is, GW-A to CE to GW-C, in this case.

A RouteCode is determined in the sequences SQ 24, SQ 25 and SQ 26. The GW-A, GW-B and GW-C set the respective RouteCode in the RouteCode tables 210 which are respectively possessed by the GW-A, GW-B and GW-C. The GW-A, GW-B and GW-C start checking inter-GW headers.

Then, the GW-A, GW-B and GW-C perform an inter-GW extension header information synchronous process among them, and assign a common internal management transfer sequence number (i.e., a common transmission-use internal management transfer sequence number and a common reception-use internal management transfer sequence number) (SQ 27 and SQ 28. By the inter-GW extension header information synchronous process of the above sequence SQ 27 and SQ 28, the GW-A, GW-B and GW-C set necessary information for a two-route transfer in the Global table 220, reception transfer table 230 and transmission transfer table 240 (SQs 29, 30 and 31).

By the processes described above, the state of transferring a broadcast/multicast packet on two routes is set among the GW-A, GW-B and GW-C (SQ 32).

The above process is followed by the GW-A, GW-B and GW-C determining a switching system, that is, determining a route for keeping as the main route in order to unify a broadcast/multicast-use route (SQs 33 and 34).

Then the GW-A, GW-B and GW-C change the Global table 220, reception transfer table 230 and transmission transfer table 240 based on the route switching information determined by the sequence SQs 33 and 34, and delete a route from the RouteCode table (SQs 35, 36 and 37).

Then the two-route packet transfer in broadcast/multicast between the GW-A, GW-B and GW-C is ended (SQs 38 and 39). Along with the end of the two-route transfer, the GW-A, GW-B and GW-C ends checking the inter-GW header of received IP packets.

Then the GW-A, GW-B and GW-C carry out a synchronous process for deleting the route now becoming unnecessary associated with the unification the route (SQs 40 and 41). Then, the GW-A, GW-B and GW-C change the Global table 220, reception transfer table 230 and transmission transfer table 240 according to a result of the unnecessary route deletion synchronous process (SQs 42, 43 and 44).

Sixth Embodiment

Also conceivable is a usage improving a security by tunneling not only between GWs but also between a GW and a host (i.e., a terminal). An example is the case of a host, such as a laptop PC, connecting to an intra-enterprise local area network (LAN) from an out-of-office spot such as a coffee shop for example. The present applicant has proposed a comprisal of such a host in the patent document 3.

The sixth embodiment is configured to make a host comprise the function of enabling a seamless switching of the above described inter-GW path, thereby accomplishing a seamless network switching technique reducing a load of the process and resource (i.e., hardware and software) of a GW to which a host is connected.

{First Example of a Two-Route Connection}
<Configuration>

FIG. 44 is a diagram showing a configuration example of a two-route connection of the Note-C according to the sixth embodiment. In the showing of FIG. 44, the same component sign is assigned to the same constituent component as one shown in FIG. 3.

Referring to FIG. 44, the PC-B at the parents' home, the PC-A at the own home and the Note-C at the away-office belong to the group 1. The Note-C comprises a wired line and a wireless LAN interfaces and establishes two tunnels, that is, tunnels 701 and 702 between itself and the GW-A. The tunnel 701 is one by a wired line communication utilizing the wired line LAN interface of the Note-C, and the tunnel 702 is one by a wireless communication utilizing the wireless LAN interface. The tunnels 701, 702 and 8000 are all configured to be capable of a communication on a unicast and on a broadcast/multicast. Therefore, the Note-C is in a state of being connectable to the PC-A at the own home and the PC-B at the parents' home.

<Sequence>

Figure 45:
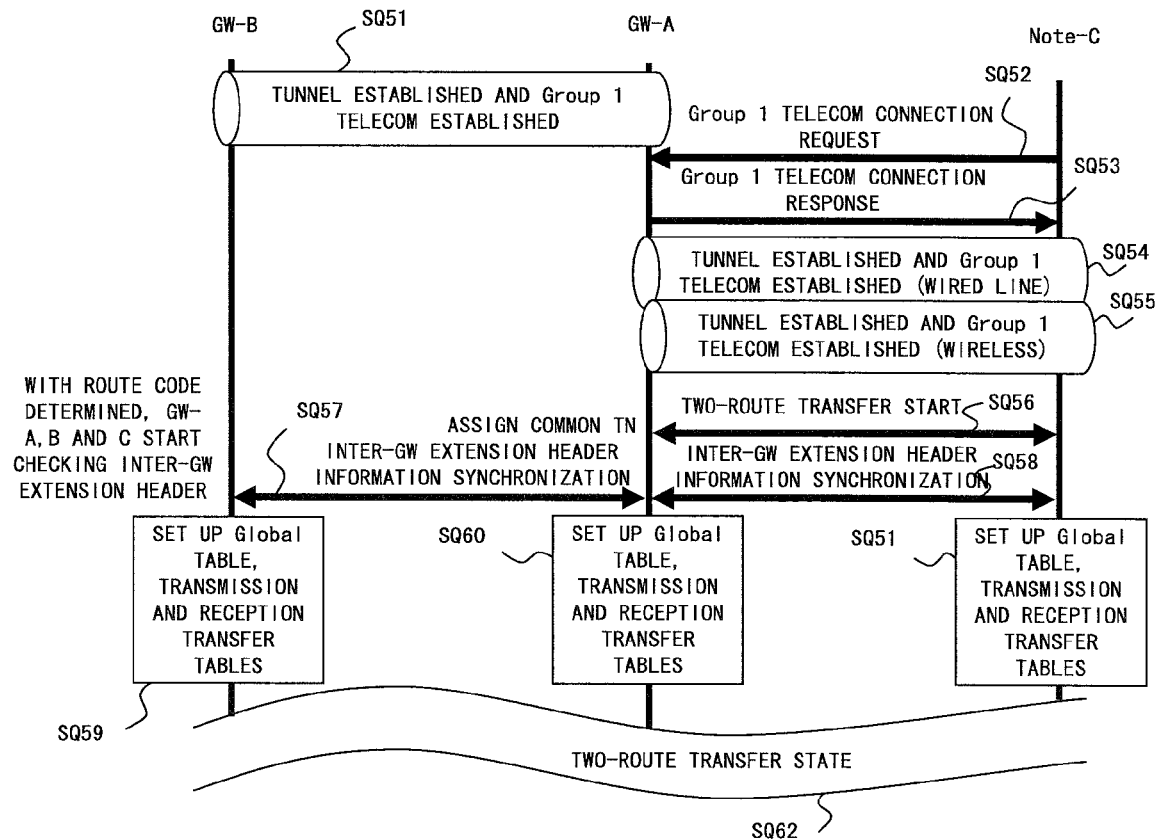
FIG. 45 is a sequence diagram showing a procedure until the Note-C reaching at the state of a two-route connection as shown in FIG. 44.

FIG. 45 is a sequence diagram showing a procedure until the Note-C reaching at the state of a two-route connection as shown in FIG. 44.

The sequence described in the following is one in the case of the Note-C performing a two-route connection to the GW-A suddenly by the wired and wireless lines when the GW-A and GW-B are in the state of establishing a communication in the group 1.

The tunnel 8000 is established between the GW-A and GW-B so as to establish a group 1 communication between the GW-A and GW-B (SQ 51). The Note-C requests the GW-A for a communication connection in the group 1 (SQ 52). The GW-A sends a response permitting a group 1 communication connection to the Note-C (SQ 53).

Then the GW-A and Note-C establish a tunnel 701 and a group 1 communication (by a wired line) (SQ 54). Subsequently, the GW-A and Note-C establish a tunnel 702 and a group 1 communication (by a wireless line) (SQ 55).

Then, a transfer sequence number (TN) common to the GW-A and Note-C is assigned to the tunnels 701 and 702. And a two-route transfer by the tunnels 701 and 702 is started between the GW-A and Note-C (SQ 56).

Then, inter-GW extension header information synchronous processes are performed between the GW-A and GW-B, and between the GW-B and Note-C (SQs 57 and 58). The GW-A, GW-B and Note-C exchange the respective inter-GW extension header, and determine inter-GW extension header information such as RouteCode in the inter-GW extension header information synchronous processes.

Then, the GW-A, GW-B and Note-C set (i.e., update) the respective Global table 220, reception transfer table 230 and transmission transfer table 240 based on a result of exchanging the inter-GW extension header information (SQs 59, 60 and 61).

Hereafter, the Note-C becomes the state of a two-route transfer between the GW-A and GW-B by utilizing the wired line tunnel 701 and wireless line tunnel 702 (SQ 62).

{Second Example of a Two-Route Connection}
<Configuration>

Figure 46:
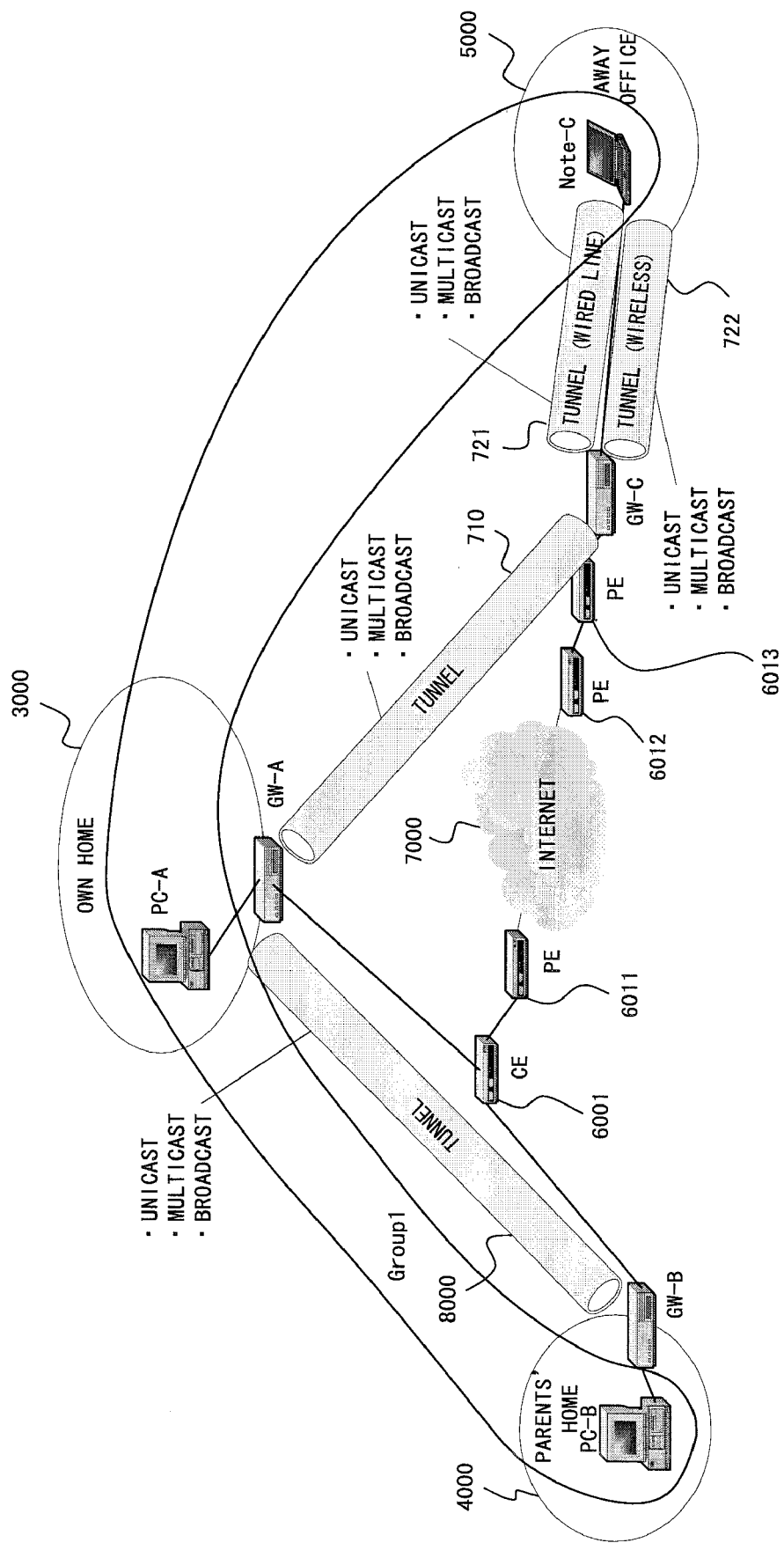
FIG. 46 is a diagram exemplifying another configuration of the Note-C performing a two-route connection according to the sixth embodiment.

FIG. 46 is a diagram exemplifying another configuration of the Note-C performing a two-route connection according to the sixth embodiment. In the showing of FIG. 46, the same component sign is assigned to the same constituent component as one shown in FIG. 44.

The next is a description of another configuration of a two-route connection by the Note-C by referring to FIG. 46.

The GW-C is a gateway capable of recognizing an inter-GW header (i.e., an inter-GW standard header 111 and an inter-GW extension header 112), and relaying an IP packet 101 having the inter-GW header likewise the GW-C according to the second embodiment.

A tunnel 710 capable of carrying out a unicast and a broadcast/multicast is established between the GW-A and GW-C.

Meanwhile, a wired line communication-use tunnel 721 and a wireless communication-use tunnel 722 are established between the Note-C and GW-C. The tunnels 721 and 722 are configured to be capable of performing a communication on the unicast and broadcast/multicast.

Therefore, the Note-C is enabled for a communication with the PC-A under the control of the GW-A on the unicast and broadcast/multicast by utilizing the tunnel 721, or the tunnels 722 and 710. The Note-C also is enabled for a communication with the PC-B under the control of the GW-B in the unicast and broadcast/multicast by utilizing the tunnels 721 (or 722), 710 and 8000.

<Sequence>

FIG. 47 is a sequence diagram showing a process procedure for structuring a two-route connection for the Note-C shown in FIG. 46.

The GW-B, GW-A and GW-C establish tunnels and a group 1 communication. That is, the tunnel 8000 is established between the GW-B and GW-A, and the tunnel 710 between the GW-A and GW-C, and the group 1 communication is established by utilizing the tunnels 8000 and 710 (SQ 71).

The Note-C requests the GW-A for a group 1 communication connection (SQ 72). The GW-A, receiving the group 1 communication connection request, returns a group 1 communication connection response (i.e., a group 1 communication connection response in between the Note-C and GW-C) to the Note-C (SQ 73).

The Note-C and GW-C establish the tunnel 721 and the group 1 communication on a wired line utilizing the tunnel 721 (SQ 74). Subsequently, the Note-C and GW-C establish the tunnel 722 and the group 1 communication on a wireless utilizing the tunnel 722 (SQ 75).

The Note-C and GW-C assign a common transfer sequence number (TN), and start a two-route transfer via the tunnels 721 and 722 (SQ 76).

Inter-GW extension header information synchronous processes are carried out between GW-B and GW-A, between the GW-A and GW-C, and between the GW-C and Note-C (SQs 77, 78 and 79).

The inter-GW extension header information synchronous processes determine a RouteCode, and exchange the inter-GW extension header information among the GW-A, GW-B, GW-C and Note-C.

The GW-B, GW-C and Note-C set (i.e., update) the respectively comprised Global table 220, reception transfer table 230 and transmission transfer table 240 (SQs 80, 81 and 82).

And the Note-C becomes a two-route transfer state with the GW-C, GW-A and GW-B (SQ 83). In the two-route transfer, the Note-C and GW-C check an inter-GW header (i.e., an inter-GW standard header and an inter-GW extension header).

{Configuration of Note-C}

FIG. 48 is a diagram showing a system configuration of the Note-C shown in FIGS. 45 and 46.

The Note-C 800 comprises a user domain 810 and a kernel domain 830, and the border between these domains is equipped with two real LAN interfaces (i.e., real LAN-IFs) 821R and 821c, and a virtual LAN interface (i.e., a virtual LAN-IF) 823.

The user domain 810 is equipped with a client application 811 that is an application program for a user. The kernel domain 830 is equipped with a physical LAN driver 831R (i.e., a first physical driver), a wireless LAN card 832, a physical LAN driver 831c, a wired line LAN card 833, a virtual LAN driver 834, an inter-GW header & NAT process unit 835 (noted as "header process unit 835" hereinafter), a transfer sequence number process unit 836, a route management process unit 837 and a tunnel process unit 838.

The physical LAN driver 831R is connected to the real LAN-IF 821R, wireless LAN card 832 and tunnel process unit 838. The physical LAN driver 831c is connected to the wireless LAN card 832, wired line LAN card 833 and tunnel process unit 838. The virtual LAN driver 834 is connected to the virtual LAN-IF 823.

The wireless LAN card 832, being a network interface card (NIC) for transmitting and receiving an IP packet wirelessly, is connected to a wireless LAN (not shown herein). The wired line LAN card 833, being an NIC for transmitting and receiving an IP packet via wired line, is connected to a wired line LAN (not shown herein). The wireless LAN card 832 and wired line LAN card 833 correspond to the global side interface 612 shown in FIG. 23.

The header process unit 835, transfer sequence number process unit 836, route management process unit 837 and tunnel process unit 838 comprise the functions approximately the same as those of the header process unit 613, transfer sequence number process unit 614, route management process unit 631 and tunnel process unit 616, respectively, which are shown in FIG. 23.

At the Note-C, an IP packet including data for transmitting to the GW-C is generated by the client application 811. The IP packet is in a format that is compliant to the IP v4 or IP v6.

An IP packet generated by the client application 811 is judged as a normal IP packet or IP packet for an intra-group communication (noted as "intra-group communication-use IP packet" hereinafter) by referring to routing information (e.g., a Global table) internally retained based on the destination address (DA) of the present IP packet. That is, for example, if the destination address of an IP packet is a virtual IP address and if the virtual IP address is set in the Global table, the IP packet is judged as an intra-group communication-use IP packet. If it is vice-versa, the IP packet is judged as a normal IP packet. And in the case of a normal IP packet, it is sent to the real LAN-IF 821R or real LAN-IF 821c. Comparably, in the case of an intra-group communication-use IP packet, it is sent to the virtual LAN-IF 823. Note that the intra-group communication-use IP packet is the same as the inter-group member communication-use IP packet.

A normal IP packet is transmitted by way of the real LAN-IF 821R, physical LAN driver 831R, wireless LAN card 832, or by way of the real LAN-IF 821c, physical LAN driver 831c and wired line LAN card 833.

Comparably, an intra-group communication-use IP packet is judged to be sent by the virtual LAN-IF 823 using the wireless LAN card 832, or using the wired line LAN card 833. The virtual LAN-IF 823 checks a communication state of the wired line LAN and wireless LAN, and controls so that the intra-group communication-use IP packet is transmitted from a LAN interface of a better transfer efficiency. As described above, the sixth embodiment is configured that the virtual LAN-IF 823 inputs respective pieces of information (such as traffic volumes) related to the communication state of the wired line LAN and wireless LAN, and switches transfer routes for the intra-group communication-use IP packet seamlessly.

When outputting an intra-group communication-use IP packet to the virtual LAN driver 834, the virtual LAN-IF 823 designates a LAN interface (i.e., a wireless LAN card 832 or wired line LAN card 833) to which the intra-group communication-use IP packet is to be transmitted).

The virtual LAN driver 834 notifies the header process unit 835 of the LAN interface information designated by the virtual LAN-IF 823 (noted as "designated LAN interface information" hereinafter for convenience). The designated LAN interface information is transmitted to, and in order of, the header process unit 835, transfer sequence number process unit 836, route management process unit 837 and tunnel process unit 838.

The tunnel process unit 838 sends an intra-group communication-use IP packet received from the route management process unit 837 to the physical LAN driver 831R or physical LAN driver 831c according to the designated LAN interface information.

The functions (i.e., processes) of the header process unit 835, transfer sequence number process unit 836, route management process unit 837 and tunnel process unit 838 are respectively similar to those of the header process unit 613, transfer sequence number process unit 614, route management process unit 631 and tunnel process unit 616 of GWs which are shown in FIG. 23. Therefore, the intra-group communication-use IP packet is added by the inter-GW header (i.e., the header constituted by the inter-GW standard header and inter-GW extension header) and is sent to the physical LAN driver 831c or physical LAN driver 831R.

The Note-C receives an IP packet encapsulated by a normal IP packet or the inter-GW header (noted as "encapsulated packet" hereinafter). The Note-C receives the two kinds of packets transmitted from the GW-C at the wireless LAN card 832 or wired line LAN card 833. The wireless LAN card 832 transfers the received packet to the physical LAN driver 831R. The wired line LAN card 833 transfers the received packet to the physical LAN driver 831c.

The physical LAN drivers 831c and 831R respectively judge whether the received packets are normal IP packets or encapsulated packets. Then, if the received packets are normal IP packets, the relevant drivers transfer them to the real LAN-IFs 821c and 821R. Otherwise, i.e., encapsulated packets, the relevant drivers transfer them to the tunnel process unit 838.

The real LAN-IFs 821c and 821R hands the normal packet received from the physical LAN drivers 831c and 831R over to the client application 811.

A encapsulated packet received at the tunnel process unit 838 is applied by the process similar to the above described GW 800 shown in FIG. 23 by the tunnel process unit 838, route management process unit 837, transfer sequence number process unit 836 and header process unit 835, and subsequently it is handed over to the virtual LAN driver 834. By the processes described above, the virtual LAN driver 834 receives, from the tunnel process unit 838, a packet (a normal IP packet) that is a resultant of the inter-GW header being removed from the encapsulated packet. The virtual LAN driver 834 sends the received normal IP packet to the virtual LAN-IF 823. The virtual LAN-IF 823 hands the normal IP packet received from the virtual LAN driver 834 over to the client application 811.

{Detail Comprisal of Note-C}

Figure 49:
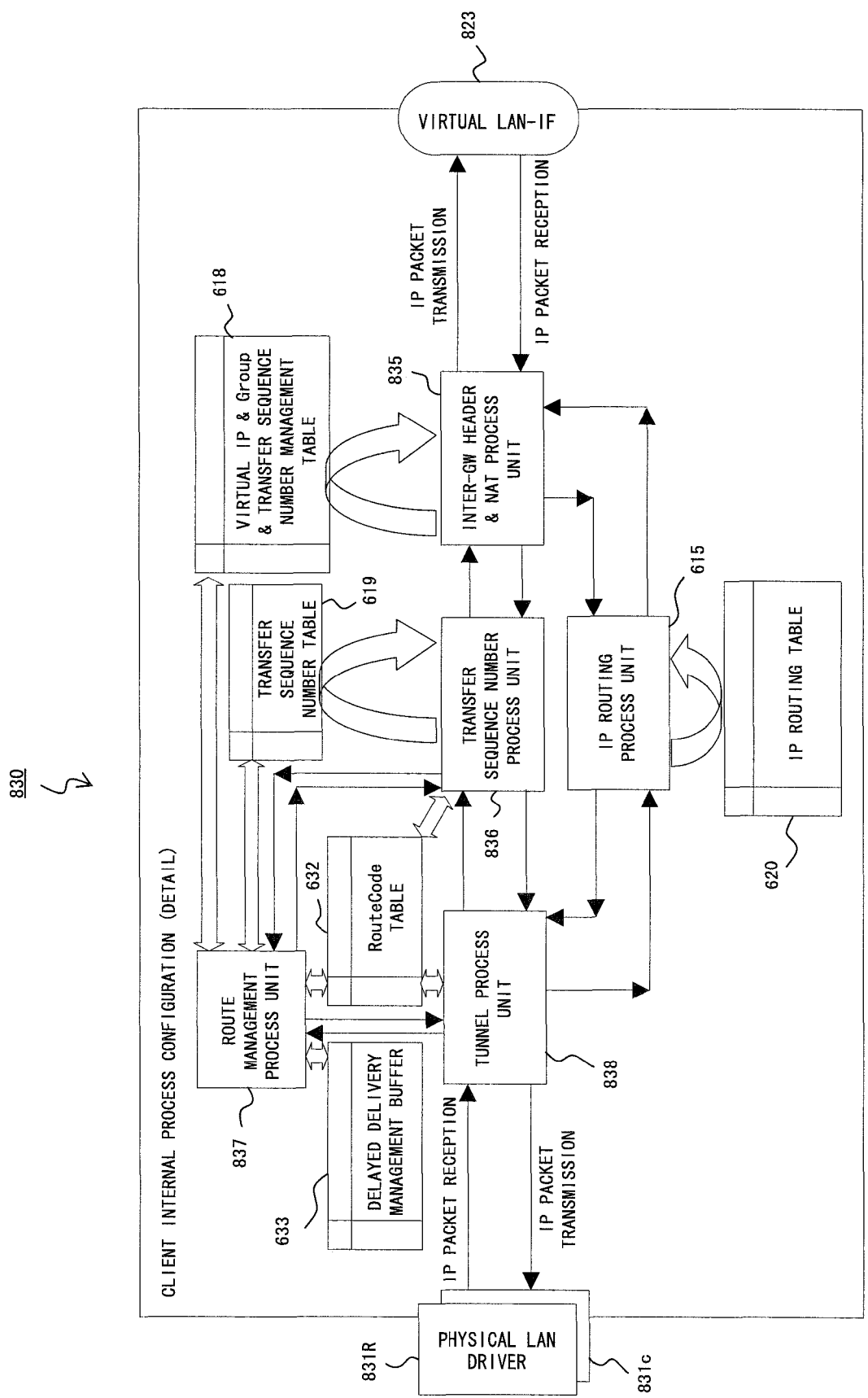
FIG. 49 is a diagram showing the greater details of a comprisal of a kernel domain of the Note-C shown in FIG. 48.

FIG. 49 is a diagram showing the greater details of a comprisal of the kernel domain 830 of the Note-C shown in FIG. 48. In the showing of FIG. 49, the same component sign is assigned to the same constituent component as one shown in FIG. 48. The same component sign is also assigned to the same constituent component as one shown in FIG. 23.

The physical LAN driver 831c and physical LAN driver 831R correspond to the global side interface 612 of the GW. The virtual LAN-IF 823 corresponds to the local side interface 611.

The GW transmits and receives an IP packet (i.e., a normal IP packet or encapsulated packet) to and from an opposite GW by way of the global side interface 612. Comparably, the Note-C transmits and receives an IP packet (i.e., a normal IP packet or encapsulated packet) to and from a wired line LAN or wireless LAN by way of the physical LAN driver 831c or physical LAN driver 831R.

Meanwhile, the GW transmits and receives an IP packet to and from a host under the management of the GW by way of the local side interface 611, while the Note-C transmits and receives an IP packet to and from the client application 811 by way of the virtual LAN-IF 823.

{Packet Transmission and Reception Process at Note-C}

The next is a description of an IP packet transmission and reception process by an internal system of the Note-C shown in FIG. 49.

<Packet Transmission Process>

Figure 50:
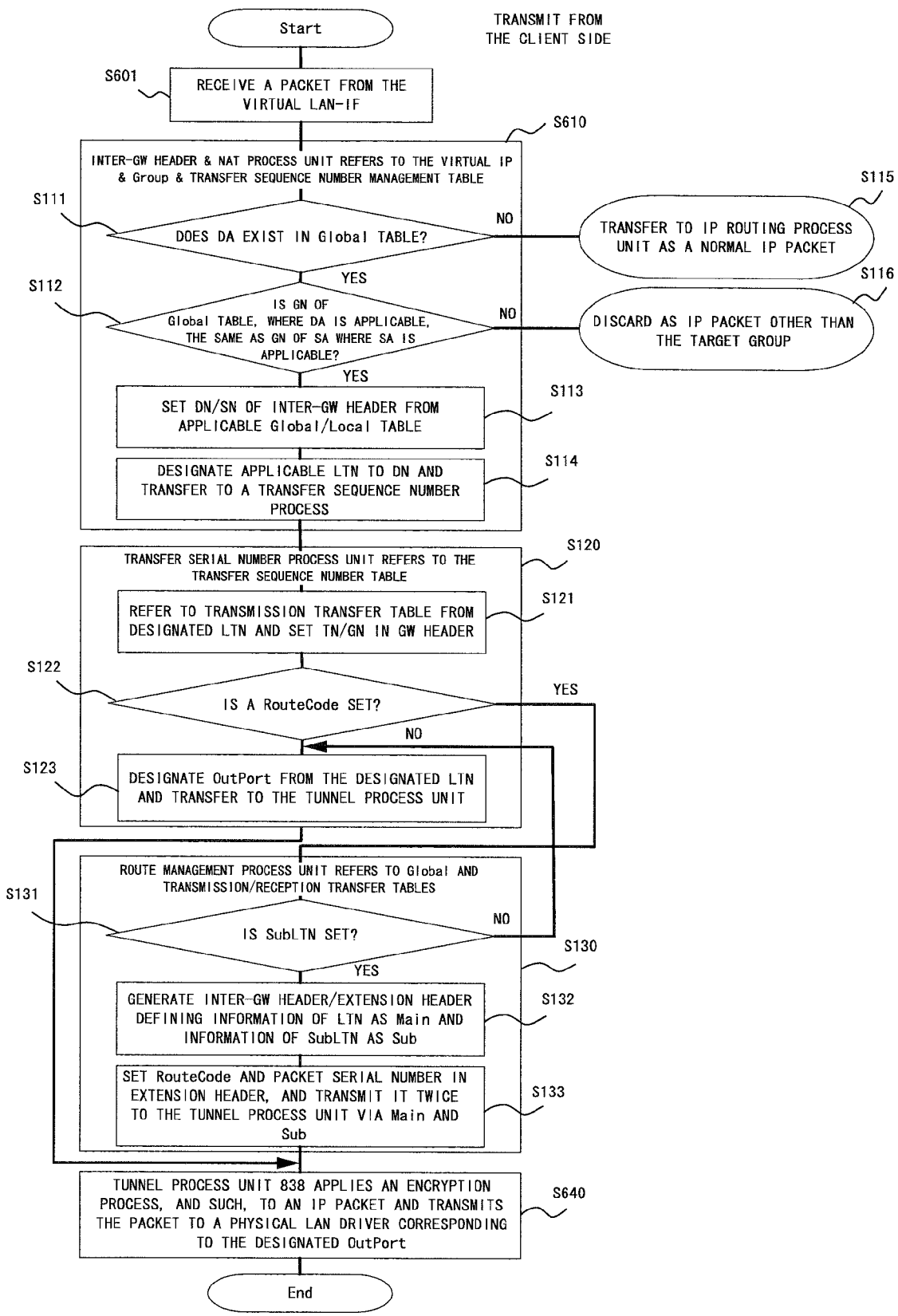
FIG. 50 is a flow chart showing a procedure of a packet transmission process of the Note-C according to the sixth embodiment.

FIG. 50 is a flow chart showing a procedure of a packet transmission process of the Note-C according to the sixth embodiment. In the showing of FIG. 50, the same number is assigned to the same step as one shown in FIG. 24. The flow chart of FIG. 50 is different from that of FIG. 24 in the steps S601 and S640.

In the step S601, the Note-C receives, from the virtual LAN-IF 823, an IP packet generated by the client application 811. The IP packet is transferred to the header process unit 835 from the virtual LAN-IF 823. The Note-C carries out processes of the steps S110 through S130 thereafter likewise the GW.

In the step S640, the tunnel process unit 838 applies an encryption process and such to an IP packet (i.e., a encapsulated packet) transmitted from the transfer sequence number process unit 836 or route management process unit 837, followed by transmitting the process-applied IP packet to a physical LAN driver (i.e., the physical LAN driver 831c or physical LAN driver 831R) corresponding to the designated output port.

<Packet Reception Process>

Figure 51:
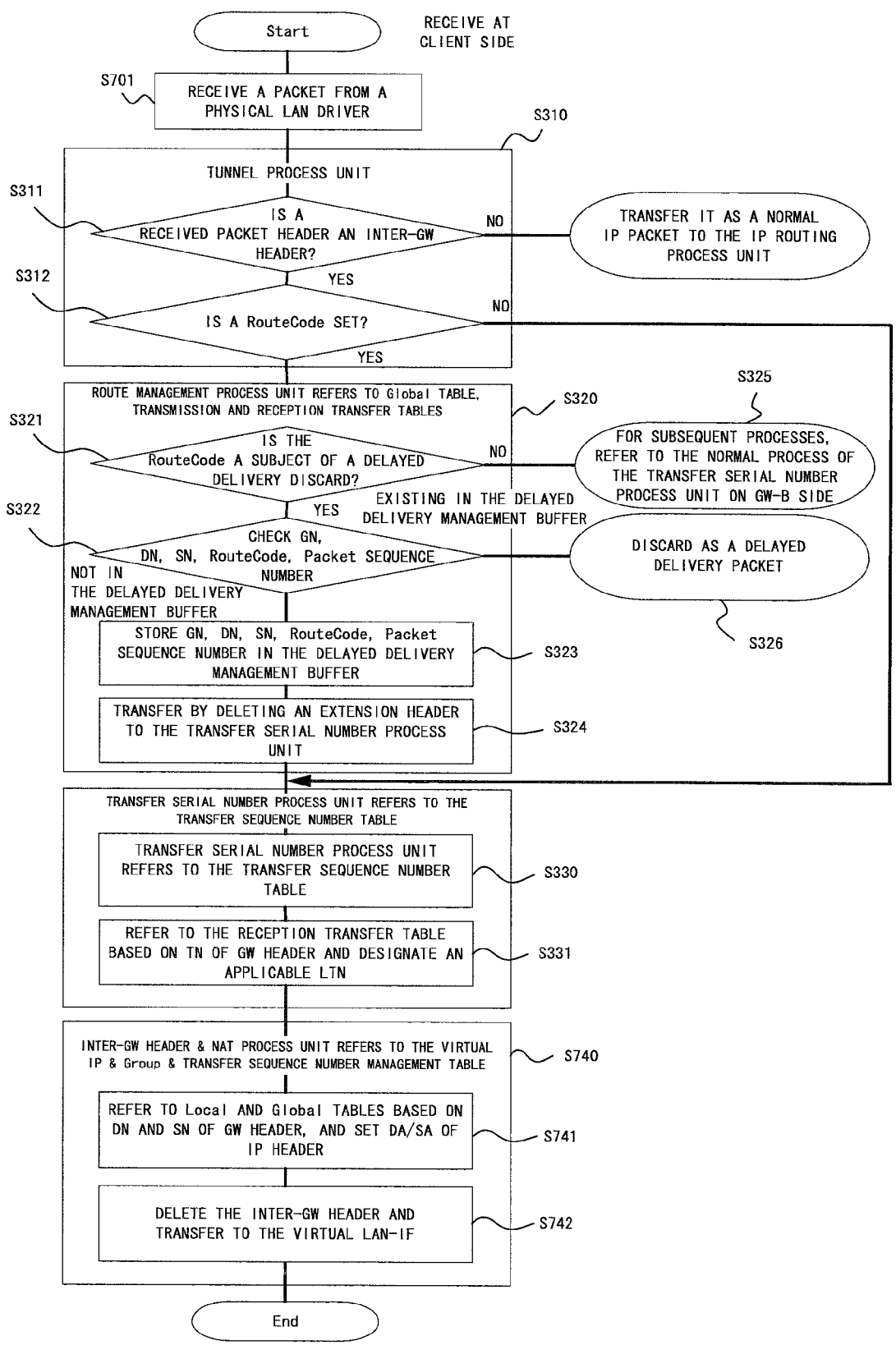
FIG. 51 is a flow chart showing a procedure of a packet reception process of the Note-C according to the sixth embodiment.

FIG. 51 is a flow chart showing a procedure of a packet reception process of the Note-C according to the sixth embodiment. In the showing of FIG. 51, the same number is assigned to the same step as one shown in FIG. 26.

The flow chart of FIG. 51 is different from that of FIG. 26 in the steps S701 and S740.

In the step S701, the Note-C receives, by way of the wireless LAN card 832 or wired line LAN card 833, an IP packet transmitted from the GW-C by the physical LAN drivers 831c and 831R. The IP packet is transferred to the tunnel process unit 838 from the physical LAN driver 831c or physical LAN driver 831R. The Note-C carries out the processes of the steps S310 through S330 hereinafter likewise the GW.

In the step S740, the header process unit 835 first carries out a process similar to that of the header process unit 613 of the GW (S741). The process of the step S741 is similar to the process of the step S341 shown in FIG. 42. Then, it generates a normal IP packet by deleting the inter-GW header from the encapsulated packet, and transfers the normal IP packet to the virtual LAN-IF 823 (S742).

Although the sixth embodiment has exemplified a laptop PC as a host (i.e., a terminal), the comprisal of the present embodiment is applicable to a host of various configurations in addition to a laptop PC.

Meanwhile, a terminal apparatus according to the present embodiment is capable of optimizing the above described communication route and performing a synchronous update of internal tables at the above described route switches as a trigger, likewise the GWs of the above described embodiments. These processes can be implemented by a similar technique applied to the above-described GWs.

MODIFIED EXAMPLE

The above-described embodiments are applications of the present invention to gateways (GW); the present invention, however, is applicable to other packet relay apparatuses such as a router. Also, the network systems according to the above described first, second, fourth and sixth embodiments utilize a CE device as Customer Premises Equipment (CPE); the packet relay apparatus according to the present invention, however, is applicable to a network system utilizing a CPE other than a CE device.

What is claimed is:

1. A packet relay apparatus connecting a sub-network accommodated by the apparatus itself to a global network, grouping terminals within the sub-network virtually and building up a virtual private network by an intra-group member communication that is a communication between members within a group made by a grouping of the terminals, comprising:

a first storage unit which stores routing information for use in an intra-group member communication relating to a main route and a sub-route, of a first Internet protocol (IP) packet and a second IP packet, and route identification information for identifying an event of being transferred by way of the main route and the sub-route, wherein the first IP packet is managed by an internal management transfer number for identifying the main route used for the intra-group member communication, a sub internal management transfer number for identifying the sub-route used for the intra-group member communication, a transfer number for identifying a transfer route of the first IP packet which is transferred to another packet relay apparatus on the global network and a group number for identifying a group, and the second IP packet is transmitted and received to and from a terminal under a control of the apparatus itself;

an information management unit which sets and updates the routing information and the route identification information stored in the first storage unit;

a first transmission/reception unit which transmits and receives the second IP packet between itself and the terminal under the control of the apparatus itself;

a first packet creation unit which creates the first IP packet by adding an inter-packet relay apparatus header to the second IP packet received by the first transmission/reception unit by referring to the routing information and the route identification information which are stored in the first storage unit, the inter-packet relay apparatus header including information related to the main route, the route identification information and a packet identification information for identifying a packet;

a second transmission/reception unit which transmits the first IP packet created by the first packet creation unit to another packet relay apparatus by referring to the routing information and route identification information which are stored in the first storage unit and also receives the first IP packet created by the first packet creation unit of another packet relay apparatus and addressed to a terminal under a control of the apparatus itself; and a second packet creation unit which creates the second IP packet by deleting the inter-packet relay apparatus header from the first IP packet received by the second transmission/reception unit and outputs the second IP packet to the first transmission/reception unit.

2. The packet relay apparatus according to claim 1, further comprising a transfer unit which transfers the first IP packet received by the apparatus itself to another packet relay apparatus by referring to the routing information and route identification information which are stored in the first storage unit.

3. The packet relay apparatus according to claim 1, wherein
the second transmission/reception unit comprises an encryption unit which encrypts the first IP packet to be transmitted to another packet relay apparatus, and a decryption unit which decrypts the first IP packet received from another packet relay apparatus.

4. The packet relay apparatus according to claim 1, wherein the routing information is constituted by
a first table storing a sender identification number assigned to a the first terminal and the group number of the group, to which the first terminal belongs, corresponding to a real IP address assigned to the first terminal under the control of the apparatus itself,
a second table storing an addressee identification information assigned to a second terminal which is a destination of the second IP packet transmitted by the first terminal, a group number for a group to which the first terminal belongs, the internal management transfer number and the sub-internal management transfer number,
a third table storing routing information of a first IP packet corresponding to the internal management transfer number and storing routing information of the second IP packet corresponding to the sub-internal management transfer number, and
a fourth table managing routing information of the received second IP packet by the internal management transfer number, sub-internal management transfer number and group number.

5. The packet relay apparatus according to claim 1, further comprising
an update unit which updates the routing information and route identification information according to a condition of a route used by a terminal under the control of the apparatus itself for communicating the second IP packet.

6. The packet relay apparatus according to claim 1, further comprising
a second storage unit which stores packet identification information for identifying the first IP packet if a terminal under the control of the apparatus itself receives the first IP packet addressed to the terminal from another packet relay apparatus in a duration of the terminal communicating the first IP packet by utilizing the main route and sub-route, and
a delayed delivery discard process unit which discards a first IP packet belatedly received among two of the same first packet addressed to the terminal receiving from the main route and sub-route, based on the packet identification information stored in the second storage unit.

7. The packet relay apparatus according to claim 1, further comprising
a communication route optimization unit which optimizes a communication route for the first IP packet by updating the routing information and route identification information.

8. The packet relay apparatus according to claim 7, wherein the communication route optimization unit optimizes the communication route when a communication volume of the second IP packet exceeds a specified value at a terminal transmitting/receiving the second IP packet.

9. The packet relay apparatus according to claim 7, wherein
the communication route optimization unit optimizes the communication route when a transfer volume of the first IP packet exceeds a specified value at a packet relay apparatus placed at a relay spot of the communication route.

10. The packet relay apparatus according to claim 7, wherein
the communication route optimization unit optimizes the communication route stepwise.

11. The packet relay apparatus according to claim 10, wherein
the communication route optimization unit first adds a route for communicating the first IP packet so as to communicate the second IP packet in two routes as a first stage, followed by narrowing down to one route with a better transfer ratio of the second IP packet from the two routes communicating the first IP packet in a second stage.

12. The packet relay apparatus according to claim 11, wherein
a communication route optimized by the communication route optimization unit is for a unicast-use communication route.

13. The packet relay apparatus according to claim 12, wherein
the communication route optimization unit
adds routing information, which is related to an added communication route, to the first storage unit in the first stage, and
deletes a transfer identification number and the internal management transfer number or sub internal management transfer number which are related to a communication route becoming redundant from the routing information by changing a setup of at least one of the internal management transfer number or sub internal management transfer number in the second stage.

14. The packet relay apparatus according to claim 11, wherein
a communication route optimized by the communication route optimization unit is for a multicast-use communication route.

15. The packet relay apparatus according to claim 14, wherein
the communication route optimization unit
adds routing information, which is related to an added communication route, makes the transfer numbers for identifying the transfer route of the first IP packet common and forcibly converts the group number in the first stage, and
deletes a transfer identification number and the internal management transfer number or sub internal management transfer number which are related to a communication route becoming redundant from the routing information by changing a setup of at least one of the internal management transfer number or sub internal management transfer number in the second stage.

16. The packet relay apparatus according to claim 11, wherein
a communication route optimized by the communication route optimization unit is for a broadcast-use communication route.

17. The packet relay apparatus according to claim 16, wherein
the communication route optimization unit
adds routing information, which is related to an added communication route, makes the transfer numbers for identifying the transfer route of the first IP packet common and forcibly converts the group number in the first stage, and changes a setup of at least one of the internal management transfer number or sub internal management transfer number, and deletes a transfer identification number and the internal management transfer number or sub internal management transfer number which are related to a communication route becoming redundant from the routing information in the second stage.

18. The packet relay apparatus according to claim 17, wherein the communication route optimization unit switches over between a main route and a sub-route as the second stage when the apparatus itself receives the second IP packet of no less than a specified value from two communication route.

19. The packet relay apparatus according to claim 1, further comprising a synchronous update unit which monitors a usage condition of a communication route used by a terminal under the control of the apparatus itself for a communication of the second IP packet, and which updates the routing information and route identification information synchronously with another packet relay apparatus placed in the communication route.

20. The packet relay apparatus according to claim 19, wherein the synchronous update unit carries out the synchronous update when the apparatus itself switches a communication route for the first IP packet from one route over to two routes.

21. The packet relay apparatus according to claim 19, wherein the synchronous update unit carries out the synchronous update when the apparatus itself switches a communication route for the first IP packet from two routes over to one route.

22. A terminal apparatus performing an IP packet communication with a first packet relay apparatus that connects a sub-network accommodated by the first packet relay apparatus to a global network, groups terminals within the sub-network virtually and builds up a virtual closed net by an intra-group member communication that is a communication between members within a group made by a grouping of the terminals in the sub-network, comprising:

a storage unit which stores routing information for use in an intra-group member communication relating to a main route and a sub-route, of a first Internet protocol (IP) packet and a second IP packet, and route identification information for identifying an event of being transferred by way of the main route and the sub-route, wherein the first IP packet is managed by an internal management transfer number for identifying the main route used for the intra-group member communication, a sub internal management transfer number for identifying the sub-route used for the intra-group member communication, a transfer number for identifying a transfer route of the first IP packet which is transferred to a second packet relay apparatus on the global network via the first packet relay apparatus, and a group number for identifying a group, and the second IP packet is transmitted and received to and from a terminal under a control of the terminal apparatus itself;

an information management unit which sets and updates the routing information and the route identification information stored in the storage unit;

a first packet creation unit which creates the first IP packet by adding a terminal-packet relay apparatus header being used for transfer a packet in a communication between a terminal and the packet relay apparatus to the second IP packet in which a real IP address of the terminal apparatus itself is set as a sender address of an IP header and a virtual IP address of a transmission destination terminal is set as a destination address, by referring to the routing information stored in the storage unit, the terminal-packet relay apparatus header including information related to the main route, the route identification information and a packet identification number for identifying a packet;

a transmission/reception unit which transmits the first IP packet created by the first packet creation unit to the first packet relay apparatus accommodating the terminal apparatus itself by referring to the routing information and the route identification information which are stored in the storage unit and also receives the first IP packet created by the first packet relay apparatus; and a second packet creation unit which deletes the terminal-packet relay apparatus header from the first IP packet received by the transmission/reception unit, followed by creating the second IP packet by referring to the routing information stored in the storage unit.

23. The terminal apparatus according to claim 22, wherein the transmission/reception unit, comprising a communication unit used for a wired communication and one used for a wireless communication, transmits and receives the first IP packet to and from the packet relay apparatus by utilizing the wired communication-use communication unit and wireless communication-use communication unit.

24. The terminal apparatus according to claim 22, further comprising a tunnel establishment unit which establishes a tunnel connection to a packet relay apparatus capable of carrying out a routing process utilizing the inter-packer relay apparatus header.

25. The terminal apparatus according to claim 22, wherein the routing information is constituted by a first table storing a sender identification number assigned to the first terminal and the group number, to which the first terminal belongs, corresponding to a real IP address assigned to a first terminal under the control of the terminal apparatus itself, a second table storing a destination identification information assigned to a second terminal which is an addressee of the second IP packet transmitted by the first terminal, a group number for a group to which the first terminal belongs, the internal management transfer number and the sub-internal management transfer number, a third table storing routing information of a first IP packet corresponding to the internal management transfer number and storing routing information of the second IP packet corresponding to the sub-internal management transfer number, and a fourth table managing routing information of the received second IP packet by the internal management transfer number, sub-internal management transfer number and group number.

26. The terminal apparatus according to claim 22, further comprising a communication route optimization unit which optimizes a communication route for the first IP packet by updating the routing information and route identification information.

27. The terminal apparatus according to claim 22, further comprising
 a synchronous update unit which monitors a usage condition of a communication route used by the terminal apparatus itself for a communication of the first IP packet, and updates the routing information and route identification information synchronously with another packet relay apparatus placed in the communication route.

28. A packet relay method for connecting a sub-network accommodated by the apparatus itself to a global network, grouping terminals within the sub-network virtually and building up a virtual private network by an intra-group member communication that is a communication between members within a group made by a grouping of the terminals, the method being performed by a packet relay apparatus, wherein
 the packet relay apparatus comprises
  a storage unit which stores routing information for use in an intra-group member communication relating to a main route and a sub-route, of a first Internet protocol (IP) packet and a second IP packet, and route identification information for identifying an event of being transferred by way of the main route and the sub-route, wherein the first IP packet is managed by an internal management transfer number for identifying the main route used for the intra-group member communication, a sub internal management transfer number for identifying the sub-route used for the intra-group member communication, a transfer number for identifying a transfer route of the first IP packet which is transferred to another packet relay apparatus on the global network and a group number for identifying a group, and the second IP packet is transmitted and received to and from a terminal under a control of the apparatus itself, and wherein
 the packet relay apparatus performs:
  setting and updating the routing information and the route identification information stored in the storage unit;
 transmitting and receiving the second IP packet between itself and the terminal under the control of the apparatus itself;
  creating the first IP packet by adding an inter-packet relay apparatus header to the received second IP packet by referring to the routing information and the route identification information which are stored in the storage unit, the inter-packet relay apparatus header including information related to the main route, the route identification information and a packet identification information for identifying a packet;
  transmitting the created first IP packet to another packet relay apparatus by referring to the routing information and route identification information which are stored in the storage unit and also receiving the first IP packet created by another packet relay apparatus and addressed to a terminal under a control of the apparatus itself; and
  creating the second IP packet by deleting the inter-packet relay apparatus header from the received first IP packet and outputting the second IP packet.

* * * * *

UNITED STATES PATENT AND TRADEMARK OFFICE
CERTIFICATE OF CORRECTION

| | | |
|---|---|---|
| PATENT NO. | : 8,085,795 B2 | Page 1 of 1 |
| APPLICATION NO. | : 11/675353 | |
| DATED | : December 27, 2011 | |
| INVENTOR(S) | : Shinji Yamane | |

It is certified that error appears in the above-identified patent and that said Letters Patent is hereby corrected as shown below:

Column 45, Line 15 (Approx.), In Claim 4, delete "a the" and insert -- a --, therefor.

Column 48, Line 38, In Claim 24, delete "inter-packer" with -- inter-packet --, therefor.

Signed and Sealed this
Tenth Day of April, 2012

David J. Kappos
*Director of the United States Patent and Trademark Office*